United States Patent
Lee

(10) Patent No.: US 10,946,607 B2
(45) Date of Patent: Mar. 16, 2021

(54) HANDHELD TOOL

(71) Applicant: GENIIQ PTE. LTD., Singapore (SG)

(72) Inventor: Kar Yin Lee, Singapore (SG)

(73) Assignee: GENIIQ PTE. LTD., Singapore (SG)

( * ) Notice: Subject to any disclaimer, the term of this patent is extended or adjusted under 35 U.S.C. 154(b) by 0 days.

(21) Appl. No.: 16/494,289

(22) PCT Filed: Mar. 14, 2018

(86) PCT No.: PCT/IB2018/051684
§ 371 (c)(1),
(2) Date: Sep. 14, 2019

(87) PCT Pub. No.: WO2018/167676
PCT Pub. Date: Sep. 20, 2018

(65) Prior Publication Data
US 2020/0130317 A1    Apr. 30, 2020

(30) Foreign Application Priority Data

Mar. 14, 2017 (GB) .................................. 1704010.6

(51) Int. Cl.
*A47G 21/04* (2006.01)
*B31D 5/04* (2017.01)
*A47G 21/02* (2006.01)
*B32B 3/00* (2006.01)

(52) U.S. Cl.
CPC ................ *B31D 5/04* (2013.01); *A47G 21/02* (2013.01); *A47G 21/04* (2013.01); *B32B 3/00* (2013.01); *Y10T 428/24628* (2015.01)

(58) Field of Classification Search
CPC ............ Y10T 428/24628; A47G 21/04; A47G 21/00; A47G 2021/002
See application file for complete search history.

(56) References Cited

U.S. PATENT DOCUMENTS

| | | |
|---|---|---|
| 2014/0069933 A1 | 3/2014 | Cross |
| 2014/0238987 A1 | 8/2014 | Brooks |
| 2015/0182051 A1 | 7/2015 | Stewart-Stand |

FOREIGN PATENT DOCUMENTS

| | | |
|---|---|---|
| KR | 10-2002-0026221 A | 4/2002 |
| KR | 20-0386861 Y1 | 6/2005 |
| KR | 20-2012-0003646 U | 5/2012 |
| SG | 30201703913 Y | 7/2017 |
| SG | 30201703914 W | 7/2017 |
| SG | 30201703915 R | 7/2017 |
| SG | 30201703916 P | 7/2017 |

*Primary Examiner* — Alexander S Thomas
(74) *Attorney, Agent, or Firm* — Maschoff Brennan

(57) ABSTRACT

The application provides a blank for forming a handheld tool. The blank includes an elongated sheet that includes a top surface and a bottom surface, a first longitudinal end and a second longitudinal end, a first side end and a second side end, and a circumferential edge. The circumferential edge includes a rear edge, a front edge, a first side edge, and a second side edge. The elongated sheet also includes at least one upward bending line extending, and a second upward bending segment, and a connecting segment. The elongated sheet also includes a first downward bending line and a second downward bending line.

18 Claims, 79 Drawing Sheets

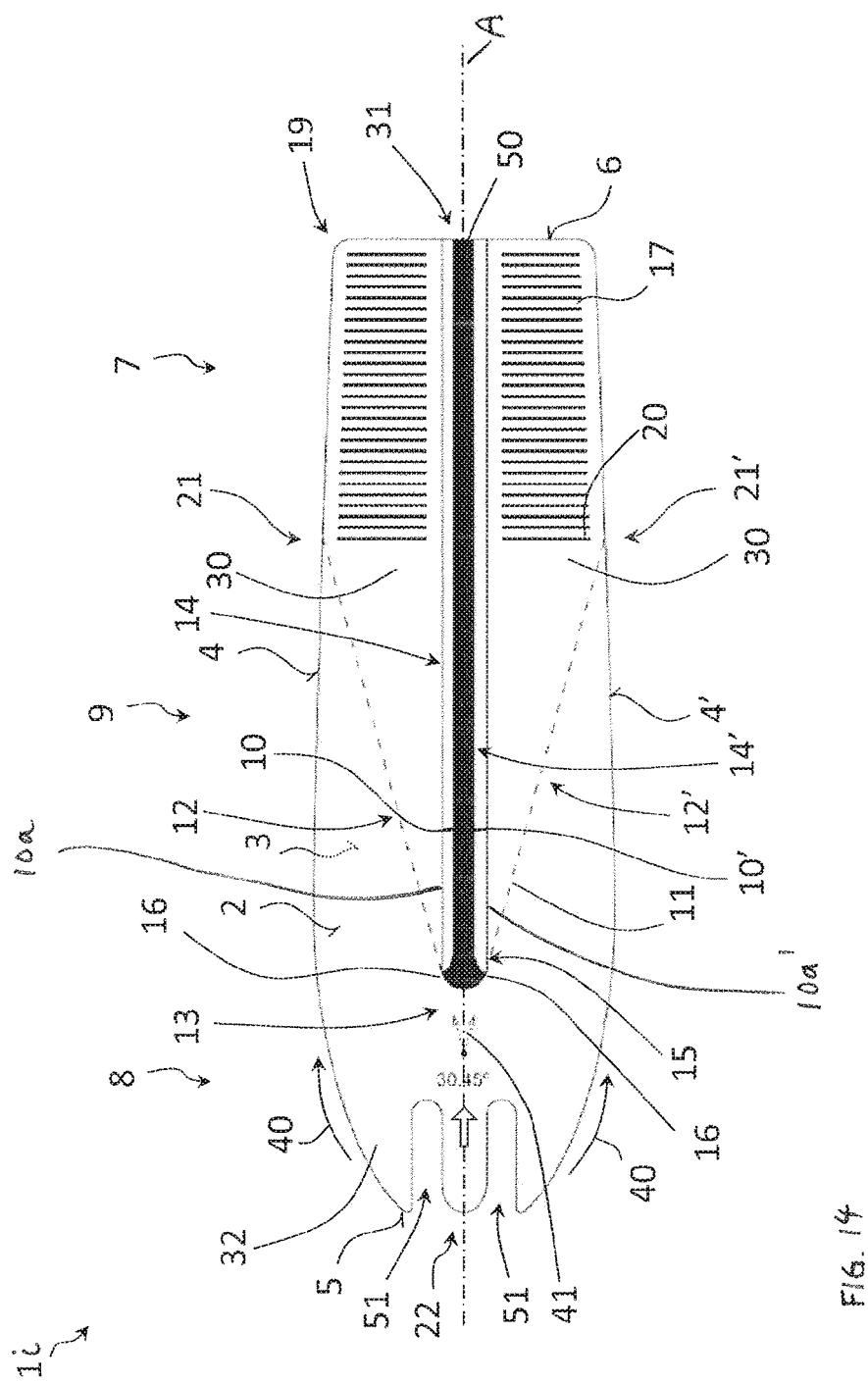

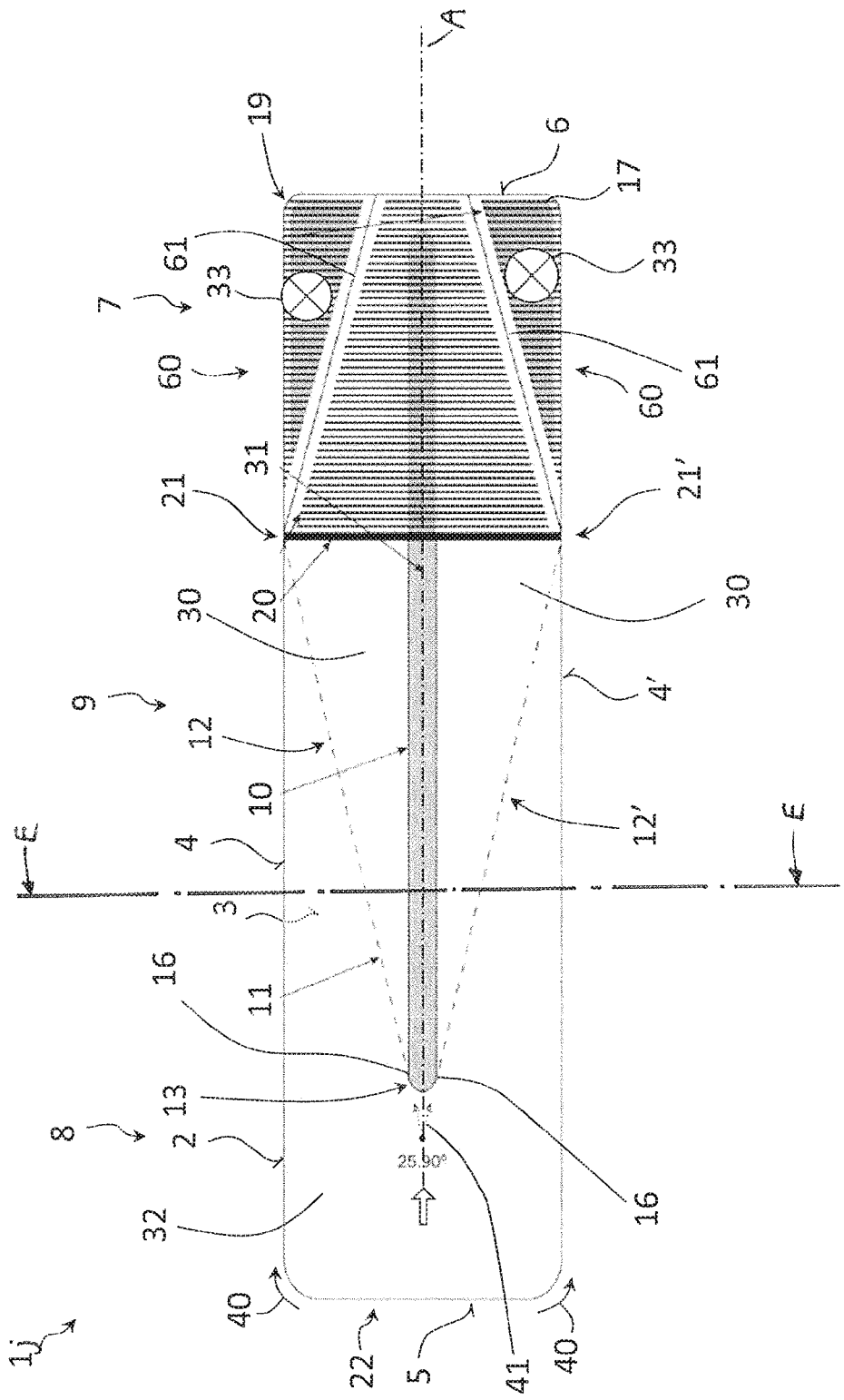

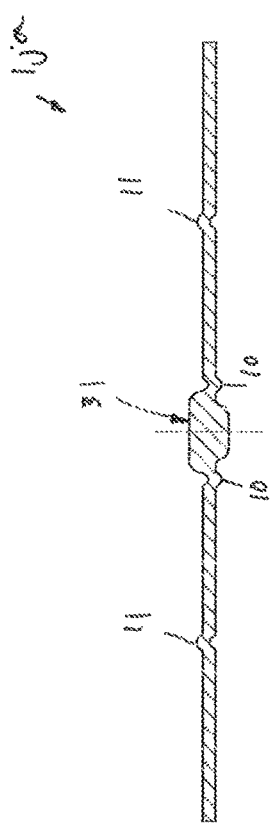
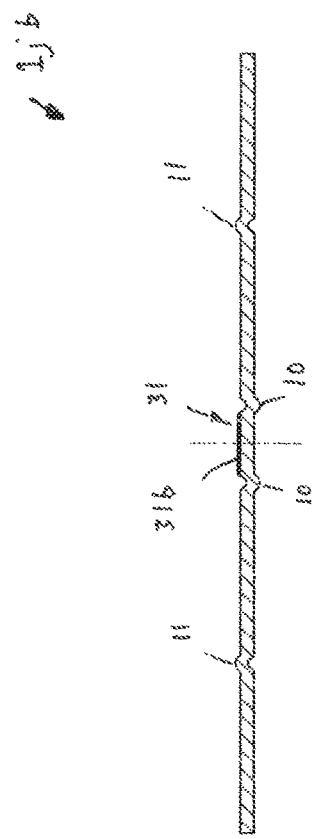
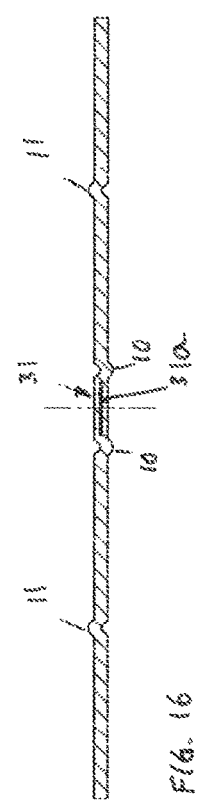

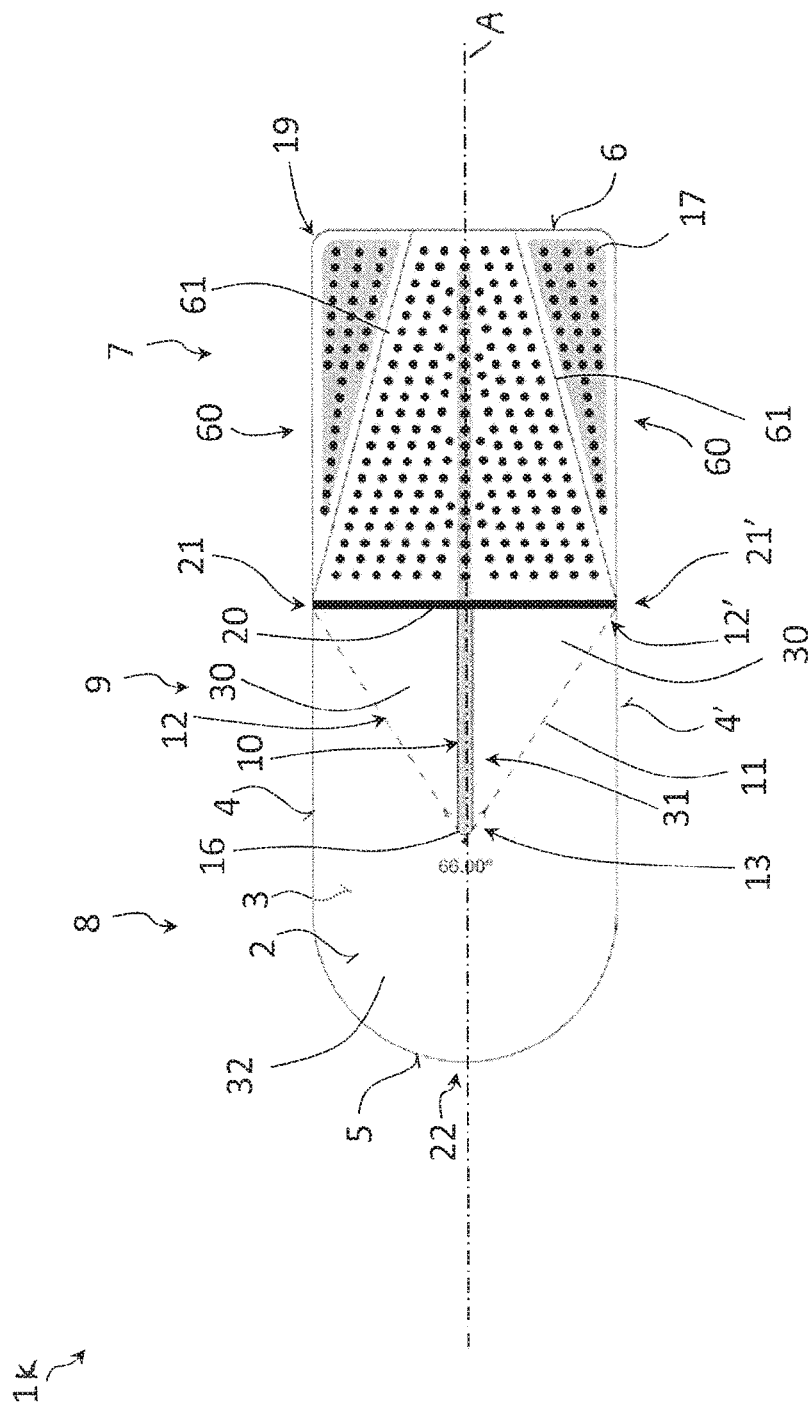

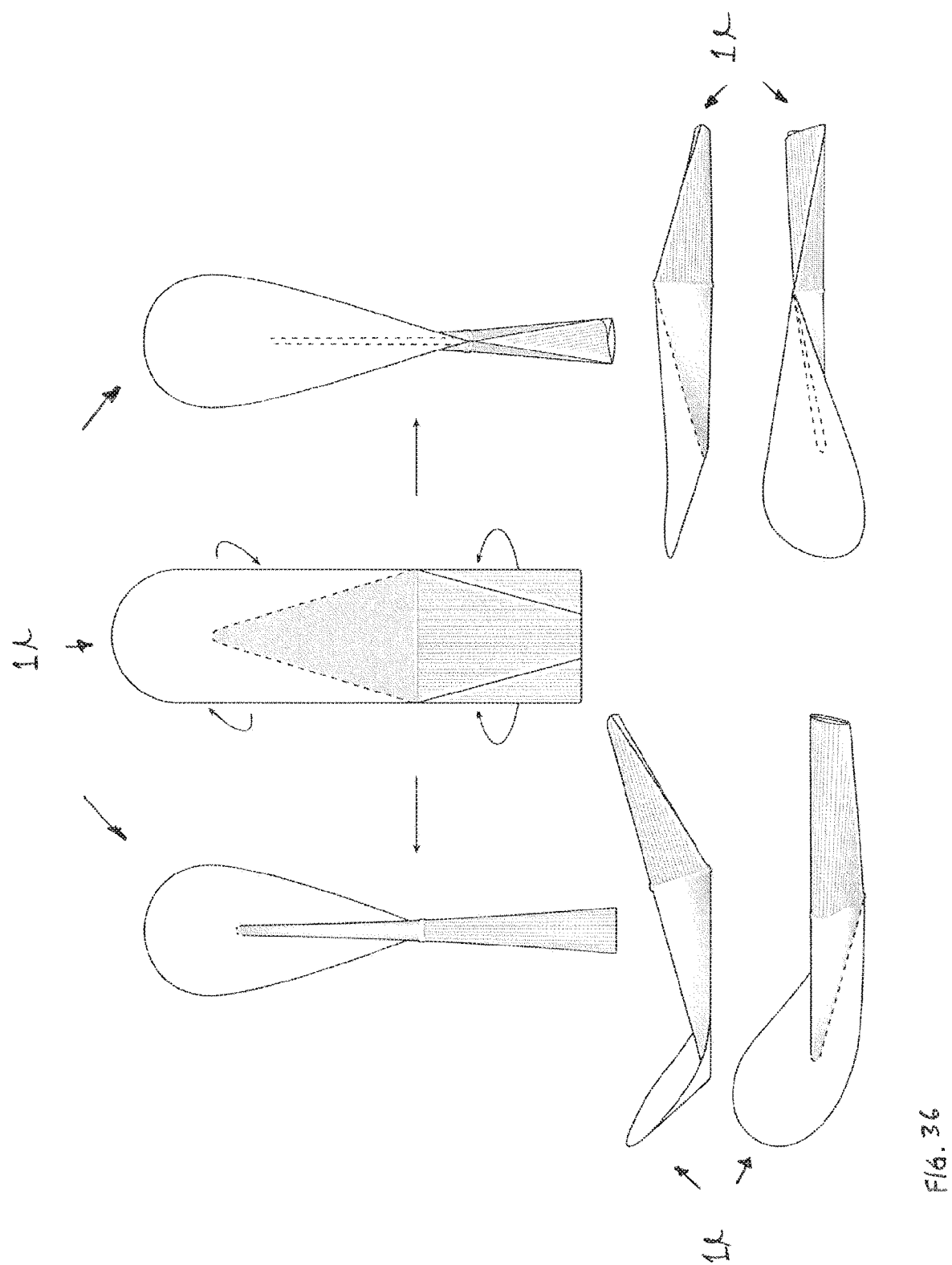

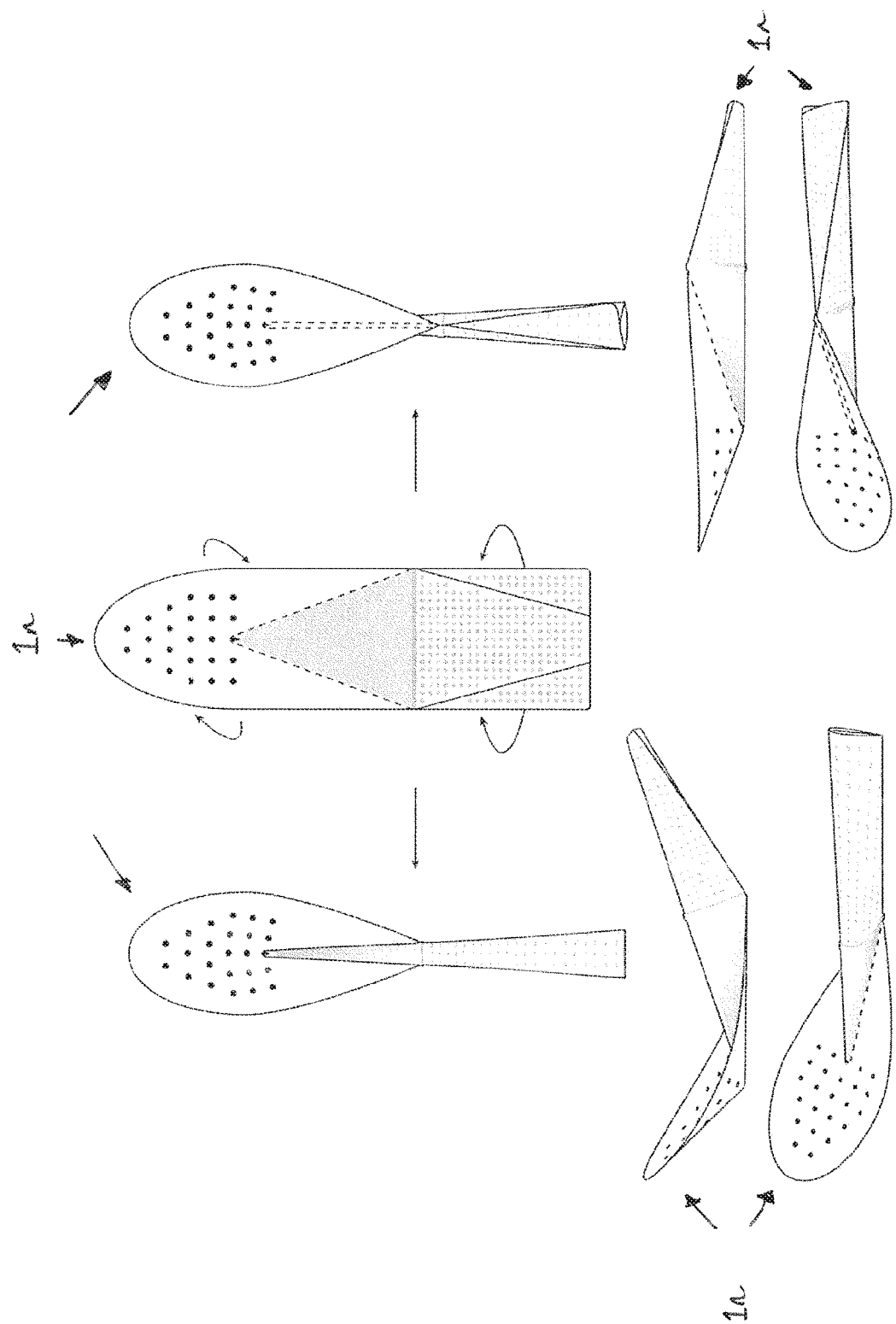

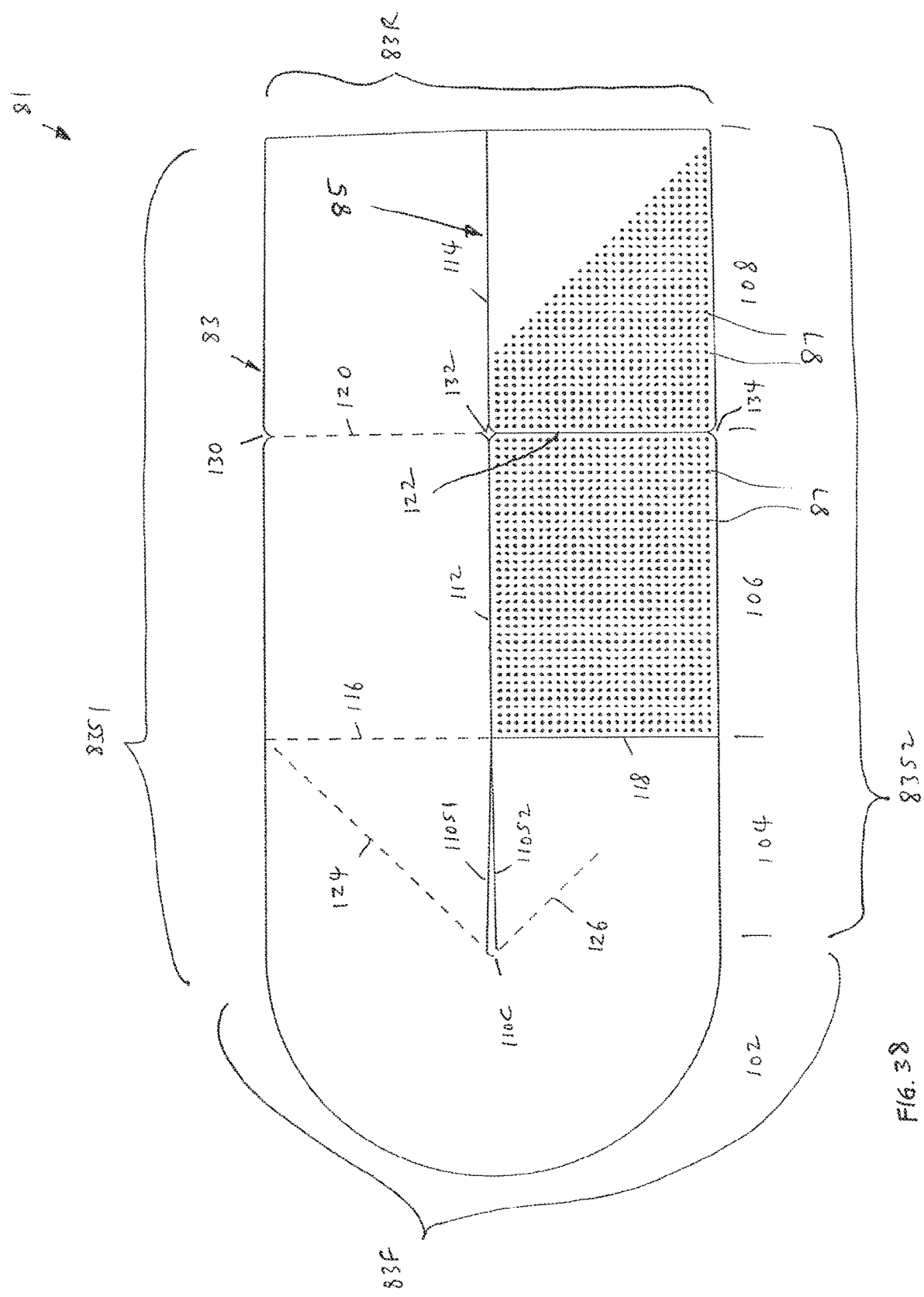

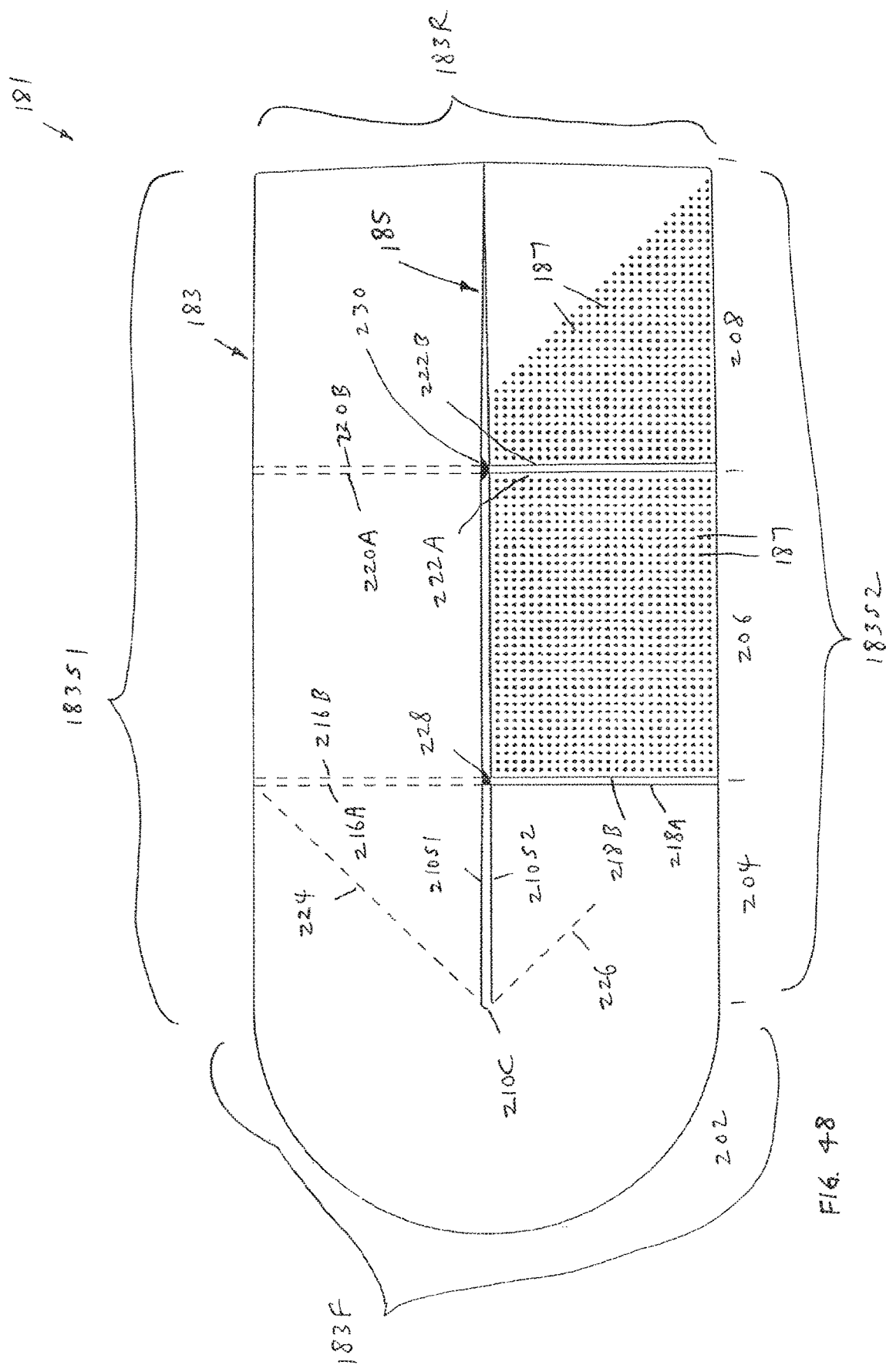

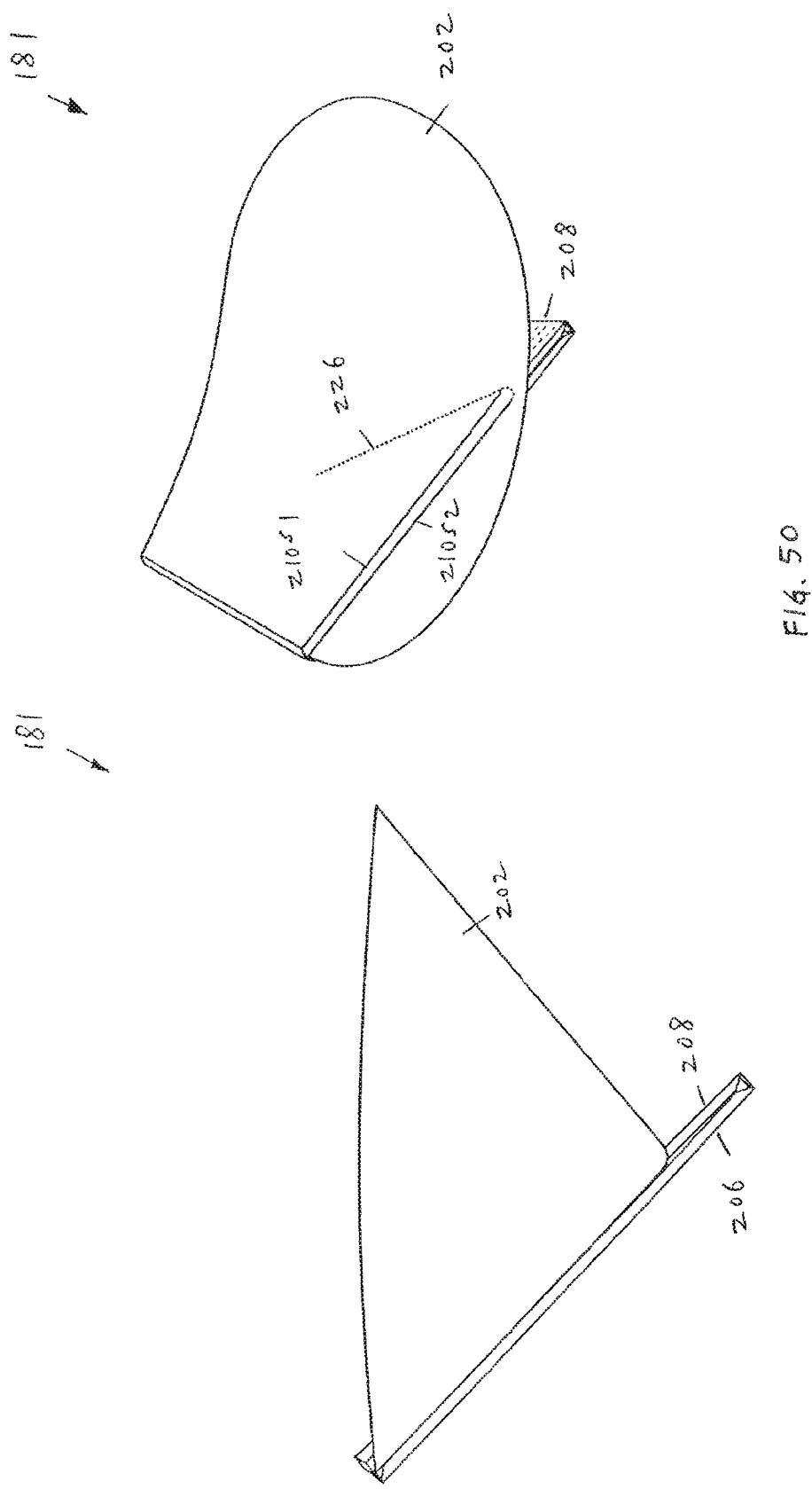

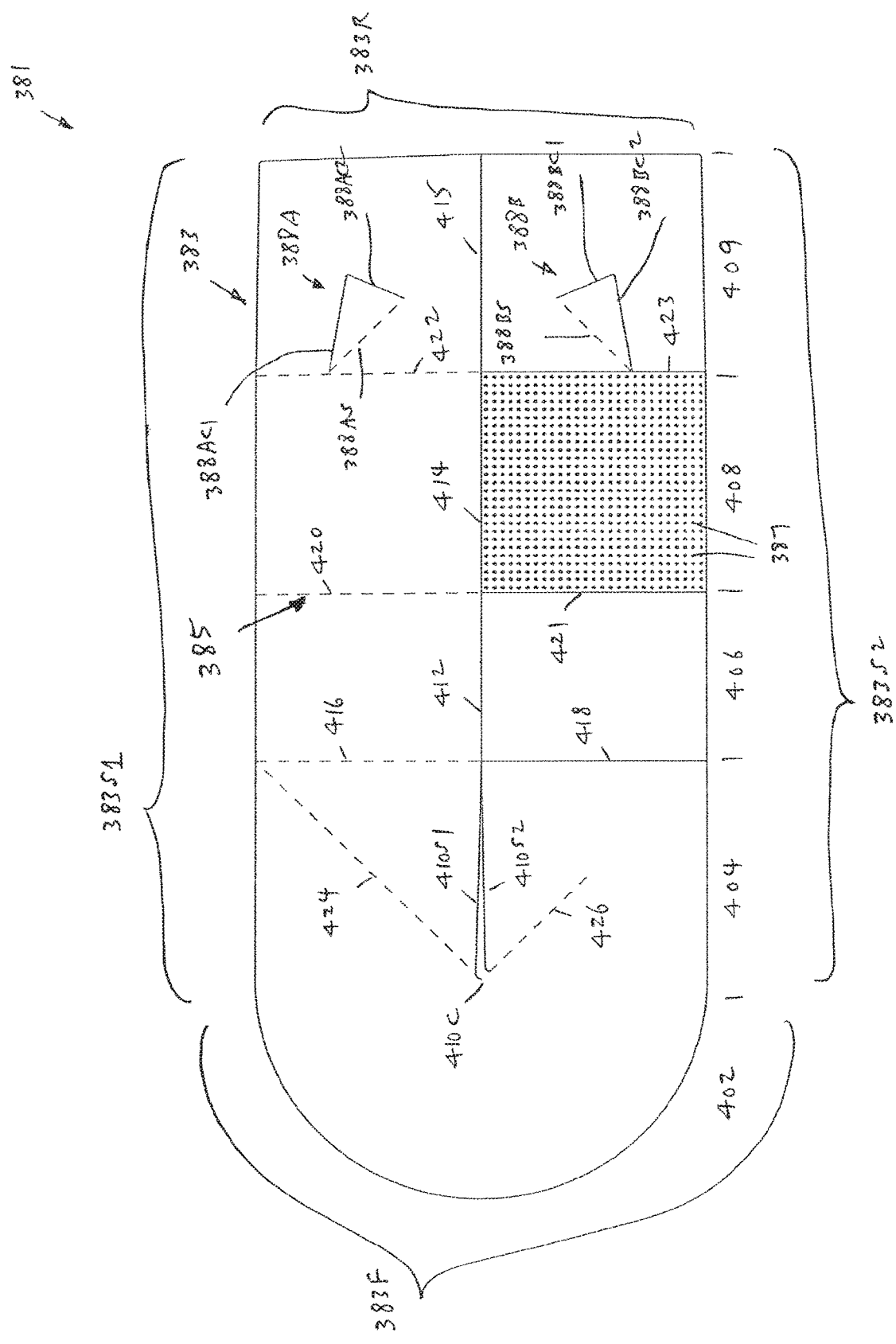

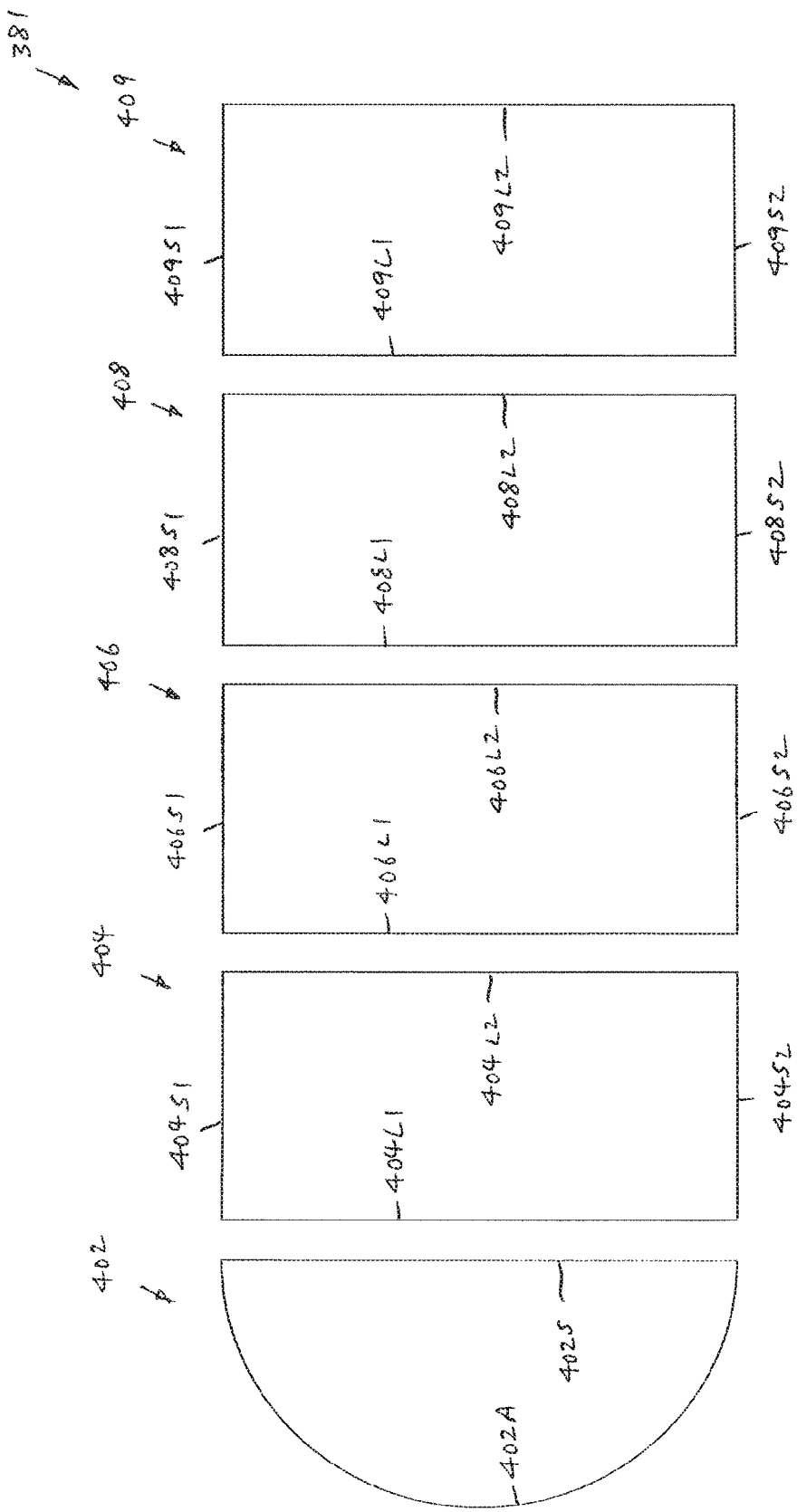

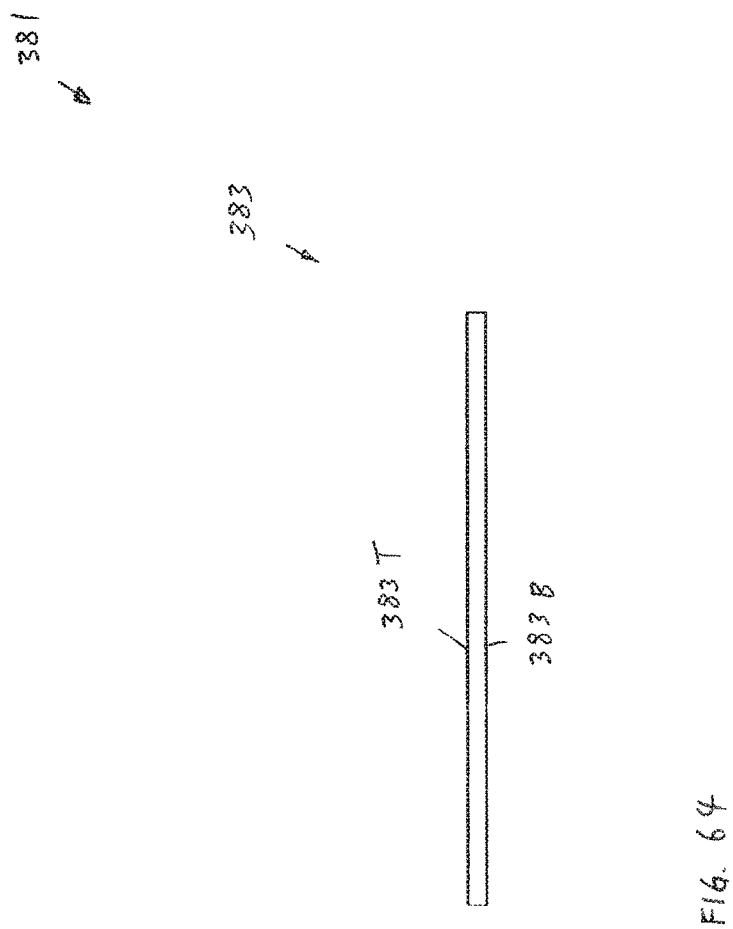

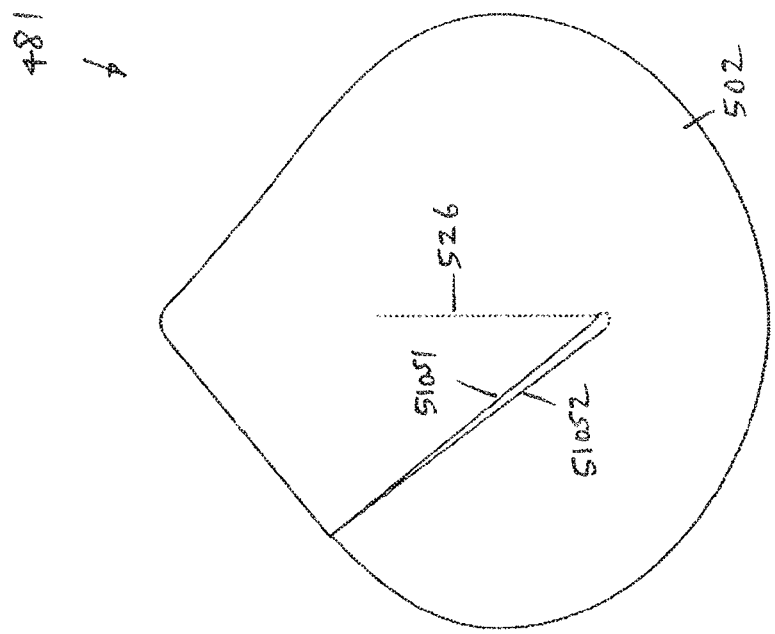
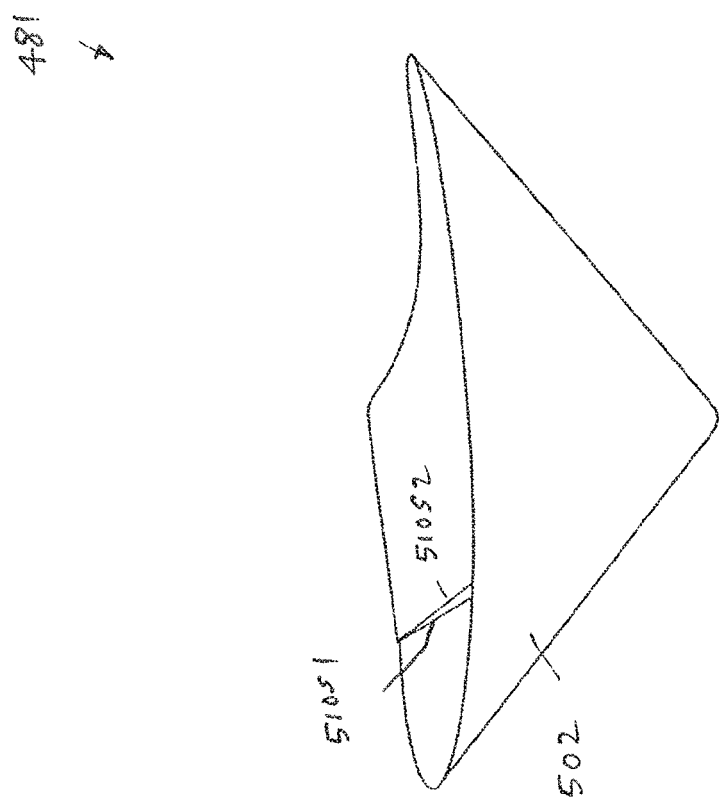

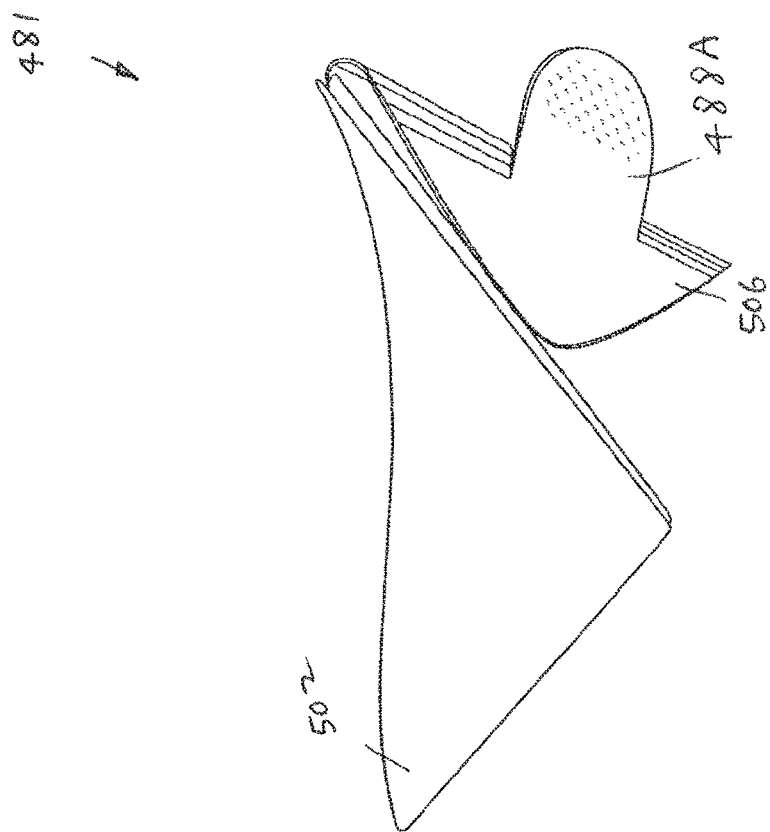
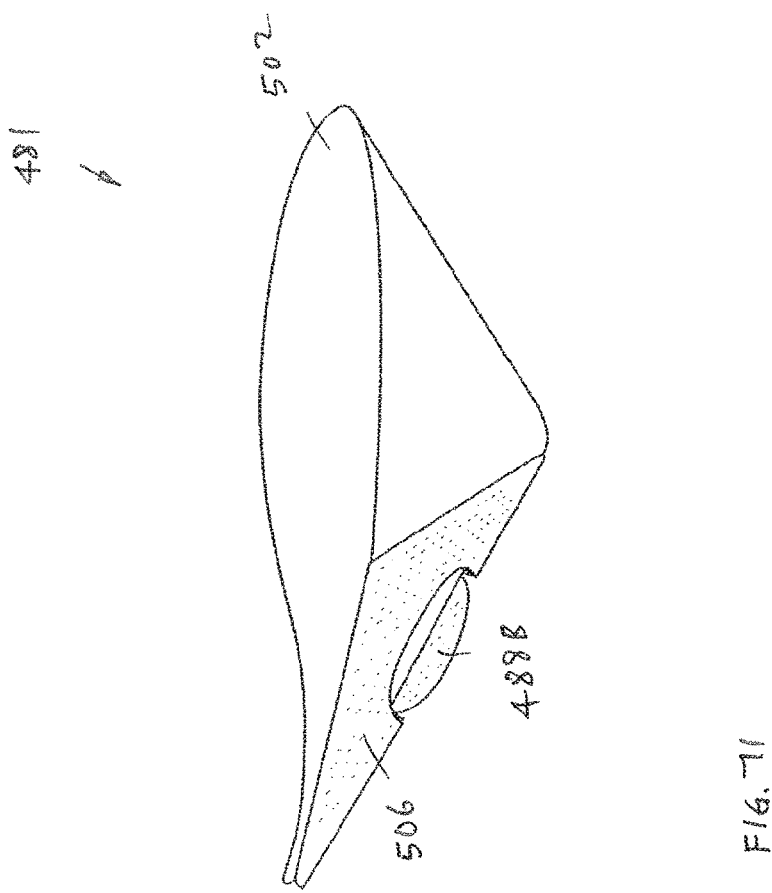

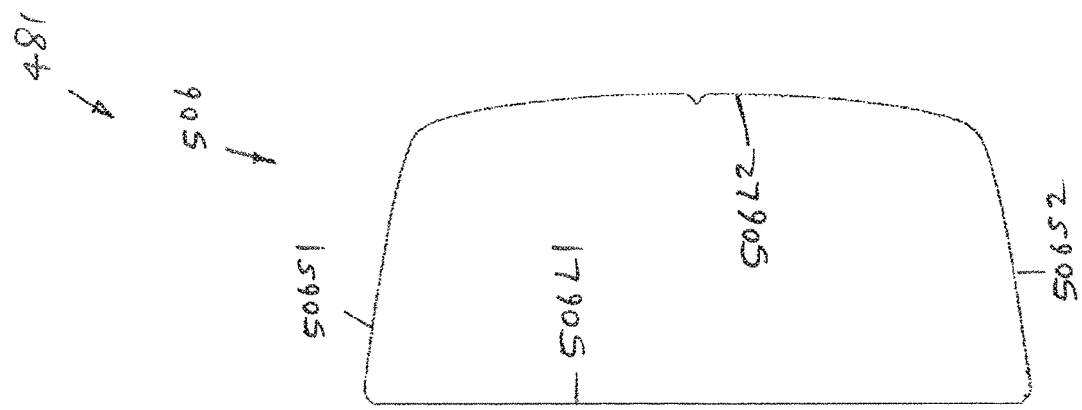
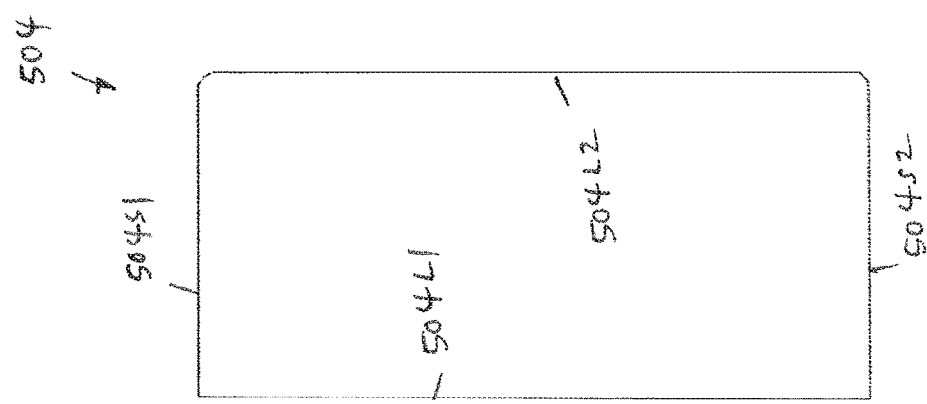
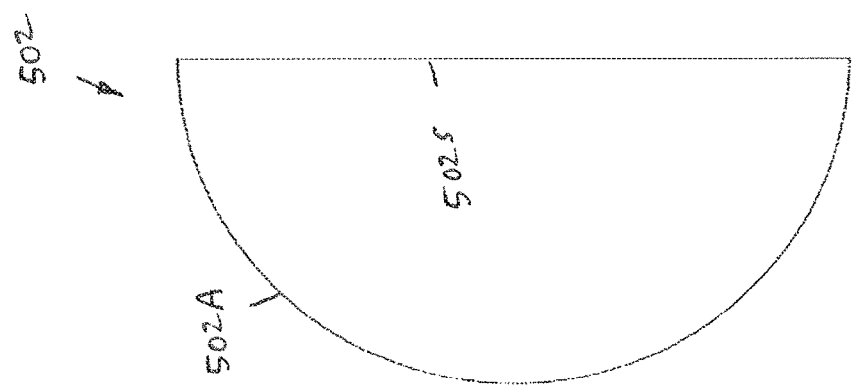
FIG. 75

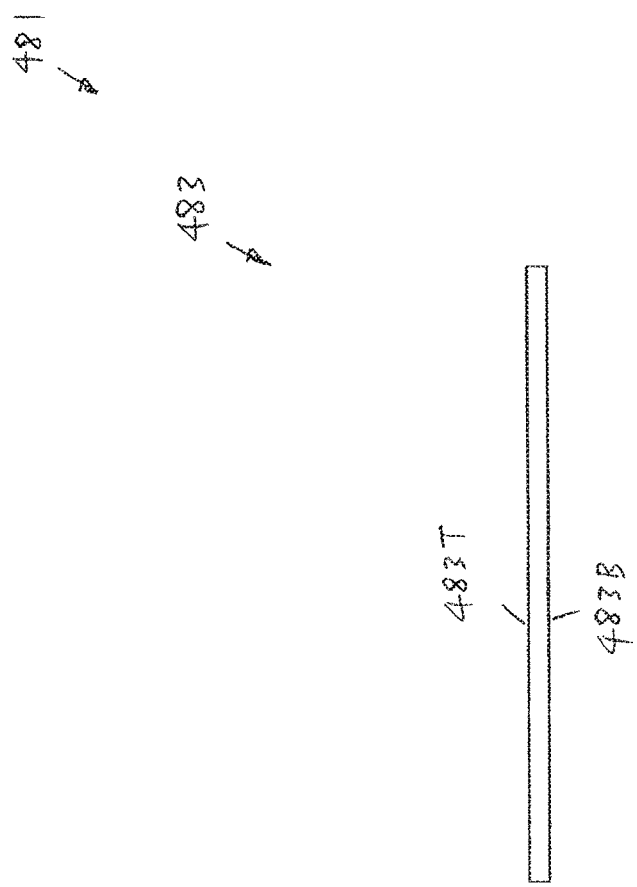

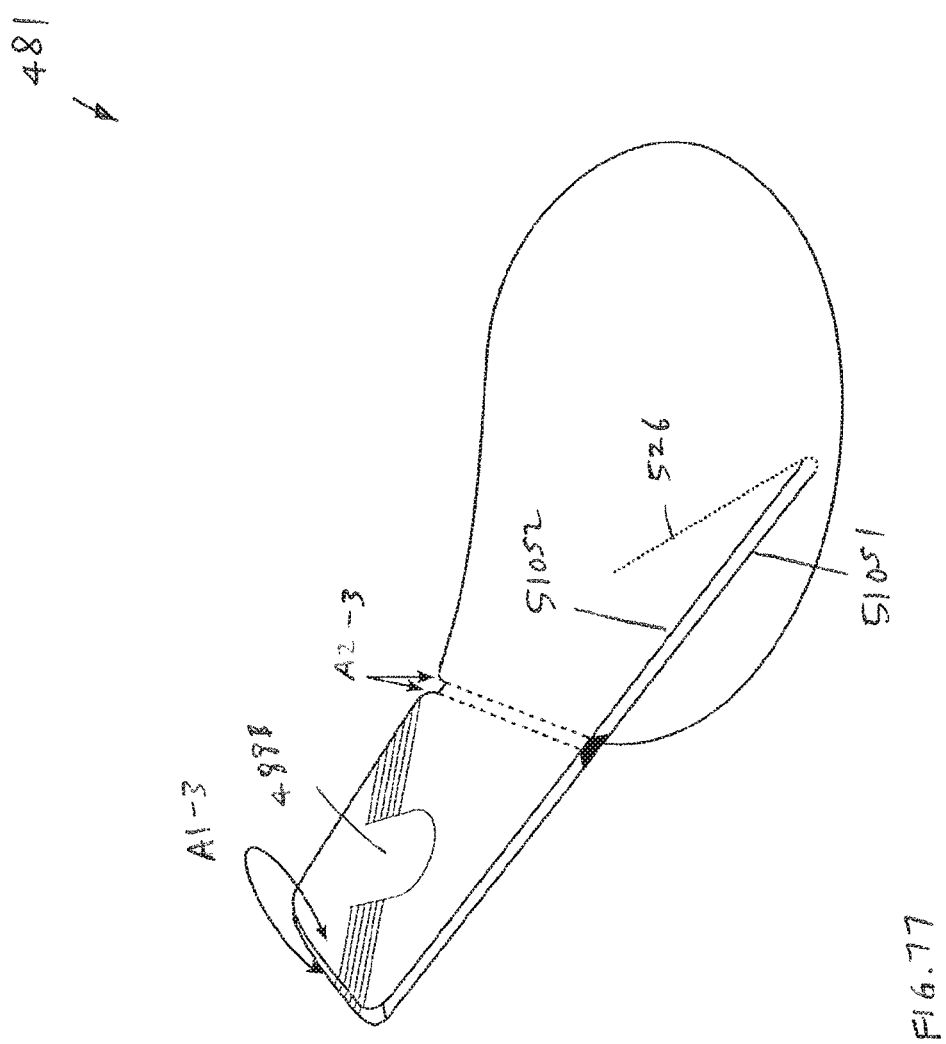

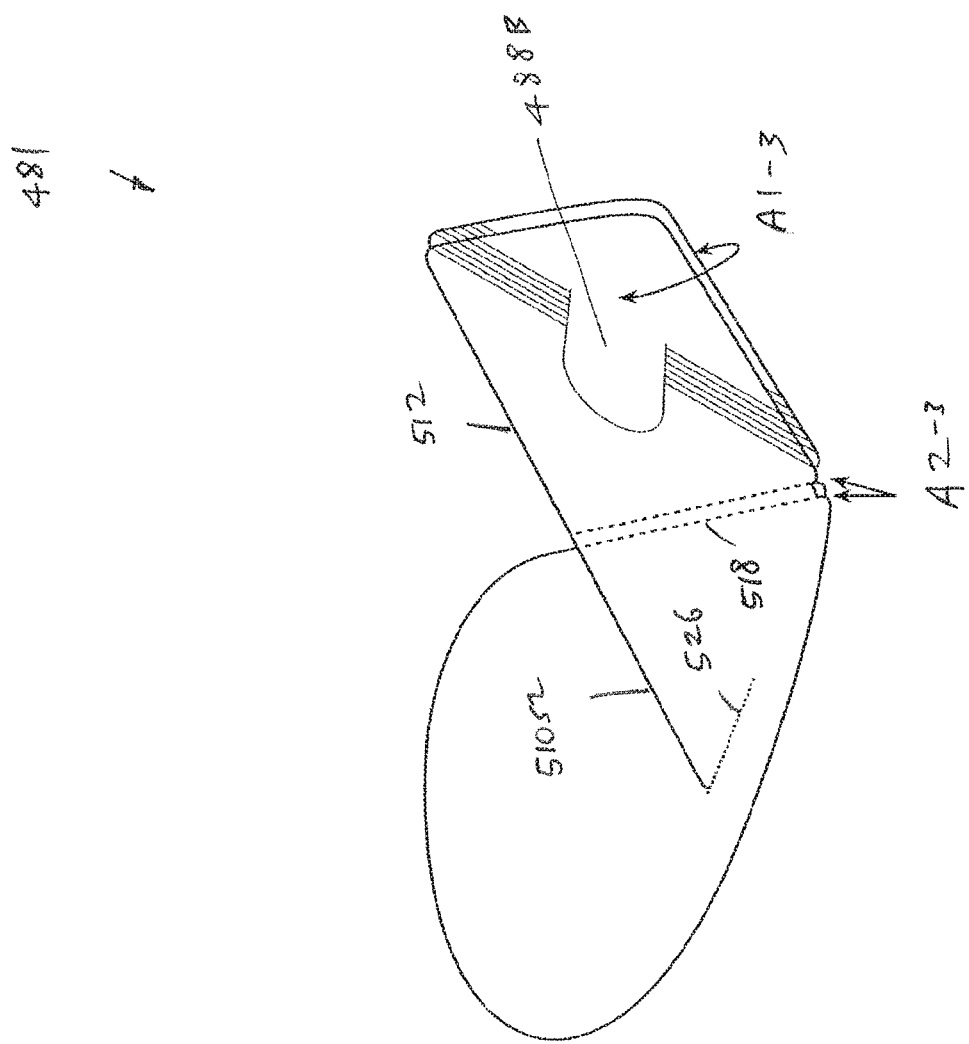

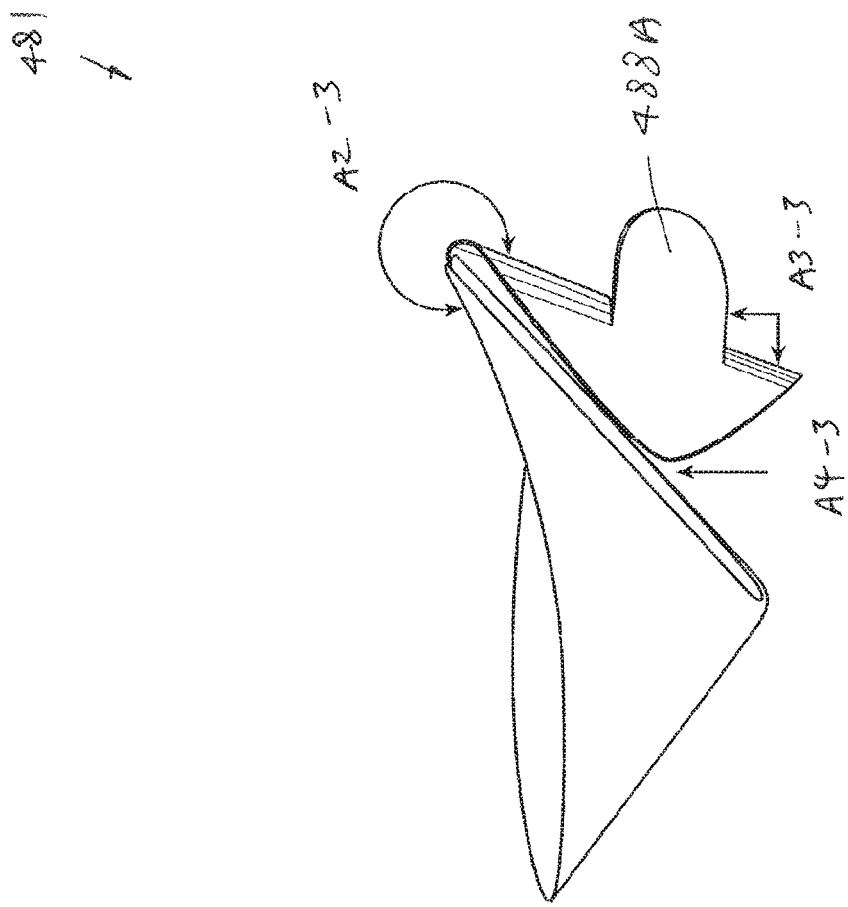

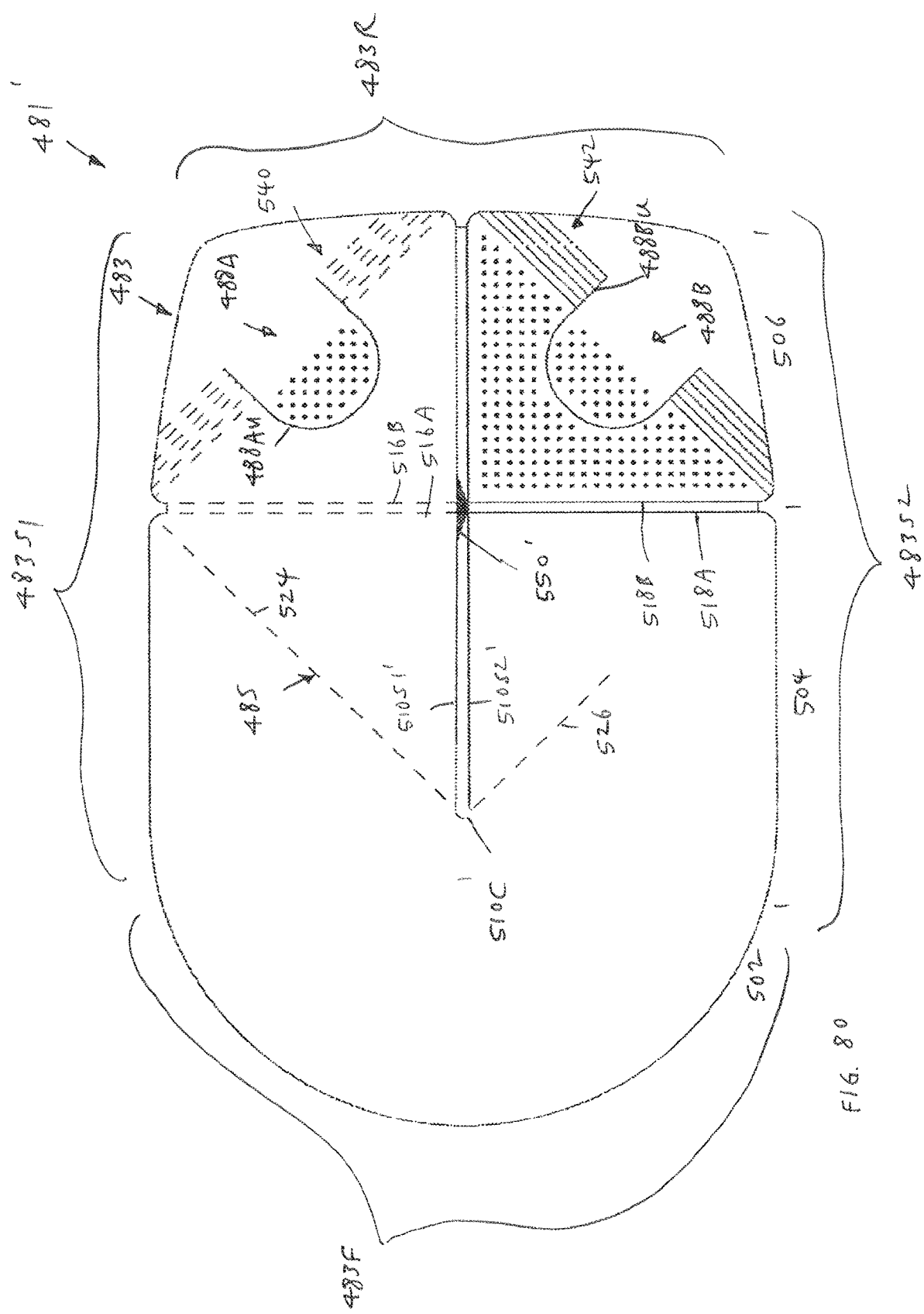

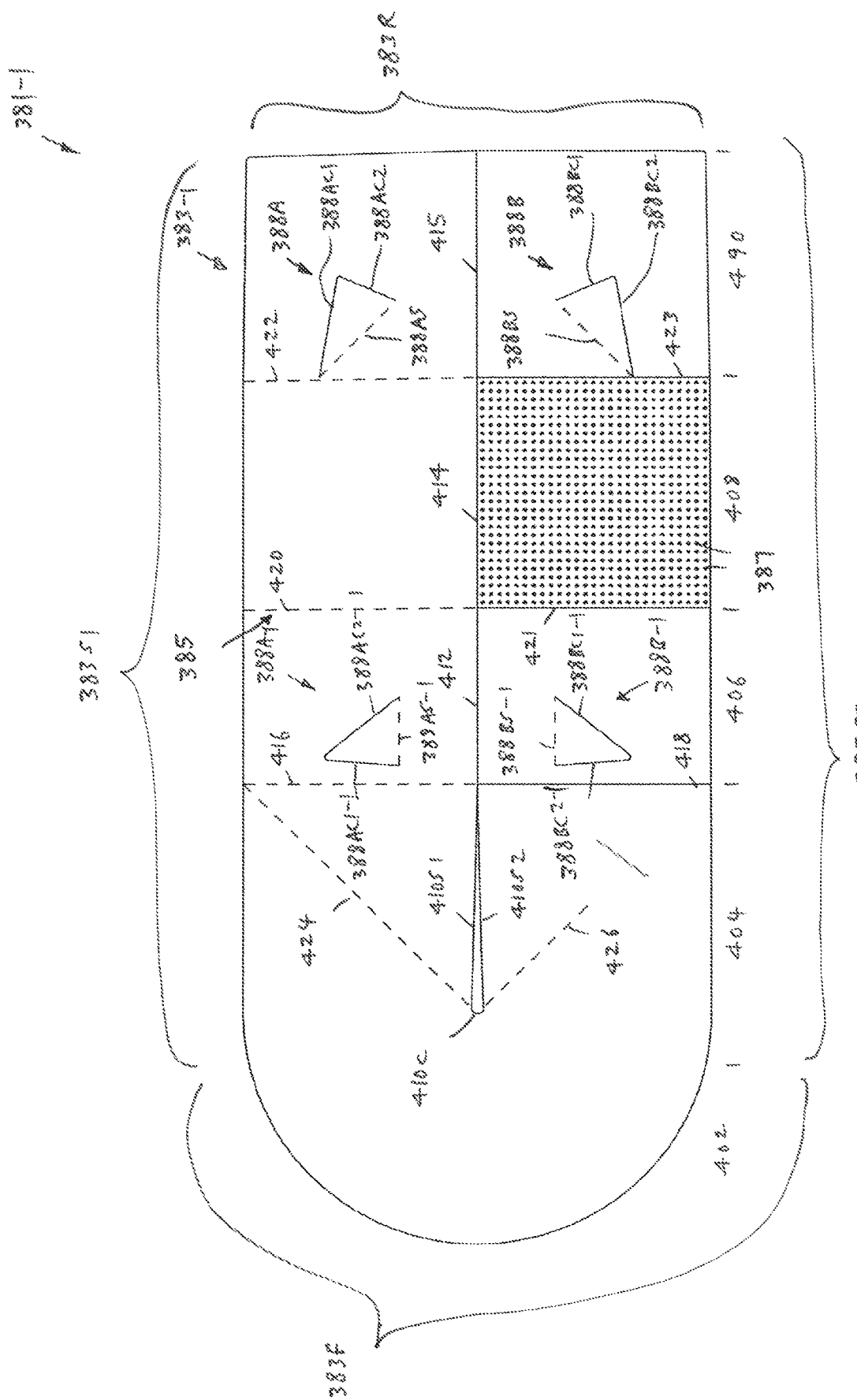

HANDHELD TOOL

The technical field of the present application generally relates to handheld tools, in particular to the forming of handheld tools or utensils from a sheet-shaped blank.

Handheld tools or utensils made of sheet-shaped materials are used in general as low-cost alternatives to tools made from bulk materials.

US 20140238987 A1 describes a foldable spoon with a spoon cup section and a spoon handle. The spoon handle, including apex folds and valley folds, and the spoon cup section are formed from a single sheet of foldable material.

Singapore Registered Designs 30201703913Y and 30201703914W relate to a spoon.

Singapore Registered Designs 30201703916PY and 30201703915R relate to a fork.

The object of the present application is to provide an improved user and environment friendly form-stable handheld tool which can be easily and cost-effectively manufactured.

According to a first aspect, a blank for forming a handheld tool is provided. The blank has a flat, elongated shape. The blank can have an essentially symmetric shape, in particular with respect to a longitudinal symmetrical axis. In the following, if not specified differently, a symmetry or symmetrical arrangement refers to a symmetry or symmetrical arrangement with respect to the symmetrical axis of the blank.

The blank comprises a top surface, a bottom surface opposite to the top surface, a first longitudinal end, a second longitudinal end, a first side end, and a second side end. A circumferential cutting edge of the blank comprises a rear edge at the first longitudinal end, a front edge at the second longitudinal end, a first side edge at the first side end and a second side edge at the second side end.

The blank further comprises at least one essentially continuous upward bending line extending between the side edges of the blank, with a first upward bending segment, a second upward bending segment, and a connecting segment. The upward bending segments extend at an oblique angle inwards from respective endpoints at the side edges of the blank, pointing along a longitudinal direction towards the front edge of the blank and providing a vertex with a blunt and at least partially rounded shape.

"Essentially continuous" means in this context that the lines may also comprise continuous sections which are separated by breaks or discontinuities.

Due to the arrangement of the upward bending line, three main sections of the blank along the longitudinal direction can be distinguished: A handle section extending from the rear edge to the endpoints of the straight segments of the upward bending lines at the side edges, a functional section extending from the tip of the front edge to the vertex, and an intermediate section between the handle section and the functional section.

The shape of the functional section may be customized and may significantly vary depending on the specific purpose of the tool and/or intention of the customer.

In particular, the functional section of the blank may have an essentially smooth or rounded contour line for forming spoons or spoon-like tools like scoops, shovels, funnels or similar.

The functional section may also have a tined contour line for forming forks or forklike tools of various geometries.

The functional section may further comprise holes or perforations of different number and size for forming strainers or filters out of the blank.

The blank further comprises a first downward bending line extending between the rear edge and the first upward bending segment, and a second downward bending line extending between the rear edge and the second upward bending segment, as well as a middle area or middle lane extending between the downward bending lines, the upward bending line, and the rear edge.

The bending lines serve as bending aids which facilitate the bending or folding of the blank in a predetermined manner, facilitating the folding of the blank to form a handheld tool with the desired form.

Due to the middle area extending between the downward bending lines, the upward bending line, and the rear edge, an elongated middle lane between the downward bending lines is formed which is free of bending lines. After the tool is formed, the middle lane contributes to the stability of the tool since, in the folded state, the middle lane forms or builds an elongated plateau between the two downwards bent portions of the blank, which serves as a carrying construction and gives a particular stability to the tool.

The blunt and at least partially rounded shape of the vertex serves for distributing the pressure from the frontal part of the tool over the perimeter of the vertex. This means that the risk of damaging the blank by the compression stress can be reduced. The risk of injuring of persons by the sharp edges at the vertex can be reduced as well.

In other embodiments, the first downward bending line extends between the rear edge and the first side edge and the second downward bending line extends between the rear edge and the second side edge in such a way that two wings at the rear edge of the blank are provided.

The corner wings at the rear edge of the blank can be used to form a comfortable handle for the handheld tool.

The downward bending lines may be arranged in such a way that a widening of the middle area at the connecting segment is provided. In particular, each one of the downward bending lines may comprise an essentially straight longitudinal segment and a curved segment, the curved segments forming the widening of the middle area or middle lane. The longitudinal arrangement of the straight segments of the downward bending lines in the region between the rear edge of the blank and the vertex provides a particularly good protection for this region which can serve as a carrying construction or spine of the tool.

The straight segments of the downward bending lines may extend to the rear edge of the blank. Extending the straight segments of the downward bending lines to the rear edge of the blank facilitates an accurate folding along the downward folding lines, especially in the region of the rear edge.

At the point or points of the rear edge where the straight segments of the downward bending lines end, one or more indentations in the rear edge can be provided.

The indentations at the end of the downwards bending lines can substantially facilitate the bending of the blank at the rear edge.

At the same time, the widening of the vertex can serve for local stress reduction in the vertex region and thus result in a more stable tool.

The angle between the first upward bending segment and the second upward bending segment may be chosen in a range of 20° to 66°, more specifically of 26° to 35°.

By choosing the angle between the upward bending segments in this range, a broad variety of customized useful tools can be formed.

Each one of the downward bending lines may meet the upward bending line at a respective junction point adjacent to the vertex.

By providing for the junction points between the downward bending lines and the upward bending line in the vicinity of the vertex, the forming of the tool out of the blank can be facilitated by improving the controlled foldability in the vertex area.

At the junction points, the angle between the upward bending line and the respective downward bending line may be essentially perpendicular or lie in the range of 60° to 90°, more specifically of 80° to 90°. Due to choosing or pre-defining the angle between the upward bending line and the respective downward bending line at the junction points, building of folds with sharp angles can be avoided, and the controllable foldability of the blank in the vertex region can be improved.

The blunt and at least partially rounded vertex may have an essentially smooth shape. In particular, the vertex may have a circular shape or a flat tip with rounded corners. The smooth shape of the vertex can smoothen the tension distribution in the blank such that local stress maxima in the vertex region can be reduced.

At least one of the bending lines may be provided by an essentially continuous bending groove formed on at least one surface of the blank.

Depending on the basic material of the blank different techniques for creating the groove can be applied.

In particular, the groove may be scored or coined in the respective surface of the blank. The grooves may also be formed by application of pressure, cutting, by laser ablation, or similar.

By scoring or coining of the grooves in the blank, the bending lines desired pattern can be easily provided.

For the downward bending lines, the groove may be provided on the top surface of the blank.

By providing the groove on the top surface of the blank, the blank can be weakened along the bending lines in such a way that the blank is particularly easily bendable or foldable downwards along the bending line.

For the upward bending line, the groove can be provided on the bottom surface of the blank.

By providing the groove on the bottom surface of the blank, the blank can be weakened along the bending lines in such way that the blank is particularly easily bendable or foldable upwards along the bending line.

The groove for the bending lines may have a rounded or essentially rectangular profile with an aspect ratio, i.e. the ratio of its depth to the width between 1 and 5, more specifically between 2 and 4. The depth of the score may be in the range of 10 to 30 percent of the thickness of the blank, depending on the chosen materials.

At least one of the bending lines may be also formed by providing, in particular by printing, an additional material layer along the predefined paths of the bending lines. By providing the additional material layer, which in general can have mechanical characteristics different from those of the basic material of the blank, the bendability of the blank can be locally modified in such way that the blank is more easily bendable in one direction than in another direction thus facilitating the bending or folding of the blank.

The profile and the exact dimensions of the groove depends in general on the chosen material, on the thickness, and on the purpose of the blank.

The blank may comprise compostable and/or recyclable materials, in particular approved or certified by the Food and Drug Administration (FDA), Sustainable Forestry Initiative (SFI), Forest Stewardship Council (FSC), American Society for Testing and Materials (ASTM) to name but a few.

In the following, a non-exhaustive list of possible materials is provided:
  FSC/SFI certified—ASTM D6868 compliant for Compostability and Recyclable. Such materials (e.g. Yupo® paper) are durable, water-repellant, tear-resistant,
  BPA (Bisphenol A)-free, latex-free, TPR (Thermoplastic Rubber) and TPE (Thermoplastic Elastomer),
  Premium food grade Silicone (SR/LSR), an elastomer, characterized by a wide temperature resistance range of −103° F. to 500° F. It is non-stick, non-toxic, highly tensile, flexible, and has a low compression set. Further, it is odorless, tasteless, mold and bacteria-resistant and hydrophobic.

The blank material can also comprise FRP (Fibreglass Reinforced Plastic), microlattice, Dyneema, Polypropylene (PP), High-Density Polyethylene (HDPE), Low-Density Polyethylene (LDPE), Polycarbonate (PC), nano-tubes to name but a few.

In particular, for a paper-based blank, the material can have a material area density in the range from 230 g/m2 to 350 g/m2.

For paper-based blank materials, the orientation of the paper grains can be chosen essentially parallel to the longitudinal direction of the blank.

Due to the longitudinal orientation of the paper grains, the robustness of the tool formed out of the blank can be increased.

At different positions, and in particular in the handle section, i.e. between the rear edge and the endpoints at the side edges of the blank, elevated portions or bumps of essentially round and/or elongated shapes can be provided.

Due to the bumps or elevated portions, the robustness of the tool can be improved. Furthermore, by providing the bumps or elevated portions in the handle section of the blank, the grip of the handle of the tool can be improved, such that the tool can be securely grasped.

The blank may have an essentially tapered shape, such that the width of the blank at the rear edge is smaller than the width of the functional section. In particular, the side edges can comprise essentially straight segments being arranged under an oblique angle with respect to the symmetrical axis in such way that the width of the blank at the rear edge is smaller than the maximum width of the functional section, in particular between the tip of the front edge and the vertex.

Such a tapered form of the blank results in general in a tool with a narrower handle and a wider functional section. At the same time, the tapered form may be used to save material during the manufacturing of the blank. In particular, in the bulk production of the blanks out of the same worksheet, cutting the blanks with alternating orientation can lead to substantial material savings in the case of tapered shape of the blank.

In some embodiments, additional bending lines are provided, essentially parallel to the bending lines. In particular, additional downward bending lines can extend in parallel to the symmetrical axis in the region of the middle lane.

By providing the additional bending lines, the bending may be shared over the plurality of the downward bending lines in such way that the bending angle at each of the bending line, and thus the stress of the blank, is reduced.

Further, a blank with an essentially flat, elongated shape for folding to form a handheld tool is provided. The blank comprises two bendable side wings, in particular in a handle section of the blank, a middle lane or middle lane region arranged along a longitudinal symmetrical axis of the blank, and a bow which partially circumvents one end of the middle lane. The bow can in particular at least partially comprise a function section or functional part of the tool which is to be formed.

The side wings and the middle lane are at least partially demarcated by downward bending lines, and the bow is demarcated from the middle lane and from the side wings by an upward bending line is such way that between the middle lane and the bow a vertex of the upward bending lines is formed. A bending of the side wings from the plane of the blank, in particular with respect to the middle lane, then results in a tensile stress along the circumference of the bow and in a compression stress in the vertex region of the bow.

In some embodiments, a middle channel or spine is formed from the middle lane or middle lane region in the course of bending of the side wings of the blank.

Due to the tensile stress and the compression stress caused by the bending of the side wings, the plane geometry of the bow is energetically not favourable, such that a mechanical fluctuation, such as a manual tilting of the tip of the bow in one or another direction from the initial plane can lead to at least partial release of the stress, thus leading to a stable three-dimensional shape of the tool.

In particular, the blank may comprise a rear edge and a tip, and the middle lane can extend in the region between the rear edge and the vertex, reaching the rear edge and/or the vertex.

The upward bending line may comprise two upward bending segments connecting endpoints at the side edges of the blank with the vertex. In particular, the upward bending segments can be formed as essentially symmetrically arranged and essentially continuous straight segments.

Due to the straight sections of the upward bending line between the endpoints and the vertex, the stress of the material introduced by bending of the blank for forming the tool can be reduced.

By simultaneously moving the side wings away from the plane of the blank, the endpoints at the side edges are moved or dragged with the side wings. This means that the endpoints leave the plane of the blank, in particular that of the middle lane, and move essentially in a plane perpendicular to the symmetrical axis of the blank, causing a deformation of the bow.

The endpoints can be useful to see whether the side wings are bent correctly by checking whether, in the state of the formed tool, the endpoints meet.

The vertex can have a smooth, at least partially rounded or piecewise rounded shape. Due to such a shape of the vertex, local tensions in the blank material as well as the risk of injuring of the user can be reduced.

The middle lane can have a widening at an end proximal to the vertex.

By widening the middle lane at the vertex, the middle lane provides a wide support for the vertex to withstand the compression stress from the side of the bow.

In particular, due to the widening of the middle lane at the vertex and due to the blunt or rounded shape of the vertex, the pressure from the frontal part of the bow is distributed over the perimeter of the vertex in such way that the risk of damaging the blank by the compression stress in the vicinity of the vertex is reduced.

The blank, especially the side wings of the blank, may be equipped with magnets. In particular, stripes of magnetic material can be laminated on or embedded in the side wings of blank.

The magnets in the side wings can keep the side wings together or in a folded state even if the tool is not actually in use and hence no bending force is applied by the user.

According to another aspect, a process for manufacturing a blank for forming a handheld tool is provided. This process comprises providing a flat sheet of workpiece of worksheet.

For the worksheet, any material can be used which is suitable for the manufacturing process according to the aspect, and which is in particular suitable for usage according to any purpose of the tool which is to be formed out of the blank.

The worksheet can in particular be paper-based, silicone-based, metal-based, or similar.

In particular, the worksheet can comprise compostable and/or recyclable FDA-approved food-safe materials, including but not limited to paper, especially with an area density in the range from 230 g/m2 to 350 g/m2.

The process further comprises providing bending aids in the form of downward bending lines and in the form of at least one upward bending line at predefined positions of the workpiece of the workpiece, as well as cutting the workpiece according to a predefined pattern in such way that a blank of essentially symmetric elongated shape is cut out. By folding of the blank which along the upward bending line and along the downward bending lines a handheld tool of predetermined shape is formed.

For cutting out of the blank out of the workpiece, a die-cutting processes may be used. The die-cutting process is especially suitable for cutting many pieces of the same shape by using die-cutting tools.

The bending lines may be formed by providing surface grooves by scoring or coining of the worksheet. For cutting out the blank and/or for providing of the grooves laser cutting may be used. By using the laser cutting, the cutting pattern can be easily adjusted or modified.

Coining the grooves is especially suitable for mass production of blanks with fixed design.

By cutting out blanks with alternating orientation from the same worksheet a substantial amount of the worksheet material can be saved in the case of blanks with tapered shape.

The workpiece may comprise paper with a grain-orientation which is essentially parallel to the longitudinal axis of the blanks.

Due to the longitudinal orientation of the paper grains, robustness of the tool formed out of the blank can be improved.

The process may further comprise formation of elevated portions in the blank. The elevated portions or bumps can serve for additional robustness of the handheld tool and can also improve the grip for grasping and holding by the user. The bumps can be coined or blind embossed in the blank. Thus, the bumps can be easily formed.

The process may further comprise providing a reinforcement in the form of one or more reinforcement layers of the blank. In particular, the reinforcement layer can comprise silicon, metal or plastic provided at critical areas of the blank which are exposed to the stress during forming or usage of the tool.

The reinforcement may comprise an embedded layer, i.e. a material layer which is embedded in the worksheet material. The reinforcement layer may comprise a moulded, in particular an extrusion-moulded, silicone layer.

The reinforcement may comprise one or more embossed structures, similar to those of the bumps formed in the blank.

The process may further comprise providing colour marking of the blank. In particular, the colour marking can be used for marking the folding lines as well as the functional sections for ease of usage.

The process may be carried out as a batch process in which two or more blanks are produced out of one workpiece.

By using a batch or bulk process, the time and material needed for manufacturing the blank can be reduced.

In particular, in a batch process the blanks may be produced from the workpiece in such an arrangement that the blanks are parallel to each other while adjacent blanks are oriented in opposite directions.

Due to such arrangement, in the case of blanks with tapered shape, more blanks can be accommodated side by side on the same area of the workpiece.

According to another aspect, a handheld tool is provided which is formed by folding the blank according to the first aspect.

The particular shape and dimensions may vary depending on the specific design and purpose of the tool, as well as on the chosen materials.

In particular, dependent on the specific design of the blank, different kinds of spoons may be formed, like teaspoons, coffee spoons, dessert spoons, salad spoons, tasting spoons, soup spoons, big spoons to name but a few. Similarly, a vast variety of kitchen utensils or fork-like tools can be formed by designing the blank accordingly.

By changing the bending direction of the functional part, "reverse spoons" may be formed which can be used as a funnel or utensil for soft-foods such as yogurt, sorbet, soya bean curd to name but a few. Such reversed tools are also characterized by robustness and form-stability, since an energetically favourable stable configuration can also be achieved when the front portion of the functional section is bent in the same direction with respect to the plan of the middle lane as the side wings.

The application provides a blank for forming a handheld tool. In other words, the blank can be folded to form a desired handheld tool. One example of the handheld tool is a cup. In a general sense, the cup can also refer to a bowl, a container, or a scoop.

The blank includes a flat and elongated sheet.

The flat and elongated sheet comprises two opposing major surfaces, namely a top surface with a bottom surface.

The sheet also includes a first longitudinal end and a second longitudinal end as well as a first side end and a second side end. The first longitudinal end is located opposite to the second longitudinal end. The first side end is located opposite to the second side end.

The sheet also comprises a circumferential edge. The circumferential edge comprises a rear edge being provided at the first longitudinal end, a front edge being provided at the second longitudinal end, a first side edge being provided at the first side end, and a second side edge being provided at the second side end.

Furthermore, the flat and elongated sheet includes a partial stadium-shaped portion.

Referring to the partial stadium-shaped portion, it comprises a circular upward bending line, a first straight downward bending line, and a second straight downward bending line.

A first end of the circular upward bending line is placed to next a first end of the first straight downward bending line while a second end of the circular upward bending line is placed to next to a first end of the second straight downward bending line. A second end of the first straight downward bending line is placed next to a second end of the second straight downward bending line.

Functionally, this arrangement of the circular upward bending line, the first straight downward bending line, and the second downward straight bending line allow the partial stadium-shaped portion to bend for forming a container portion of a cup of the handheld tool.

The container portion has a cone portion. The circular bending line provides the cone portion with a blunt vertex. In the words, the blunt vertex acts to increase durability of the container and it does not cut a user of the container portion of the handheld tool.

The flat and elongated sheet often include a rectangular portion.

The rectangular portion comprises at least one longitudinal downward bending line, at least one lateral upward bending line with at least one corresponding lateral downward bending line.

In detail, the longitudinal downward bending line, the lateral upward bending line, and the lateral downward bending line are often straight.

The longitudinal downward bending line extends or stretches from the rear edge towards the direction of the front edge.

The lateral upward bending line extends from the longitudinal downward bending line to the first side edge while the lateral downward bending line extends from the longitudinal downward bending line to the second side edge. The lateral upward bending line is also aligned to the corresponding lateral downward bending line.

Functionally, the longitudinal downward bending line, the lateral upward bending line, and the lateral downward bending line are arrangement such that they allow the rectangular portion to bend, wherein the rectangular portion bends to form a handle portion of the handheld tool.

The upward bending line often includes a scored line that is provided on the bottom surface of the blank. The scored line refers to a narrow hollow channel, to a bending groove, or to a narrow elongated depressed area for facilitating bending or folding of the blank to form a desired handheld tool. The depth and the width of the scored line are often adapted according to material, to thickness, and to purpose of the blank.

Similarly, the downward bending line can include a scored line that is provided on the top surface.

The rectangular portion can include one or more pairs of flap part die cut lines. These cut lines allow parts of the blank to bend. In use, the parts are bent such that these parts act as flap parts to support a side part of the container portion.

In one implementation, the rectangular portion further comprising just one pair of cut lines.

In another implementation, the rectangular portion includes two pairs of cut lines.

The straight longitudinal downward bending line can include one straight longitudinal downward bending line segment. This is often provided for a blank that is thin.

The straight longitudinal downward bending line can also include two straight longitudinal downward bending line segments, which are provided close to each other. This is often provided for a blank that is thick. The dual bending line segments allow the thick blank to bend easily.

The straight lateral upward bending line can include just one straight lateral upward bending line segment while the straight lateral downward bending line include just one corresponding straight lateral downward bending line segment. These two line-segments allow the blank to bend for forming the handle portion of the handheld tool.

Alternatively, the straight lateral upward bending line can include two straight lateral upward bending line segments while the straight lateral downward bending line include two corresponding straight lateral downward bending line segments.

In one implementation, the two-straight lateral upward bending line segments are provided close to each other while the two-corresponding straight lateral downward bending line segments are also provided close to each other. This arrangement is often provided for a thick blank, wherein these line segments allow the thick blank to bend easily.

In another implementation, the two-straight lateral upward bending line segments are provided far from each other while the two-corresponding straight lateral downward bending line segments are also provided far from each other. This arrangement allows an elongated part of the blank to bend at two parts of the blank for forming the handle portion of the blank.

The blank can include an indentation that is provided at an intersection between the straight lateral upward bending line and the corresponding straight lateral downward bending line. The indentation acts to contain material thickness of the blank. When the blank is bent, the bent area often enlarges, especially in corners. This enlarging can deter the bending of the blank. The indentation serves to receive the enlarged area to allow for easier bending of the blank.

The indentation often has a trapezoid shape which is effective for receiving the above described enlarged area of the blank.

The blank often includes a first straight upward bending line segment and a second straight upward bending line segment.

The first straight upward bending line segment extends from the circular upward bending line to the first side edge. Similarly, the second straight upward bending line segment extends from the circular upward bending line towards the direction of the second side edge.

The first straight upward bending line segment and the second straight upward bending line segment allow easier bending of the partial stadium-shaped portion for forming the container portion of the handheld tool.

The blank can include silicon material or a food-grade paper material, although other materials are also possible.

The application provides a handheld tool that is formed by folding the above described blank.

The application provides a moulded blank for forming a handheld tool, namely a spoon or spade. The moulded blank includes two generally flat portions which are separated by a predetermined distance.

The moulded blank is shaped or formed by a process using pressure. The process can include a heating and/or drying step. An example of the process is pulp moulding.

In detail, the moulded blank includes an elongated sheet.

The elongated sheet includes a top surface and a bottom surface being provided opposite the top surface. The sheet also includes a first longitudinal end and a second longitudinal end being provided opposite the first longitudinal end, a first side end and a second side end being provided opposite the first side end.

The elongated sheet also includes a circumferential edge that comprises a rear edge being provided at the first longitudinal end, a front edge being provided at the second longitudinal end, a first side edge being provided at the first side end, and a second side edge being provided at the second side end.

The elongated sheet also includes a bending cum connecting strip extending between the two opposing side edges of the blank. The bending cum connecting strip including a first strip segment, a second strip segment, and a connecting strip segment.

The first strip segment and the second strip segment extend at an oblique angle inwards from respective endpoints at the side edges of the blank, pointing along a longitudinal direction towards the front edge of the blank. The connecting strip segment serving as a blunt vertex, which has at least partially rounded shape.

The elongated sheet also includes a first downward bending line extending between the rear edge and the first strip segment and a second downward bending line extending between the rear edge and the second strip segment.

The bending cum connecting strip and the front edge enclose a first generally flat portion while the bending cum connecting strip and the rear edge enclose a second generally flat portion.

The first flat portion is provided in a first plane, while the second generally flat portion is provided in a second plane. The second plane is separated from the first plane by a predetermined distance.

This separation allows for easier folding of the blank to form a tool. The separation allows the user to bend the bank for forming a spoon in one movement by just pressing the sides of the bank toward each other.

The application provides a further moulded blank for forming a handheld tool, namely a spoon or spade. The moulded blank includes two generally flat portions. One flat portion is bent to serve as a container portion and the other flat portion is bent to serve as a handle portion of a spoon.

In detail, the moulded blank includes an elongated sheet.

The elongated sheet includes a top surface and a bottom surface being provided opposite the top surface. The sheet also includes a first longitudinal end and a second longitudinal end being provided opposite the first longitudinal end, a first side end and a second side end being provided opposite the first side end.

The elongated sheet also includes a circumferential edge that comprises a rear edge being provided at the first longitudinal end, a front edge being provided at the second longitudinal end, a first side edge being provided at the first side end, and a second side edge being provided at the second side end.

The elongated sheet also includes a bending cum connecting strip extending between the two opposing side edges of the blank. The bending cum connecting strip including a first strip segment, a second strip segment, and a connecting strip segment.

The first strip segment and the second strip segment extend at an oblique angle inwards from respective endpoints at the side edges of the blank, pointing along a longitudinal direction towards the front edge of the blank. The connecting strip segment serving as a blunt vertex, which has at least partially rounded shape.

The elongated sheet also includes a first downward bending line extending between the rear edge and the first strip segment and a second downward bending line extending between the rear edge and the second strip segment.

The bending cum connecting strip and the front edge enclose a first generally flat portion while the bending cum connecting strip and the rear edge enclose a second generally flat portion.

The first flat portion is bent to serve as a container portion and the second flat portion is bent to serve as a handle portion of a spoon.

The shape of the moulded blank allows for easier folding of the blank to form a tool. The shape allows the user to bend the bank for forming a spoon in one movement by just pressing the sides of the bank toward each other.

The blank can include one or more other features described above.

The subject matter of the application is described in greater detail in the accompanying Figures, in which FIG. 1 shows a schematic top view of a blank for folding to form a handheld tool according to an embodiment, FIG. 2 shows a cross-sectional view of the blank of FIG. 1, which is taken along a line AA of FIG. 1, FIG. 3 shows a schematic top view of a blank for folding to form a handheld tool according to another embodiment, FIG. 4 shows a schematic top view of a blank for folding to form a handheld tool according to a further embodiment, FIG. 5 shows a cross-sectional view of the blank of FIG. 4, which is taken along a line BB of FIG. 4, FIG. 6 shows a schematic top view of a blank for folding to form a handheld tool according to another embodiment, FIG. 7 shows a cross-sectional view of the blank of FIG. 6, which is taken along a line CC of FIG. 6, FIG. 8 shows a schematic top view of a blank for folding to form a handheld tool according to further embodiment, FIG. 9 shows a cross-sectional view of the blank of FIG. 5, which is taken along a line DD of FIG. 9, FIG. 10 shows a schematic top view of a blank for folding to form a handheld tool according to another embodiment, FIG. 11 shows a schematic top view of a blank for folding to form a handheld tool according to another embodiment, FIG. 12 shows a schematic top view of a blank for folding to form a handheld tool according to a further embodiment, FIG. 13 shows a schematic top view of a blank for folding to form a handheld tool according to another embodiment, FIG. 14 shows a schematic top view of a blank for folding to form a handheld tool according to a further embodiment, FIG. 15 shows a schematic top view of a blank for folding to form a handheld tool according to another embodiment, FIG. 16 shows a cross-sectional view of the blank of FIG. 15, which is taken along a line EE of FIG. 15, FIG. 17 shows a cross-sectional view of a variant of the blank of FIG. 15, FIG. 18 shows a cross-sectional view of another variant of the blank of FIG. 15, FIG. 19 shows a schematic top view of a blank for folding to form a handheld tool according to a further embodiment, FIG. 20 shows a schematic top view of a blank for folding to form a handheld tool according to another embodiment, FIG. 21 shows a schematic top view of a blank for folding to form a handheld tool according to still another embodiment, FIG. 22 shows a schematic top view of a blank for folding to form a handheld tool according to a further embodiment, FIG. 23 shows schematically a possible panel arrangement for producing a blank according an embodiment, FIGS. 24 to 37 show different embodiments of the blank in its initial and in its folded state from different views, FIG. 38 shows a schematic top view of a thin blank that is flat, the blank being intended for folding to form a cup with a handle, FIG. 39 shows a front view of a cup with a handle, the thin blank of FIG. 38 being folded to form the cup, FIG. 40 shows a first perspective view of the cup of FIG. 39, FIG. 41 shows a side view of the cup of FIG. 39, FIG. 42 shows a second perspective view of the cup of FIG. 39, FIG. 43 shows parts of the thin blank of FIG. 38, FIG. 44 shows a side view of the thin blank of FIG. 38, FIG. 45 shows a perspective view of the thin blank of FIG. 38, which is folded along a longitudinal-scored line to form the cup of FIGS. 39 to 42, FIG. 46 shows a front view of the thin blank of FIG. 38, FIG. 47 shows the thin blank of FIGS. 45 and 46, which is further folded to form the cup of FIGS. 39 to 42, FIG. 48 shows a schematic top view of a thick blank that is flat, the blank being intended for folding to form a cup with a handle, FIG. 49 shows a front view of a cup with a handle, the thin blank of FIG. 48 being folded to form the cup, FIG. 50 shows a first perspective view of the cup of FIG. 49, FIG. 51 shows a side view of the cup of FIG. 49, FIG. 52 shows a second perspective view of the cup of FIG. 49, FIG. 53 shows parts of the thick blank of FIG. 48, FIG. 54 shows a side view of the thick blank of FIG. 48, FIG. 55 shows a perspective view of the thick blank of FIG. 48, which is folded along a longitudinal-scored line to form, the cup of FIGS. 49 to 52, FIG. 56 shows a front view of the thick blank of FIG. 55, FIG. 57 shows the thick blank of FIGS. 55 and 56, which is further folded to form the cup of FIGS. 49 to 52, FIG. 58 shows a schematic top view of a thin blank that is flat, the blank is intended for folding to form a cup with a stand, FIG. 59 shows a front view of a cup with a stand, the blank of FIG. 58 being folded to form the cup, FIG. 60 shows a side view of the cup of FIG. 59, FIG. 61 shows a front perspective view of the cup of FIG. 59, FIG. 62 shows a second perspective view of the cup of FIG. 59, FIG. 63 shows parts of the blank of FIG. 58, FIG. 64 shows a side view of the blank of FIG. 58, FIG. 65 shows a perspective view of the thin blank of FIG. 58, which is folded along a longitudinal-scored line to form the cup of FIGS. 59 to 62, FIG. 66 shows a front view of the thin blank of FIG. 65, FIG. 67 shows the thin blank of FIGS. 65 and 66, which is further folded for forming the cup of FIGS. 59 to 62, FIG. 68 shows a schematic top view of a thin blank that is flat, the blank is intended for folding to form a cup without a handle, FIG. 69 shows a front view of a cup that is formed with the thin blank of FIG. 68, FIG. 70 shows a perspective view of the cup of FIG. 69, FIG. 71 shows a first side view of the cup of FIG. 69, FIG. 72 shows a second side view of the cup of FIG. 69, FIG. 73 shows a back view of the cup of FIG. 69, FIG. 74 shows the second side view of the cup of FIG. 69, FIG. 75 shows parts of the thin blank of FIG. 68, FIG. 76 shows a side view of the thin blank of FIG. 68, FIG. 77 shows a front view of the thin blank of FIG. 68, which is folded along a longitudinal-scored line for forming the cup of FIGS. 69 to 74, FIG. 78 shows a back view of the thin blank of FIG. 77, FIG. 79 shows the thin blank of FIGS. 77 and 78, which is being further folded to form the cup, and FIG. 80 shows a variant of the blank of FIG. 68, FIG. 81 shows a schematic top view of a further thin blank, which is a variant of the blank of FIG. 81, FIG. 82 shows a front view of a cup with a stand, the blank of FIG. 81 being folded to form the cup, FIG. 83 shows a side view of the cup of FIG. 82, FIG. 84 shows a front perspective view of the cup of FIG. 82, FIG. 85 shows a second perspective view of the cup of FIG. 82, FIG. 86 shows a perspective view of the thin blank of FIG. 81, which is folded along a longitudinal-scored line to form the cup of FIGS. 82 to 85, FIG. 87 shows a front view of the thin blank of FIG. 86, FIG. 88 shows the thin blank of FIGS. 86 and 87, which is further folded for forming the cup of FIGS. 82 to 85, FIG. 89 shows a top view of a blank with a predetermined shape, the blank being a variant of the blank of FIG. 1, FIG. 90 shows a front view of the blank of FIG. 89, FIG. 91 shows a cross-sectional view of the blank of FIG. 89 taken along line A'-A' of FIG. 89, FIG. 92 shows a cross-sectional view of the blank of FIG. 89 taken along line B'-B' of FIG. 89, FIG. 93 shows a top view of a blank with another predetermined shape, the blank being a variant of the blank of FIG. 89, FIG. 94 shows a cross-sectional view of the blank of FIG. 93 taken along line C-C of FIG. 89, FIG. 95 shows a cross-sectional view of an embodiment of the blank of FIG. 93 taken along line C-C of FIG. 89, and FIG. 96 shows a cross-sectional view of another embodiment of the blank of FIG. 93 taken along line C-C of FIG. 89.

In the following description, details are provided to describe embodiments of the application. It shall be apparent to one skilled in the art, however, that the embodiments may be practiced without such details.

Some parts of the embodiments have similar parts. The similar parts may have the same names or similar part numbers with an alphabet symbol or prime symbol. The description of one part applies by reference to another similar part, where appropriate, thereby reducing repetition of text without limiting the disclosure.

FIGS. 1 and 2 show a blank 1, which is intended for folding to form a handheld tool according to an embodiment.

The blank 1 is intended for folding to form a handheld tool and it has a flat, elongated, and essentially symmetric shape, its symmetrical axis A being indicated as a dash-dotted line in the figure.

The blank 1 comprises a top surface 2, a bottom surface 3 opposite to the top surface 2, a first side edge 4, a second side edge 4' opposite to the first side edge 4, a front edge 5, and a rear edge 6.

The blank 1 essentially comprises three sections—a handle section 7, a functional section 8, as well as an intermediate section 9 which connects the handle section 7 with the functional section 8.

The blank 1 also comprises a bending aid in the form of downward bending lines 10, 10' and an upward bending line 11 for facilitating bending or folding of the blank 1 in a predefined manner for forming the handheld tool with the desired form.

The upward bending line 11 which is shown as a dashed line has a shape of a smooth continuous line extending between two opposite edges 4, 4' of the blank and comprising two essentially straight upward bending segments 12, 12'. Each one of the straight upward bending segments extends from a respective side edge 4, 4' at the handle section 7 of the blank 1 over the intermediate section 9 towards the functional section 8 under an oblique angle with respect to the symmetrical axis A of the blank 1 such that the both upward bending segments 12, 12' are connected over a middle or connecting segment 13 forming a blunt vertex at the functional segment 8 of the blank 1.

Depending on the specific embodiment, the shape of the vertex 13 may be different. In the embodiment of FIG. 1, the vertex has an essentially circular shape with a curvature radius of approximately 5 mm.

The downward bending lines 10 comprise two symmetrically arranged smooth continuous lines which are shown as solid lines, each comprising a straight segment 14, 14', extending from the rear edge 6 of the blank 1 towards the vertex 13, and a curved portion 15, each one of the curved portion 15 of the downward bending lines 10 ending at a respective junction point 16 at the upward bending line 11 in the vicinity of the vertex 13.

The straight segments 14, 14' of the downward bending line 10 are extending longitudinally on both sides and close to the symmetrical axis A, such that a stripe extending from the rear edge 6 to the vertex 13 is formed.

In this embodiment, the straight portions 15 are parallel to each other and to the symmetrical axis A of the blank 1. Thus, the central stripe or middle channel has an essentially constant width over its whole length, except in the vertex region, in which the middle channel widens due to the curved portions 15 of the downward bending lines 10.

At the junction points 16, the upward bending line 11 lie essentially perpendicular to the downward bending line 10.

In some embodiments, the angle between the upward bending line 11 and the downward bending line 10 at the junction point 16 is between 60° and 90°, more specifically between 80° and 90°.

The upward bending segments 12, 12' of the upward bending line 11 form or build an angle of approximately 26°.

The length of the tool is approximately 130 mm while its width is about 40 mm. The handle section 7, the intermediate section 9, and the functional section have lengths of approximately 40 mm, 63 mm, and 27 mm, respectively.

Depending on the purpose and on the design of the tool, the angle between the upward bending segments 12, 12' of the upward bending line 11 may vary, in particular, from approximately 20° up to approximately 66°.

The vertex 13 of the upward bending line 11 and the curved portions 15 of the downward bending line 10 show a circular curvature with approximately the same curvature radius as the vertex 13. The curvature radius in this embodiment is approximately 5 mm.

In the handle section 7 of the blank 1, elevated portions or bumps 17 of essentially round shape are provided.

At the ends of the straight segments 14, 14' of the downward bending line 10, indentations 18 are provided in the rear edge 6 of the blank 1. The rear edge 6 is essentially straight and has rounded corners 19. The radius of curvature of the rounded corners is approximately 2 mm.

The side edges 4 of the blank 1 are straight and slightly inclined with respect to the symmetrical axis A of the blank in such a way that the width of the blank 1 at the rear edge 6 is smaller than the width of the functional section 8 of the blank 1.

In this embodiment, the front edge 5 has a circular shape with a curve diameter equal to the width of the functional section 8.

The depth of the indentations 18 in the rear edge are approximately 2 mm.

The length of the blank 1 is approximately 130 mm and the maximum width is 40 mm.

In the handle section 7 adjacent to the intermediate section 9 elongated transversal structures 20 are provided.

In this embodiment, the transversal structures 20 are provided in a shape of elongated bumps lying perpendicular to the symmetrical axis A of the blank 1.

The bending lines 10, 10', 11 are formed as bending grooves scored in a surface of the blank.

In the case of the downward bending line 10, 10', the bending groove is provided on the top surface 2 of the blank 1.

In the case of the upward bending line 11, the bending groove is provided on the bottom surface 3 of the blank 1.

Depending on the specific embodiment, the bumps and/or the bending aids may be provided with colour marks in order to facilitate the recognition of the handle section and/or the bending aids.

In the present embodiment, the blank 1 is a blank for a disposable spoon made from paper which is approved by the Food and Drug Administration (FDA). The area density of the paper is approximately 300 g/m$^2$.

As a basic material of the blank various materials may be used, such as paper, cardboard, metal, silicone, or any other suitable material.

In particular, the blank may comprise compostable and/or recyclable FDA-approved food-safe materials, including but not limited to paper, especially with an area density in the range from about 200 g/m$^2$ to about 350 g/m$^2$.

The depth and the width of the bending scores depends in general on the material, thickness, and the purpose of the blank.

The blank 1 can be easily shaped into a handheld tool by manually bending it along the bending lines 10 and 11.

In particular, due to the bending scores provided on different surfaces of the blank 1 along the bending lines 10, 10' and 11, it is particularly easy to bend the blank 1 downwards along the downward bending lines 10 and upwards along the upward bending line 11.

The bending lines 10, 10' and 11 demarcate four separate areas of the blank 1, including two side wings 30 arranged symmetrically with respect to the symmetrical axis A of the blank 1, a middle lane 31 corresponding to the central channel along the symmetrical axis A, and a bow 32 which includes the functional section 8 and extends over the intermediate section 9 and partially circumvents the vertex 13. The side wings 30 extend from the rear edge 6 of the blank 1 over the handle section 7 and the intermediate section 9 to the vertex 13. At the side edges 4 of the blank, the side wings 30 and the bow meet at respective endpoints 21, 21' which are endpoints of the upward bending line 11.

The downward bending lines 10 demarcate the border between the side wings 30 and the middle lane 31.

In order to shape the blank 1 into a handheld tool, the side wings 30 of the blank 1 are bent downwards (away from the viewer) with respect to the middle lane 31. The downward movement of the side wings 30 is indicated by downward movement arrow symbols 33.

At the same time, by bending or folding the side wings 30 downwards with respect to the middle lane 31, an elevated plateau along the middle lane 31 is formed, which lies between two brinks resulting from the folding of the blank 1 along the downward folding lines 10.

Due to the form-stability of the middle lane 31, in the beginning of the bending process, the longitudinal dimensions of the blank remain essentially the same and the endpoints 21, 21' move essentially perpendicular to the symmetrical axis A of the blank 1 or to the middle lane 31. This means that along the circumference of the bow 32 a tensile stress or tension is building up, which extends along the front edge 5 and the side edge to the respective endpoint 21, 21'. The tensile stress along the circumference of the bow 32 is shown as bended arrows 40.

Simultaneously, with the bending of the side wings 30 downwards, the endpoints 21, 21' at the side edges 4 are also moved or dragged down. This means that the endpoints 21, 21' leave the plane of the drawing or the plane of the middle lane 31 and move down, travelling essentially in a plane perpendicular to the symmetrical axis A of the blank, resulting in a deformation of the bow 32.

In fact, due to the dragging down of the endpoints 21, 21' by the wings 30, the bow 32 ceases to be a plane or essentially two-dimensional object and it becomes a three-dimensional object instead.

With the formation of side brinks along the upward bending line 11, the middle lane 31 provides a form-stable carrier construction of the tool. If the tool is provided as a spoon, in use, the middle lane 31 together with the side brinks acts to prevent cutting of mouth or lips of the user.

By continuing the downward bending of the wings 30, the tensile stress along the circumference of the bow 32 grows, pulling the tip 22 of the blank 1 towards the vertex 13 against the middle lane 31, resulting in an essentially axial compression force (indicated by a wide arrow 41) in the region of the vertex 13.

With the widening of the middle lane 31 at the vertex 13 and due to the tapered shape of the vertex 13, the compression force from the frontal part of the bow 32 is distributed over the width of the vertex 13 in such way that the compression stress at the perimeter of the vertex 13 is reduced.

With the reduction of the compression stress at the vertex 13 damage to the vertex 13 or vertex region can be avoided.

With the tensile stress and the central compression stress caused by the bending of the side wings 30, the planar geometry of the frontal part, in which the frontal part or the tip 22 remains in the plane of the middle lane 31, becomes energetically unstable.

By manually tilting the tip 22 of the functional section 8 upwards, the frontal part of the bow 32 can flip upwards and can take a stable position, in which the circumferential tension along the tension lines 40 is minimized. The upward movement of the front part of the bow 32 is shown by an upward movement arrow symbol 34.

After flipping upwards, the frontal part of the bow 32, and accordingly the functional section 8, takes a stable position.

In particular, by flipping upwards, the frontal part of the bow 32, the functional section 8 obtains a cup shape, the vertex 13 being the deepest point of the cup, and the blank 1 becomes a form-stable tool which in this embodiment is a small spoon.

As long as the side wings are kept bent down, especially by holding the tool in the hand, any deviation from this final shape would be energetically unfavorable, since it would increase the tensile stress along the circumvention of the bow 32.

Thus, by folding the side wings 30 downwards with respect to the middle lane 31, a form-stable handheld tool is formed.

The bumps 17 and the transversal structures 20 can serve as grip structures or grippers for easier handling of the tool by the user.

The blank of FIG. 1 can be easily manufactured. Firstly, a flat worksheet or workpiece comprising paper, cardboard, plastic, metal or any suitable material is provided.

The bending lines may be scored or coined in the blank sheet of the blank material at predefined positions in correspondence with the specific embodiment of the blank.

The bumps 17 and the transversal structures 20 may be embossed or coined, by pressing the worksheet between two complementary tools of appropriate shape. In some embodiments, the bumps and/or the transversal structures are blind-embossed in the worksheet.

The blank 1 is cut out of the worksheet, in particular by means of die-cutting.

The formation of the bending lines 10, 11, bumps 17, transversal structures 20, and/or die cutting can be performed on a bigger area of a worksheet in such way that more than one blank out of a single panel is produced. Such a batch or bulk production can save time and costs in the manufacturing process.

A rolling machine, in particular a die-cutting roller, may be used for carrying out at least one of the previously mentioned operations.

In some embodiments, one or more reinforcement layers are provided, in particular of the middle lane 31.

The reinforcement may be formed as an additional material layer provided along the middle lane. The additional material layer may comprise metal, thermoplastic or thermoset material. It may be laminated, especially glued, onto the on the top surface 2 or on the bottom surface 3 of the blank 1. In some embodiments, reinforcement is embedded in the blank 1.

The reinforcement may comprise fibers embedded in the blank material or applied on one of the surfaces of the blank material.

In a special embodiment, the blank 1 of FIG. 1 include a bending line or a die cut line such that the unfolded or flat blank 1 can act as a bookmark. Advertisement or useful information can also be printed on the blank 1, thereby allowing a user of the blank 1 to have quick and easy access to such data.

FIG. 3 shows a schematic top view of a blank 1a for folding to form a handheld tool according to another embodiment.

The blank 1a of FIG. 3, in its structural and functional parts, essentially corresponds to the embodiment of FIG. 1.

One difference to the embodiment of FIG. 1 lies in the specific shape of the blank 1a, in particular in the shape of the vertex 13 and of the tip 22. Further, different to FIG. 1, the straight segments 14 of the downward bending lines 10 are not parallel, but meet at a single indentation 18 at the rear edge 6 of the blank 1a.

Due to the arrangement of the downward bending lines 10, the middle lane 31 narrows towards the rear edge 6 turning essentially into a single line at the rear edge 6.

The vertex 13 has a flat tip and rounded corners. The junction points 16 between the downward bending lines 10 and the upward bending line 11 lie slightly apart from the rounded corners of the vertex on the straight segments 12 of the upward bending line 11. The angle between the straight segments 12 of the upward bending line 11 is approximately 22 degrees.

The blank 1a also comprises the transversal structure 20 and the bumps 17. The bumps 17 in this embodiment are elongated and transversally oriented.

The bumps 17 and the transversal structures 20 are coloured in order to designate the handle section for ease of use.

The particular shape of the blank 1a is attributable to the particular shape of the handheld tool which is to be formed out of the blank 1a. The tool formed out of the blank 1a of FIG. 3 is supposed to have a broad flat tip making it suitable for such tasks as scooping or shoveling.

The broad flat shape of the vertex allows for forming a cup that is shallow and broad. The broad flat shape may also be helpful to reduce the compression stress at the vertex and also to obtain the desired three-dimensional shape of the functional section of the tool.

The narrowing of the middle lane 31 towards the rear edge 6 may be useful for saving material during mass production of the tool. In particular, due to the tapered shape of the blank 1a, more blanks 1a can be accommodated side by side on the same area by placing them in alternating orientation, and hence more blanks can be produced out of a single workpiece.

The weakening of the plateau or central carrying construction by the narrowing of the main lane 31 at the rear edge does not significantly deteriorate the overall stability of the tool, since the main tensions are distributed over the intermediate section 9 and the functional section 8, with a maximum of compression stress in the region of the vertex 13.

FIGS. 4 and 5 show a blank 1b. The blank 1b is intended for folding to form a handheld tool according to a further embodiment.

In contrast to the previous embodiments, the blank 1b of FIG. 3 has two additional downward folding lines 10a and 10a' in the form of straight lines parallel to the symmetrical axis A of the blank 1b. Each of the additional folding lines 10a and 10a' extend from a respective junction point 16 at the vertex 13 to a respective indentation 18 at the rear edge 6 of the blank 1b.

The additional folding lines 10a and 10a' act to provide a stronger middle lane 31.

The vertex 13 is slightly narrower as compared to the embodiment of FIG. 1. The angle between the straight segments 12 of the upward bending line 11 is approximately 31.50 degrees.

In the handle section 7 of the blank 1b, similar to the embodiment of FIG. 3, a plurality of elongated transversal bumps 17 are provided with colour marking.

Different from the previous embodiments, the functional section 8 has a rounded, slightly elongated or elliptical shape, essentially defined for a specific purpose or intended use of the tool. In the present case, the tool to be formed is a spoon which, due to the sharper shape of the tip 22 and the additional downward folding lines 10 and 10' is suitable for handling harder materials, for example hard ice cream or similar.

FIGS. 6 and 7 show a blank 1c. In use, the blank 1c folds to form a handheld tool according to another embodiment.

The blank 1c of FIG. 6, in its structural and functional parts, essentially corresponds to the embodiment of FIG. 1.

Different to FIG. 1, the blank 1c has a specifically shaped functional section 8 which has an elongated slightly elliptic shape. The reason for this specific shape is that the tool which is to be formed out of this blank 1c is a specific type of spoon, similar to a traditional Chinese spoon.

The handle section 7 is narrow as compared to the widest part of the blank 1c. The widest part of the blank 1c is in the intermediate section 9, closer to the functional section 8.

The angle between the straight segments 12 of the upward bending line 11 is approximately 30.5 degrees.

The length of the tool is approximately 130 mm, the width at the widest part and at the rear edge 6 are approximately 40 mm and 35 mm respectively. The handle section 7, the intermediate section 9, and the functional section have lengths of approximately 40 mm, 60 mm, and 30 mm respectively.

The middle lane 31 has an additional reinforcement 50 shown as a black stripe in the area of the middle lane 31.

The reinforcement 50 is formed by embossing. In a general sense, the reinforcement 50 can also be formed by debossing.

A characteristic feature of the traditional Chinese spoon, besides its typical shape and proportions, is the shallowness of the spoon, or more precisely of the cup of the spoon. The shallowness of the cup has inter alia an advantage of allowing for rapid cooling of the content of the spoon whilst the spoon is in use.

Different from traditional Chinese spoons, the cup of the spoon made out the blank 1c of FIG. 6 does not have a flat bottom. Instead the deepest portion of the cup is defined by the vertex 13.

The narrowness of the handle section results in a smaller tensile stress along the circumference of the bow 8 and accordingly in a smaller deformation of the bow from the initial plane geometry. Thus, a shallow form of the cup can be easily achieved.

FIGS. 8 and 9 show a blank 1d. The blank 1d is used for folding to form a handheld tool according to further embodiment. This embodiment corresponds essentially to the embodiment of FIG. 6 and represents a blank 1d for forming a bigger Chinese spoon. In particular, the functional section 8 and the intermediate section 9 are wider than in the embodiment of FIG. 6.

The angle between the straight segments 12 and 12' of the upward bending line 11 is approximately 34.50 degrees.

The length of the tool is approximately 130 mm, the width at the widest part and at the rear edge 6 is approximately 50 mm and 35 mm, respectively. The handle section 7, the intermediate section 9, and the functional section have lengths of approximately 40 mm, 60 mm, and 30 mm, respectively.

The middle lane 31 has an additional reinforcement 50 in the form of a reinforcement layer provided along the symmetrical axis A of the blank 1d.

For a blank 1d that comprises paper, the reinforcement 50 can be provided using blind embossing, which can provide a strong middle lane 31.

FIG. 10 shows a schematic top view of a blank 1e for folding to form a handheld tool according to another embodiment.

The blank 1e of FIG. 10 corresponds essentially to the embodiment of FIG. 1, differing mainly in the front portion of the functional section 8. In particular, the contour line of the front edge 5 shows two recesses 51 arranged axially symmetrically with respect to the symmetrical axis A of the blank 1e in such a way that three teeth in the functional section 8 are formed. The tip 22 of the bow 32 is at the same time the tip of the middle tooth of tine.

After forming the tool from the blank 1e, these teeth can serve as fork tines and the tool itself can be used as a fork.

FIG. 11 shows a schematic top view of a blank 1f for folding to form a handheld tool according to another embodiment.

The blank 1f of FIG. 11 corresponds essentially to the embodiment of FIG. 3, differing mainly in the shape of the front portion of the functional section 8 of the blank 1f. In particular, the contour line of the front edge 5 shows two recesses 51 arranged symmetrically with respect to the symmetrical axis A of the blank 1f in such a way that three teeth in the functional section 8 are formed. The tip 22 of the bow 32 is at the same time the tip of the middle tooth of tine.

Similar to the embodiment of FIG. 3, the tip 22 is flat and accordingly the middle tooth of the functional section 8 is flat as well.

Forming a handheld tool out of the blank 1f shown in FIG. 11 results in a tool with broad teeth, which can be used as both as a fork and as a spoon, and could be used for instance for eating cake, ice cream, spaghetti, or similar.

FIG. 12 shows a schematic top view of a blank 1g for folding to form a handheld tool according to a further embodiment.

The blank 1g of FIG. 12 corresponds essentially to the embodiment of FIG. 4, differing mainly in the shape of the front portion of the functional section 8 of the blank 1g. In particular, similar to previous two embodiments, the contour line of the front edge 5 shows two recesses 51 arranged symmetrically with respect to the symmetrical axis A of the blank 1g in such a way that three teeth in the functional section 8 are formed. The tip 22 of the bow 32 is at the same time the tip of the middle tooth of tine. In contrast to the previous two embodiments, the three teeth are not blunted. Consequently, forming a handheld tool out of the blank 1g shown in FIG. 12 results in a fork with sharp teeth. In particular, due to the sharp teeth and due to the reinforcement structure in the middle lane, the fork can be used for handling relatively hard matter, like flower soil, or harder meal, like hard ice cream, or similar.

FIG. 13 shows a schematic top view of a blank 1h for folding to form a handheld tool according to another embodiment.

In the functional section 8 of the blank 1h, three teeth similar to the teeth of the embodiment of FIG. 10 are formed.

Characteristic for the embodiment of FIG. 13 is a broader middle lane 31 and a flat vertex 13, especially as compared with the embodiment of FIG. 10. Further, the angle between the straight segments 12 of the upward bending line 11 is approximately 35.25 degrees. This is relatively wide angle, resulting in a shorter intermediate section 9 and a longer handle section 7. Besides, the middle lane 31 is provided with a reinforcement 50 which is indicated by the solid black colour of the middle lane 31.

Forming a tool out of the blank 1h of FIG. 13 results in a fork of specific geometry which can be used for handling particularly hard matter. Indeed, the reinforcement 50 of the middle lane 31 and the longer handle section 7 allows for the application of particularly large force on the tool without causing damage to the tool.

FIG. 14 shows a schematic top view of a blank 1i for folding to form a handheld tool according to a further embodiment.

This embodiment corresponds essentially to the embodiment of FIG. 6 showing a blank 1i for forming a spoon similar to a Chinese spoon. In the front part of the functional section 8, however, the blank 1i of FIG. 14 has two recesses 51 forming three teeth. Thus, by folding the blank 1i, a tool can be formed which essentially resembles a Chinese spoon, but which can be used as a fork.

FIGS. 15 and 16 show a blank 1j, which is intended for folding to form a handheld tool according to another embodiment.

Different to the previous embodiments, in addition to the side wings 30 extending over the handle section 7 and over the intermediate section 9 on both sides of the symmetrical axis A, the blank 1j shown in FIG. 15 comprises two corner wings 60 or corner wings at two handle section corners adjacent to the rear edge 6 of the blank 1j. The handle wings 60 are demarcated from respective side wings 30 by two handle bending lines 61. The handle bending lines 61 extend from the rear edge 6 of the blank 1j to the respective endpoint 21, 21' at the respective side edge 4, 4' of the blank 1j. The handle bending lines 61 facilitate bending of the handle wings 60, in particular, bending down from the figure plane away from the viewer, as indicated by the downward movement symbols 33.

The basic material of the blank 1j of FIG. 15 is silicone. With silicone as its basic material, the blank 1j can be formed into a durable silicone-based tool, such as a reliable silicone-based kitchen utensil.

As seen in FIG. 16, the blank 1j also comprises a middle lane 31 with a reinforcement in the form of an embedded metal sheet 31a which is shown as a dark portion of blank 1j along the symmetrical axis A. This extends along the symmetrical axis A from the vertex 13 towards the rear edge 6 and terminates in the handle section 7 before reaching the rear edge 6. In use, the metal sheet 31a enables the middle lane 31 to be stiff and stable. In other words, the middle lane 31 can bear more weight or stress.

Due to this configuration of the middle lane 31 and the handle wings 60, a portion of the handle section between the handle wings 60 at the rear edge 6 can remain unfolded after the tool is formed. Thus, a comfortable handle with a kind of "volume-effect" can be shaped.

Further, the embodiment of FIG. 15 comprises a reinforcement in the handle section 7, in particular in the handle wings 60. This is shown as dark triangles in the handle wings 60. In this embodiment, the reinforcement of the handle wings comprises extrusion moulded silicone. In some embodiments, the reinforcement may comprise one or more metal layers embedded in the blank 1j in the region of the middle lane 31 and in the handle wings 60.

In other embodiments, the reinforcement may comprise surface layers laminated on the blank 1j, particularly at locations which are exposed to increased strain, like the middle lane 31, especially in the vicinity of the vertex 13 or the handle section, which is grasped by the user while using the tool.

The front edge 5 is straight such that the tip 22 of the front portion is essentially flat.

The length of the tool is approximately 160 mm, and the width approximately 40 mm. The handle section 7, the intermediate section 9, and the functional section have lengths of approximately 50 mm, 80 mm, and 40, respectively.

The angle between the straight segments 12 of the upward bending line 11 is approximately 25.90 degrees.

The dimensions, especially the length of the intermediate section 9 and the functional section 8, as well as the angle between the straight segments 12 of the upward bending lines 11 may vary significantly depending on the purpose of the tool.

The length of the tool is approximately 160 mm, and the width approximately 40 mm. The handle section 7, the intermediate section 9, and the functional section have respective lengths of approximately 50 mm, 80 mm and 30 mm. The width of the middle lane 31 is approximately 4 mm.

The blank 1j also comprises grip structures or grippers. The grippers in this embodiment are provided in the form of elongated structures or stripes of protruded silicone.

In some embodiments, the grippers with coloured patterns are provided in the handle section 7. The colour pattern and the geometry of the grippers may vary, depending on the specific design of tool.

FIG. 17 shows a cross-sectional view of a variant of the blank of FIG. 15. FIG. 17 show a blank 1ja that comprises silicone material. The blank 1jb includes a middle lane 31, which comprises an enlarged body for reinforcing the middle lane 31.

FIG. 18 shows a cross-sectional view of another variant of the blank of FIG. 15. FIG. 18 shows a blank 1jb. The blank 1jb includes a middle lane 31, which comprises a metal sheet 31b that is attached to an outer surface of a body of the middle lane 31 for reinforcing the middle lane 31.

FIG. 19 shows a schematic top view of a blank 1k for folding to form a handheld tool according to a further embodiment.

The blank 1k shown in FIG. 19 corresponds in its essential features to the embodiment of FIG. 15, and shows some differences as well, especially in the design of the handle section 7 and of the functional section. The bumps 17 in the handle section 7 are round or dot-shaped.

The front edge 5 has a circular shape such the tip 22 of the front portion or the function section 8 is essentially round.

The length of the tool is approximately 110 mm, and the width approximately 40 mm. The handle section 7, the intermediate section 9, and the functional section have lengths of approximately 50 mm, 30 mm, and 30 mm, respectively. The width of the middle lane 31 is approximately 2 mm.

The angle between the straight segments 12 of the upward bending line 11 is approximately 66.00 degrees.

Due to its dimensions and shape, the blank 1k in the folded state results in a tool which is specifically suitable for using as a small scoop for ice-cream or rice, or as a ladle by bending the segment 8 in the other direction.

In some embodiments, the blank 1k comprises magnetized metal plates for ease of use.

FIG. 20 shows a schematic top view of a blank 11 for folding to form a handheld tool according to another embodiment.

The embodiment of FIG. 20 differs from the embodiment of FIG. 19 by the lengthwise orientation of the bumps in the handle section 7 as well as in the dimensions.

The length of the tool is approximately 140 mm, and the width approximately 40 mm. The handle section 7, the intermediate section 9, and the functional section have lengths of approximately 50 mm, 60 mm, and 30 mm, respectively. The width of the middle lane 31 is approximately 4 mm.

The angle between the straight segments 12 of the upward bending line 11 is approximately 34.10 degrees.

Such dimensions and shape of the blank 11 make the blank 11 suitable for forming a tool which can be used as a ladle, scoop, spatula, funnel, spade or shovel.

FIG. 21 shows a schematic top view of a blank 1m for folding to form a handheld tool according to another embodiment.

This embodiment corresponds to the embodiment of FIG. 20 and differs mainly in the shape of the functional section 8. In particular, the tip 22 of the functional section 8 is flat such that the blank 1m has essentially the shape of a rectangle with rounded corners.

A tool formed out of such a blank 1m is particularly suitable for usage as a spatula, scraper, funnel, spade or shovel.

FIG. 22 shows a schematic top view of a blank 1n for folding to form a handheld tool according to a further embodiment.

The blank 1n of FIG. 22 corresponds essentially to the embodiment of FIG. 19 and differs mainly in the shape of the functional section 8 and in the proportions. In particular, the functional section 8 is longer and the tip 22 of the functional section 8 has a rounded elliptic shape. In the functional section 8, a plurality of holes 70 are provided. One of the holes is provided at the tip of the vertex 13.

The middle lane 31 with a reinforcement extends along the symmetrical axis A of the blank 1*n* over the intermediate section 9 and the handle section 7 without reaching the vertex 13 and the rear edge 6.

The length of the tool is approximately 140 mm, and the width approximately 40 mm. The handle section 7, the intermediate section 9, and the functional section have lengths of approximately 50 mm, 50 mm, and 40 mm, respectively. The width of the middle lane 31 is approximately 2 mm.

The angle between the straight segments 12 of the upward bending line 11 is approximately 41 degrees.

The hole 70 at the vertex can serve for stress release and can facilitate the forming of the tool.

The particular shape and the holes 70 make the blank 1*n* particularly suitable for forming tools which can be used as a strainer, scoop or similar.

The plurality of holes 70 can be die-cut in the blank 1*n*. The holes are essentially round and have a diameter of approximately 1.5 mm.

The diameter of the holes can be varied, in particular in the range from 1 mm up to 3 mm, depending on the purpose of the tool.

In an embodiment, no holes in the functional section 8 and at the vertex 13 are provided. In the embodiment without holes, the middle lane and the reinforcement of the middle lane 31 can be extended to the vertex 13. Tools shaped out of such embodiments can be used for example as a spatula, scoop or ladle.

FIG. 23 shows schematically a possible panel arrangement for producing a blank according an embodiment.

In the upper part of FIG. 23, a row of blanks according to the embodiment of FIG. 3 is shown. The blanks in the upper row are arranged in alternating orientation. In particular, every second blank is oriented with its functional part up and with its handle part down.

In the lower part of FIG. 23 a row of rectangular blanks with the same lateral dimensions as the upper blanks is shown.

As can be seen from FIG. 23, due to the tapered shape of the blanks in the upper row, more blanks can be placed on the same area.

Thus, the tapered shape of blanks, along with the design's technical importance discussed above, has an advantage from the manufacturing point of view. In particular, in the bulk production of the blanks worksheet material and production costs can be saved by alternating the orientation of adjacent blanks in the worksheet. Thus, due to the tapered shape of the blank, a saving of more than 10% in worksheet material in the bulk production can easily be achieved.

In this example, a material saving of 11.25% has been achieved.

Even in bulk production with smaller panels, i.e. in the case of smaller workpieces, the alternating orientation of the blanks can still lead to considerable savings.

In some embodiments of the manufacturing process, two blanks are produced and die-cut out of a single workpiece or worksheet. Due to the tapered shape of the blank, up to approximately 6% of material savings can be achieved, depending on the specific design of the blank.

FIGS. 24 to 37 show different embodiments of the blank in its initial and in its folded state from different views.

In the central upper part of FIGS. 24 to 33 a top view of a blank according to a respective embodiment in an unfolded or initial state is shown.

On the left-hand side of the upper row a top view of the respective tool is shown. On the right-hand side of the upper row a bottom view of the tool is shown.

In the lower part of the FIGS. 24 to 37, perspective views of the formed tools under different view angles are shown.

The embodiments shown in FIGS. 24 to 33 correspond to the embodiments shown in FIGS. 1 to 14 above.

The embodiments shown in FIGS. 34 to 37 correspond essentially to the embodiments shown in FIGS. 15 to 22 but also include some important modifications.

In particular, different to the embodiment of FIGS. 11 to 15, the embodiments of FIGS. 27 to 30 comprise a reinforcement. In a case wherein the embodiment is produced using paper, the reinforcement can be provided using blind emboss. In a case wherein the embodiment is produced using silicon material, the reinforcement can be provided using extrusion-moulded silicone. This area with the reinforcement is shown in the figures as a dark in particular triangular area extending from the vertex to the handle section.

In some embodiments, an extrusion-moulded rubber is used, as a reinforcement.

Further, in the embodiments of FIGS. 34 to 37 a middle lane in the form of a stripe extending along the symmetrical axis A is missing. Instead, a middle lane or middle channel is created together with the folding of the side wings. Similar to the middle lane, the middle channel or tube has the same supporting effect and contributes to the robustness of the tool.

It is also worth mentioning that the tools formed out of the blanks according the embodiments can be in general easily modified or transformed by changing the bending direction of the functional part of the blank. In particular, an energetically favourable stable configuration can also be achieved when the front portion of the functional section is bent in the same direction with respect to the plane of the middle lane as the side wings.

FIGS. 38 to 47 illustrate a variant of the blank of FIG. 1.

FIG. 38 shows a thin blank 81 for folding to form a desired cup with a handle.

In a general sense, the cup can also refer to a bowl, a container, or a scoop.

The thin blank 81 includes an elongated sheet 83 with a plurality of scored lines 85 and with a plurality of bumps 87. The scored lines 85 and the bumps 87 are located on surfaces of the sheet 83.

Each scored line 85 includes a narrow hollow channel, to a bending groove, or to a narrow elongated depressed area for facilitating bending or folding of the blank 81 to form a desired cup. The depth and the width of the scored line are adapted according to material, to thickness, and to purpose of the blank 81.

Figure 44:
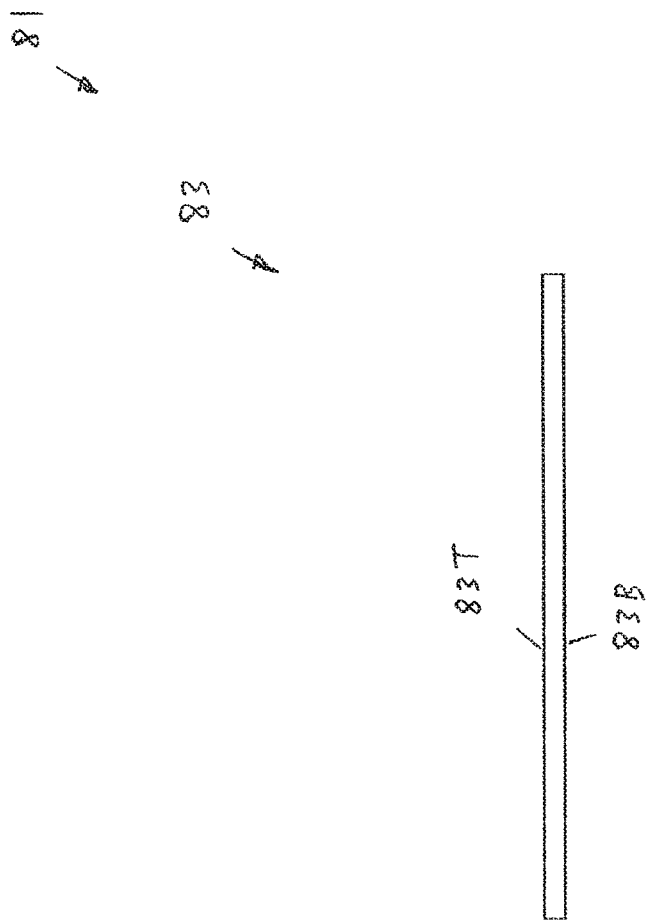

The elongated sheet 83 is essentially flat and is symmetrical about its longitudinal axis. The sheet 83 has a top surface 83T with a bottom surface 83B being provided opposite to the top surface 83T, as shown in FIG. 44. The sheet 83 also has a first side edge 83S1 with a second side edge 83S2 being provided opposite to the first side edge 83S1, and a front edge 83F with a rear edge 83R being provided opposite to the front edge 83F, as illustrated in FIG. 38.

The scored line 85 can be placed on the top surface 83T of the blank 83. Such top surface scored line is also called a downward bending line. Similarly, the scored line 85 can be placed on the bottom surface 83B of the blank 83. Such bottom surface scored line is also called an upward bending line.

The front edge 83F and the rear edge 83R are placed at longitudinal ends of the sheet 83. The front edge 83F is connected to the first side edge 83S1, which is connected to the rear edge 83R. The rear edge 83R is connected to the second side edge 83S2, which is connected to the front edge 83F.

Figure 43:
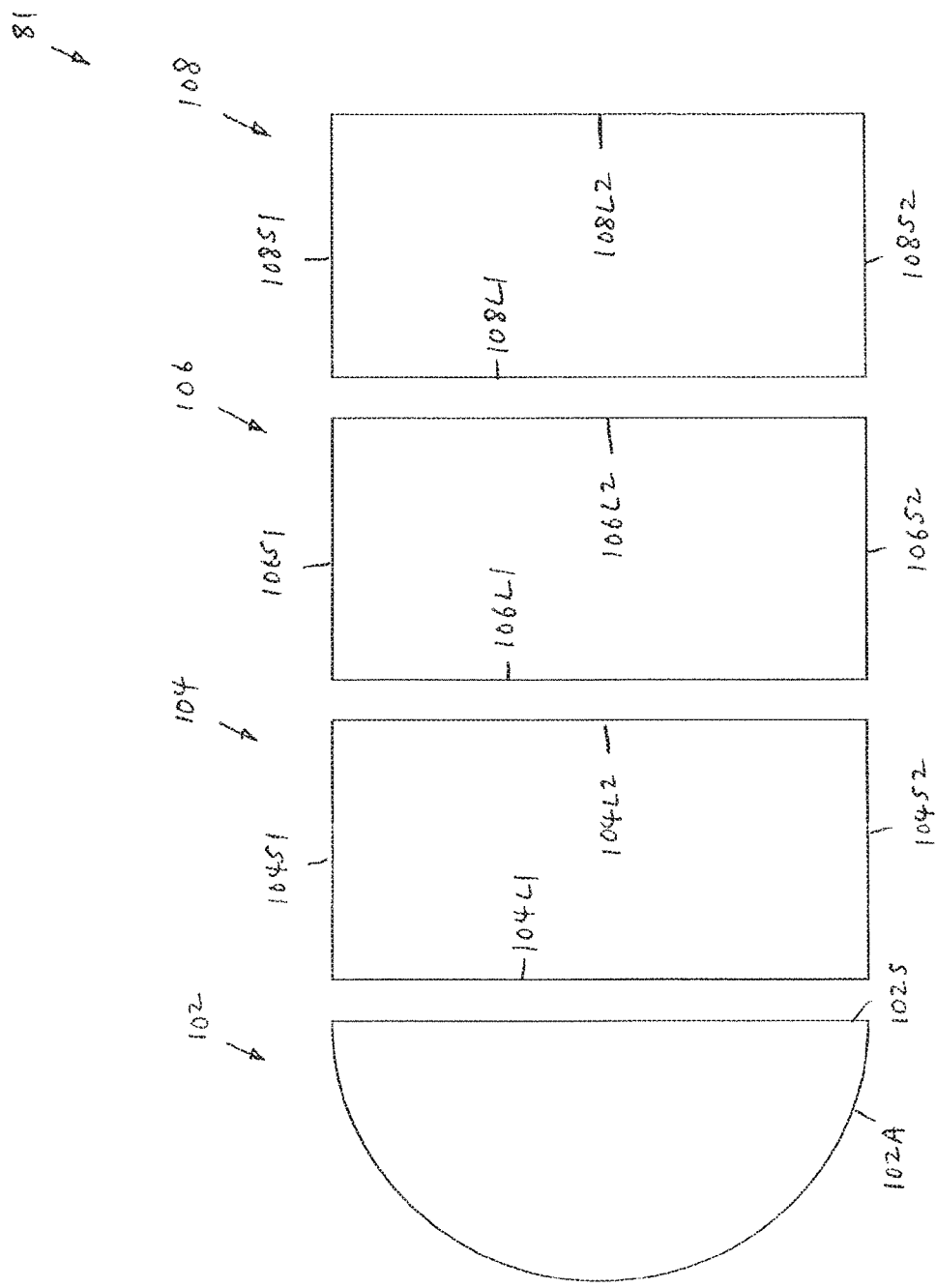

The sheet 83 also comprises a semi-circular portion 102, a first rectangular portion 104, a second rectangular portion 106, and a third rectangular portion 108, as illustrated in FIG. 43. The semi-circular portion 102 is placed next to the first rectangular portion 104, which is placed next to the second rectangular portion 106. The second rectangular portion 106 is placed next to the third rectangular portion 108.

The semi-circular portion 102 and the first rectangular portion 104 forms a partial stadium portion. The partial stadium portion with a generally rectangular shape that has three straight lines and one circular line.

The semi-circular portion 102 comprises an arc edge 102A and a straight edge 102S. Ends of the arc edge 102A are placed next to respective ends of the straight edge 102S.

The first rectangular portion 104 includes a first-long edge 104L1 with a second-long edge 104L2, which is placed opposite to the first-long edge 104L1, and a first-short edge 104S1 with a second-short edge 104S2, which is placed opposite to the first-short edge 104S1. A first end of the first-long edge 104L1 is placed next to a first end of the first-short edge 104S1. A second end of the first-short edge 104S1 is placed next to a first end of the second-long edge 104L2. A second end of the second-long edge 104L2 is placed next to a first end of the second-short edge 104S2. A second end of the second-short edge 104S2 is placed next to a second end of the first-long edge 104L1.

Similar to the first rectangular portion 104, the second rectangular portion 106 includes a first-long edge 106L1 with a second-long edge 106L2, and a first-short edge 106S1 with a second-short edge 106S2.

Similar to the first rectangular portion 104, the third rectangular portion 108 includes a first-long edge 108L1 with a second-long edge 108L2, and a first-short edge 108S1 with a second-short edge 108S2.

Referring to the semi-circular portion 102, the arc edge 102A is placed next to the front edge 83F. The straight edge 102S is placed next to the first-long edge 104L1 of the first rectangular portion 104.

Referring to the first rectangular portion 104, the first-short edge 104S1 is placed next to the first side edge 83S1. The second short edge 104S2 is placed next to the second side edge 83S2. The second-long edge 104L2 is placed next to the first-long edge 106L1 of the second rectangular portion 106.

Referring to the second rectangular portion 106, the first-short edge 106S1 is placed next to the first side edge 83S1. The second short edge 106S2 is placed next to the second side edge 83S2. The second-long edge 106L2 is placed next to the first-long edge 108L1 of the third rectangular portion 108.

Referring to the third rectangular portion 108, the first-short edge 108S1 is placed next to the first side edge 83S1. The second short edge 108S2 is placed next to the second side edge 83S2. The second-long edge 108L2 is placed next to the rear edge 83R.

The straight edge 102S of the semi-circular portion 102, the long edges 104L1 and 104L2 of the first rectangular portion 104, the long edges 106L1 and 106L2 of the second rectangular portion 106, and the long edges 108L1 and 108L2 of the third rectangular portion 108 have the same length.

The first short edge 104S1 of the first rectangular portion 104, the first short edge 106S1 of the second rectangular portion 106, and the first short edge 108S1 of the third rectangular portion 108 are placed such that they form a straight line.

Similarly, the second short edge 104S2 of the first rectangular portion 104, the second short edge 106S2 of the second rectangular portion 106, and the second short edge 108S2 of the third rectangular portion 108 are placed such that they form a straight line.

Referring to the scored lines 85, they include a set of longitudinal-scored lines, a set of lateral-scored lines, and a set of diagonal-scored lines.

The longitudinal-scored lines include a first longitudinal bending line, which is also called a short valley spine. The longitudinal-scored lines also include a second longitudinal bending line, and a third longitudinal bending line.

In detail, the first longitudinal bending line includes a circular bending line segment 110C and a first straight bending line segment 110S1 with a second straight bending line segment 110S2.

The circular bending line segment 110C is placed on the bottom surface 83B while the first straight bending line segment 110S1 and the second straight bending line segment 110S2 are placed on the top surface 83T. A first end of the circular bending line segment 110C is placed next to a first end of the first straight bending line segment 110S1. A second end of the first straight bending line segment 110S1 is placed next to a first end of the second straight bending line segment 110S2. A second end of the second straight bending line segment 110S2 is placed next to a second end of the circular bending line segment 110C. The first straight bending line segment 110S1 and the second straight bending line segment 110S2 form a small angle. The circular bending line segment 110C is placed at a midpoint of the straight edge 102S of the semi-circular portion 102. The second end of the first straight bending line segment 110S1 and the first end of the second straight bending line segment 110S2 are placed at a midpoint of the first long edge 106L1 of the second rectangular portion 106.

The second longitudinal bending line includes a straight bending line segment 112, which is placed on the top surface 83T. The straight bending line segment 112 extends from a midpoint of the first long edge 106L1 to a midpoint of the second long edge 106L2 of the second rectangular portion 106.

The third longitudinal bending line includes a straight bending line segment 114, which is placed on the top surface 83T. The straight bending line segment 114 extends from a midpoint of the first long edge 108L1 to a midpoint of the second long edge 108L2 of the third rectangular portion 108.

The lateral-scored lines include a first straight bending line segment 116, a second straight bending line segment 118, a third straight bending line segment 120, and a fourth straight bending line segment 122.

In detail, the first straight bending line segment 116 is placed on the bottom surface 83B and it extends from one end of the first long edge 106L1 of the second rectangular portion 106, which is placed next to the first side edge 83S1, to a midpoint of the first long edge 106L1 of the second rectangular portion 106.

The second straight bending line segment 118 is placed on the top surface 83T and it extends from the midpoint of the first long edge 106L1 of the second rectangular portion 106 to one end of the first long edge 106L1 of the second rectangular portion 106, which is placed next to the second side edge 83S2.

The third straight bending line segment 120 is placed on the bottom surface 83B and it extends from one end of the first long edge 108L1 of the third rectangular portion 108, which is placed next to the first side edge 83S1, to a midpoint of the first long edge 108L1 of the third rectangular portion 108.

The fourth straight bending line segment 122 is placed on the top surface 83T and it extends from the midpoint of the first long edge 108L1 of the third rectangular portion 108 to one end of the first long edge 108L1 of the third rectangular portion 108, which is placed next to the second side edge 83S2.

The set of diagonal-scored lines include a first straight bending line segment 124 and a second straight bending line segment 126.

In detail, the first straight bending line segment 124 is placed on the bottom surface 83B and it extends from a midpoint of the straight edge 102S of the semi-circular portion 102 to one end of the second-long edge 104L2 of the first rectangular portion 104, which is placed at the first side edge 83S1.

The second straight bending line segment 126 is placed on the bottom surface 83B and it extends from the midpoint of the straight edge 102S of the semi-circular portion 102 and it extends towards one end of the second-long edge 104L2 of the first rectangular portion 104, which is placed at the second side edge 83S2.

One end of the second straight bending line segment 126 is placed on the midpoint of the straight edge 102S of the semi-circular portion 102. Another end of the second straight bending line segment 126 is placed on a point, which lies on about midpoint between the midpoint of the straight edge 102S and the one end of the second-long edge 104L2 of the first rectangular portion 104, which is placed at the second side edge 83S2.

With regards to the bumps 87, they are placed on a first elevated part and on a second elevated part of the blank 81.

The first elevated part is enclosed by a part of the first long edge 106L1, a part of the second-long edge 106L2, and the second short edge 106S2 of the second rectangular portion 106, as well as the straight bending line segment 112.

The second elevated part is enclosed by a part of the first long edge 108L1, a part of the second-long edge 108L2, and the second short edge 108S2 of the third rectangular portion 108, as well as the straight bending line segment of the straight bending line segment 114.

A curve line or rounded corner 130 is provided at one end of the third straight bending line segment 120, which is placed next to the first side edge 83S1.

A curve line or rounded corner 132 is provided at one end of the third straight bending line segment 120, which is placed next to one end of the fourth straight bending line segment 122.

A curve line or rounded corner 134 is also provided at another end of the fourth straight bending line segment 122, which is placed next to the second side edge 83S2.

In one implementation for forming a cup with a long handle, the blank 81, which comprises a thin material, has a length of approximately 285 mm and a width of approximately 120 mm.

The semi-circular portion 102 has a radius of about 60 mm.

Referring to the first rectangular portion 104, the first-short edge 104S1 and the second-short edge 104S2 have a length of about 60 mm and the first-long edge 104L1 and the second-long edge 104L2 have a length of about 120 mm.

Referring to the second rectangular portion 106, the first-short edge 106S1 has a length of about 82.5 mm, the second-short edge 106S2 has a length of about 83.0 mm, while the first-long edge 106L1 and the second-long edge 106L2 have a length of about 120 mm.

Referring to the third rectangular portion 108, the first-short edge 108S1 has a length of about 80.0 mm, the second-short edge 108S2 has a length of about 82.0 mm, the first-long edge 108L1 has a length of about 120 mm, and the second-long edge 108L2 has a length of about 118 mm.

The first straight bending line segment 124 of the diagonal-scored lines forms an angle of about 45 degrees with the first side edge 83S1.

In one implementation for forming a cup with a short handle, the blank 81, which comprises a thin material, has a length of approximately 243.5 mm and a width of approximately 120 mm. The semi-circular portion 102 has a radius of about 60 mm.

Referring to the first rectangular portion 104, the first-short edge 104S1 and the second-short edge 104S2 have a length of about 60 mm and the first-long edge 104L1 and the second-long edge 104L2 have a length of about 120 mm.

Referring to the second rectangular portion 106, the first-short edge 106S1 has a length of about 59.0 mm, the second-short edge 106S2 has a length of about 60.0 mm, while the first-long edge 106L1 and the second-long edge 106L2 have a length of about 120 mm.

Referring to the third rectangular portion 108, the first-short edge 108S1 has a length of about 57.0 mm, the second-short edge 108S2 has a length of about 59.0 mm, the first-long edge 108L1 has a length of about 120 mm, and the second-long edge 108L2 has a length of about 118 mm.

The first straight bending line segment 124 of the diagonal-scored lines forms an angle of about 45 degrees with the first side edge 83S1.

The blank 81 is produced using food grade synthetic papers, which are extruded from polypropylene pellets. The synthetic paper has a weight value of about 250 grams per square meter (GSM) to about 350 GSM.

In a general sense, the blank 81 can also be produced using other food grade materials, such as folding boxboard (FBB), solid bleached sulphate (SBS), and ivory board. The FBB, the SBS, and the ivory board can have a weight value of about 200 grams per square meter (GSM) to about 400 SM.

Functionally, the blank 81 can be folded manually to form a cup, which is illustrated in FIGS. 39 to 42.

The scored lines 85 are intended for bending parts of the blank to bend in different pre-determined directions.

The semi-circular portion 102 and the first rectangular portion 104 are intended for folding to form a container portion of the cup.

The second rectangular portion 106 and the third rectangular portion 108 are intended for folding to form a handle portion of the cup.

The first straight bending line segment 124, the circular bending line segment 110C, and the second straight bending line segment 126 are adapted such that they form a smooth linen which does not cut a user of the cup.

The rounded corners act to provide safety to prevent cutting of a user of the cup. The rounded corners also act to increase durability and act to provide a sturdier formation. This is different from pointed corners that break or damage more easily.

In a general sense, the cup can serve as a spoon with an active or functional top side, a scoop with an active bottom side, a scraper with an active bottom side, or a funnel with an active bottom side.

Figure 45:
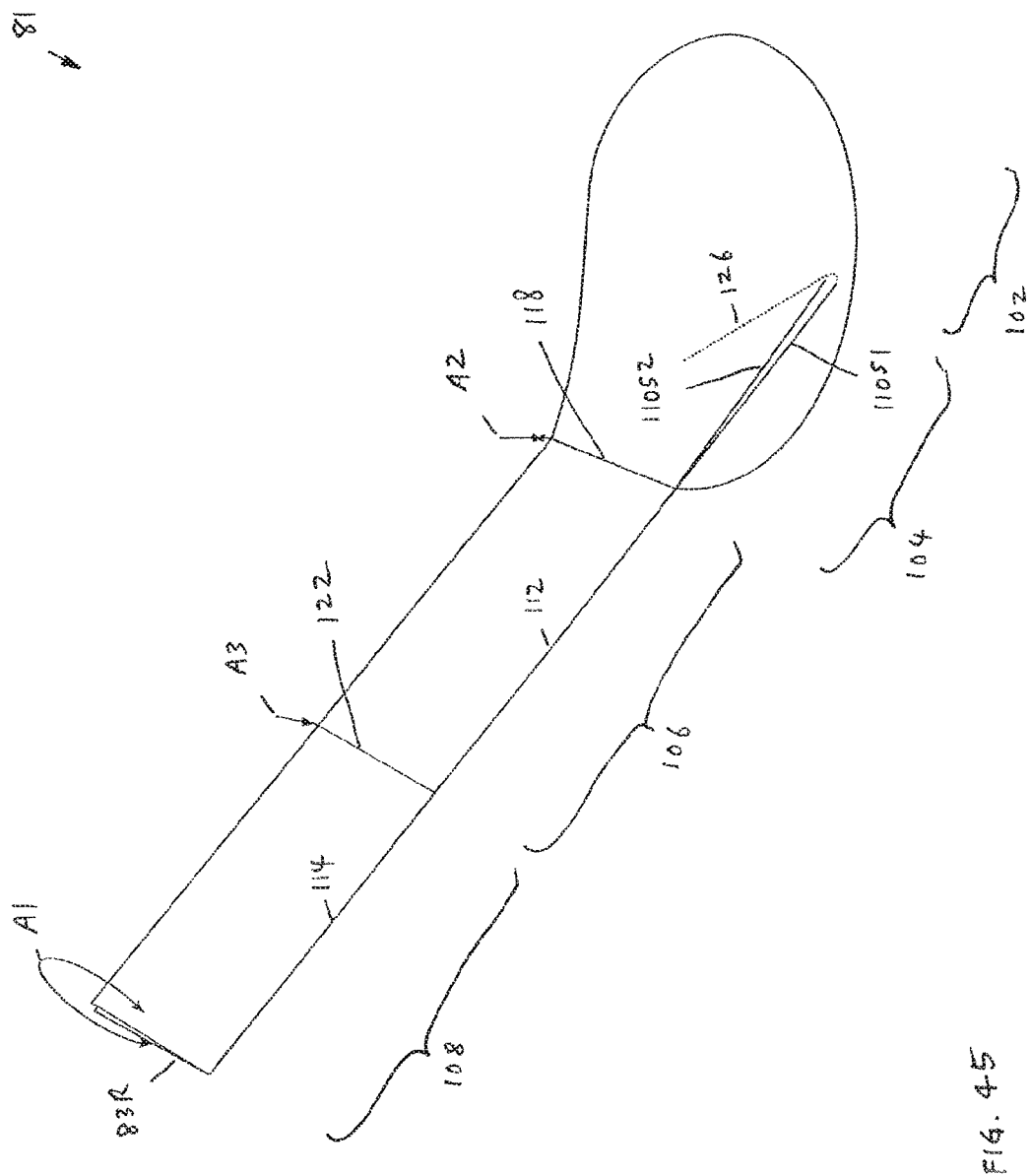
Figure 46:
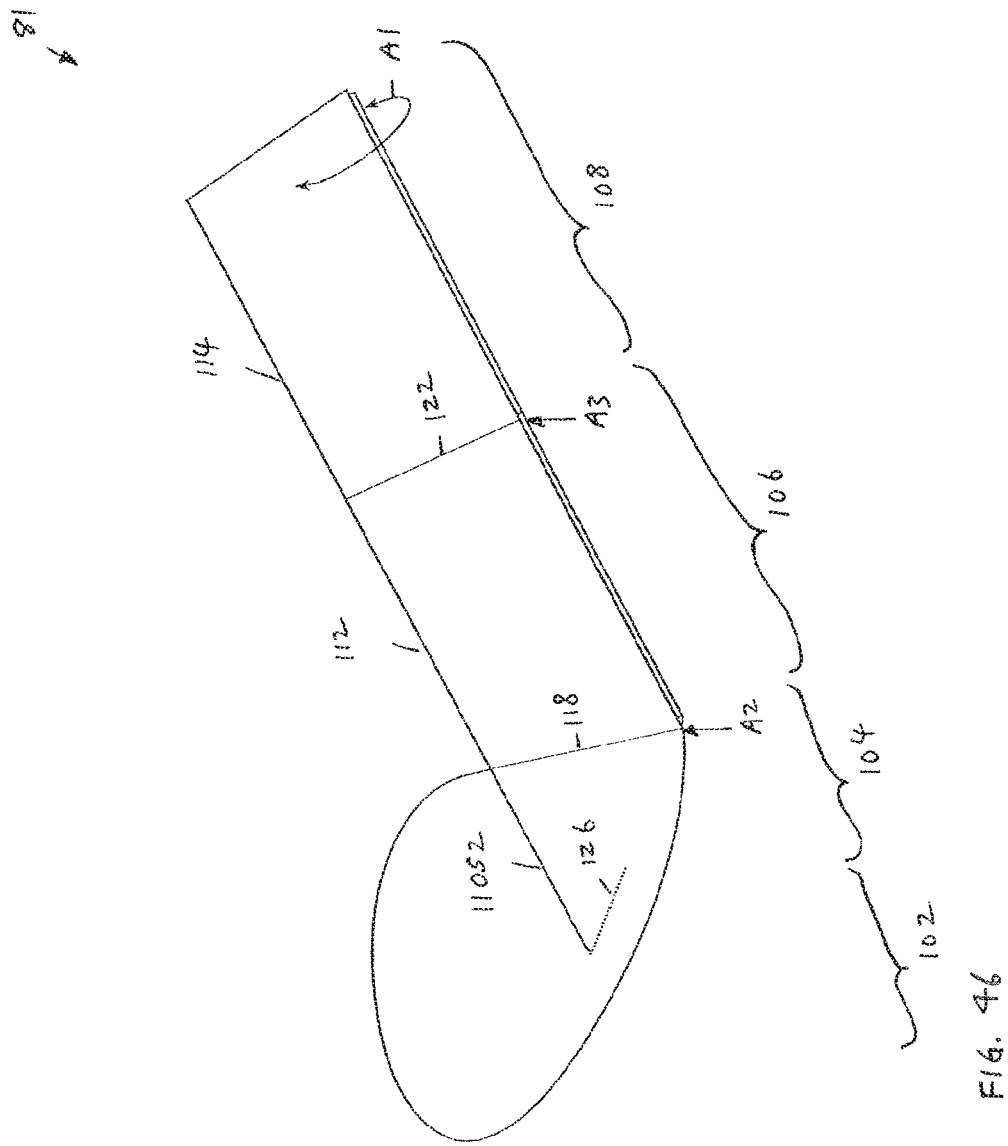
Figure 47:
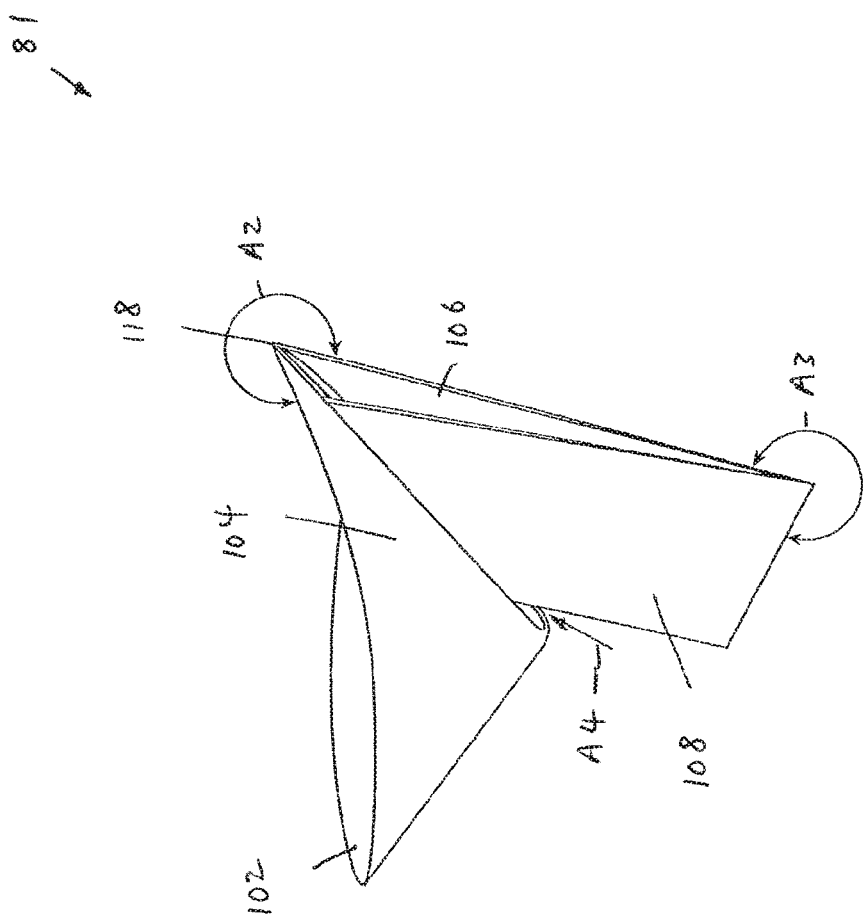
Figure 52:
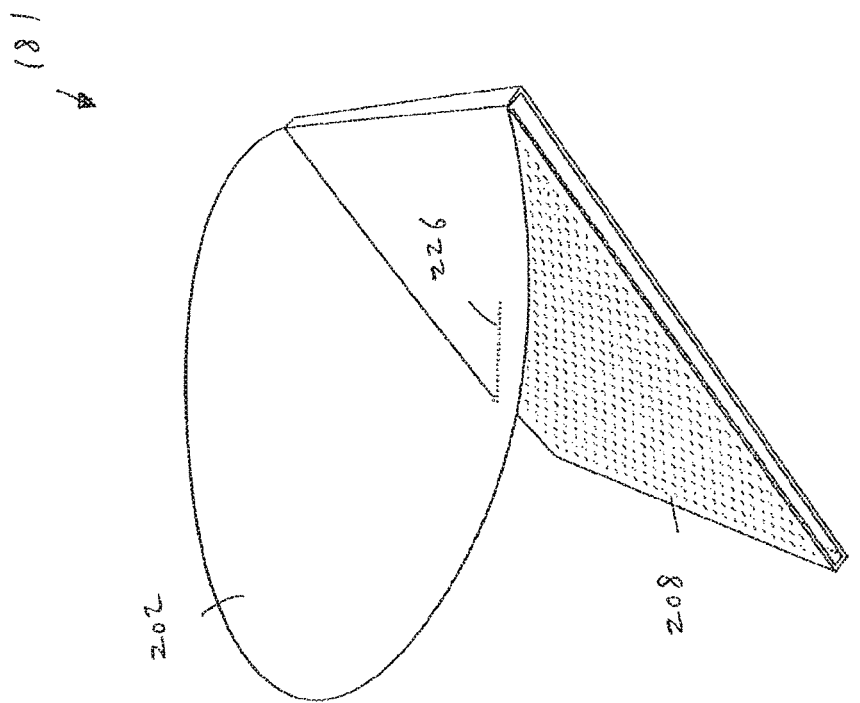
Figure 51:
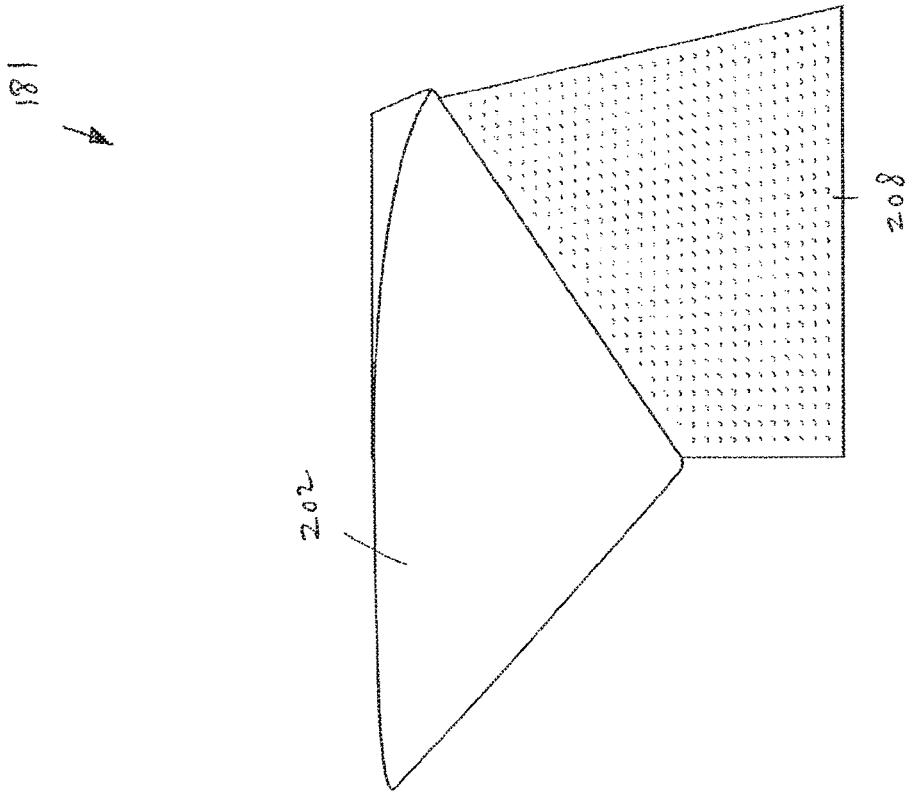
Figure 53:
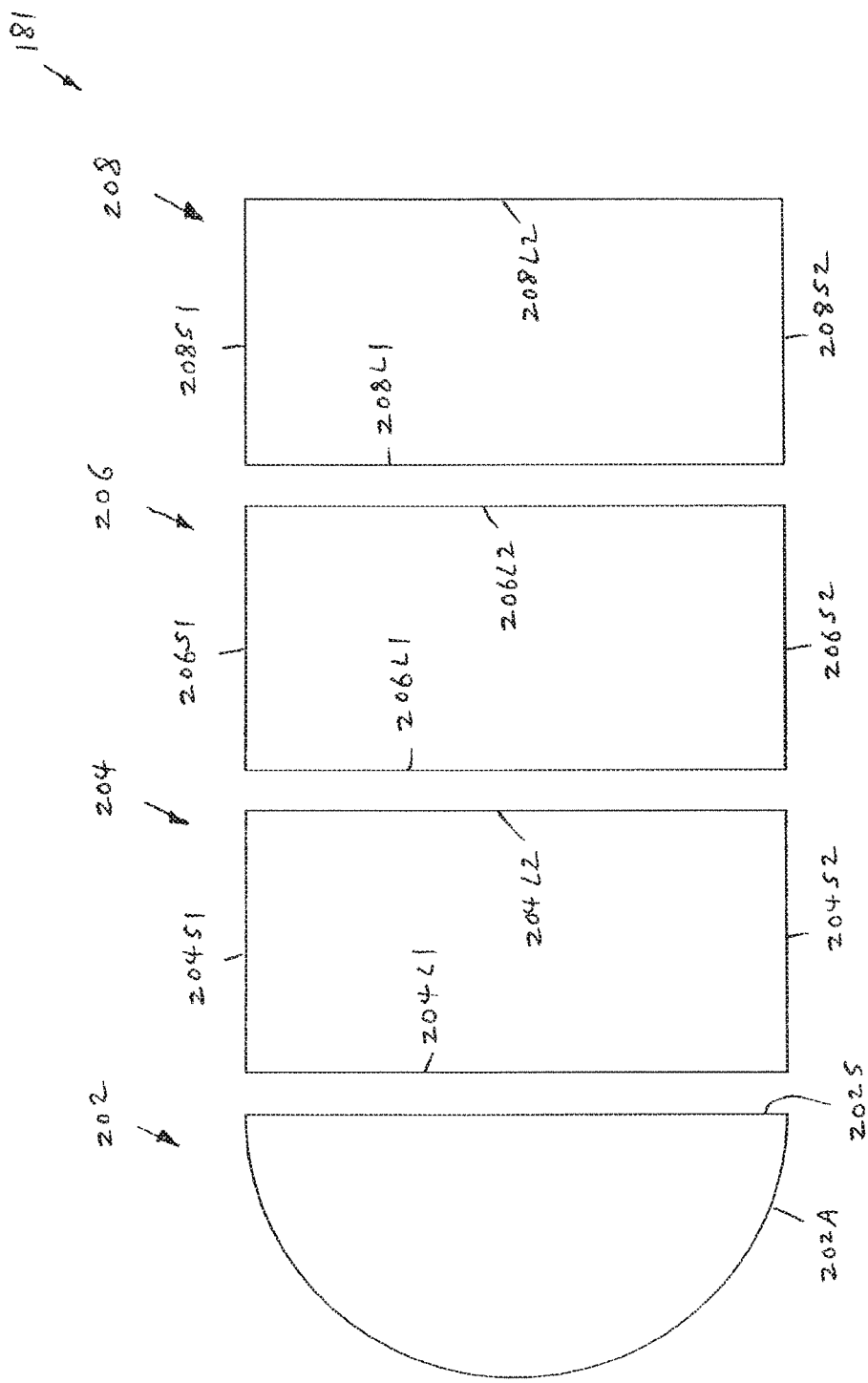
Figure 54:
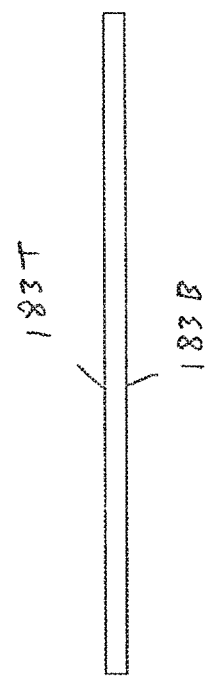

FIGS. 45, 46, and 47 show a method of folding the blank 81 to form a cup with a handle.

The method includes a step of folding the flat blank 81 along the straight bending line segments 112 and the 114, as indicated by an arrow A1, which is shown in FIGS. 45 and 46. This causes the semi-circular portion 102 and the first rectangular portion 104 to fold for forming a container portion while the second rectangular portion 106 and the third rectangular portion 108 folds to form an initial handle portion of the cup.

After this, the blank 81 is folded along the straight bending line segment 118, as indicated by an arrow A2, which is shown in FIGS. 45, 46, and 47. The container portion is then inclined at an acute angle with respect to the handle portion.

The blank 81 is then folded along the straight bending line segment 122, as indicated by an arrow A3, which is shown in FIGS. 45, 46, and 47. In other words, the handle portion is bent about straight bending line segment 122.

The third rectangular portion 108 is later inserted into a slit that is formed by the folded first rectangular portion 104, as indicated by an arrow A4, which is shown in FIG. 47, wherein the second rectangular portion 106 and the third rectangular portion 108 are bent and placed to form the final handle portion of the cup.

Figure 1:
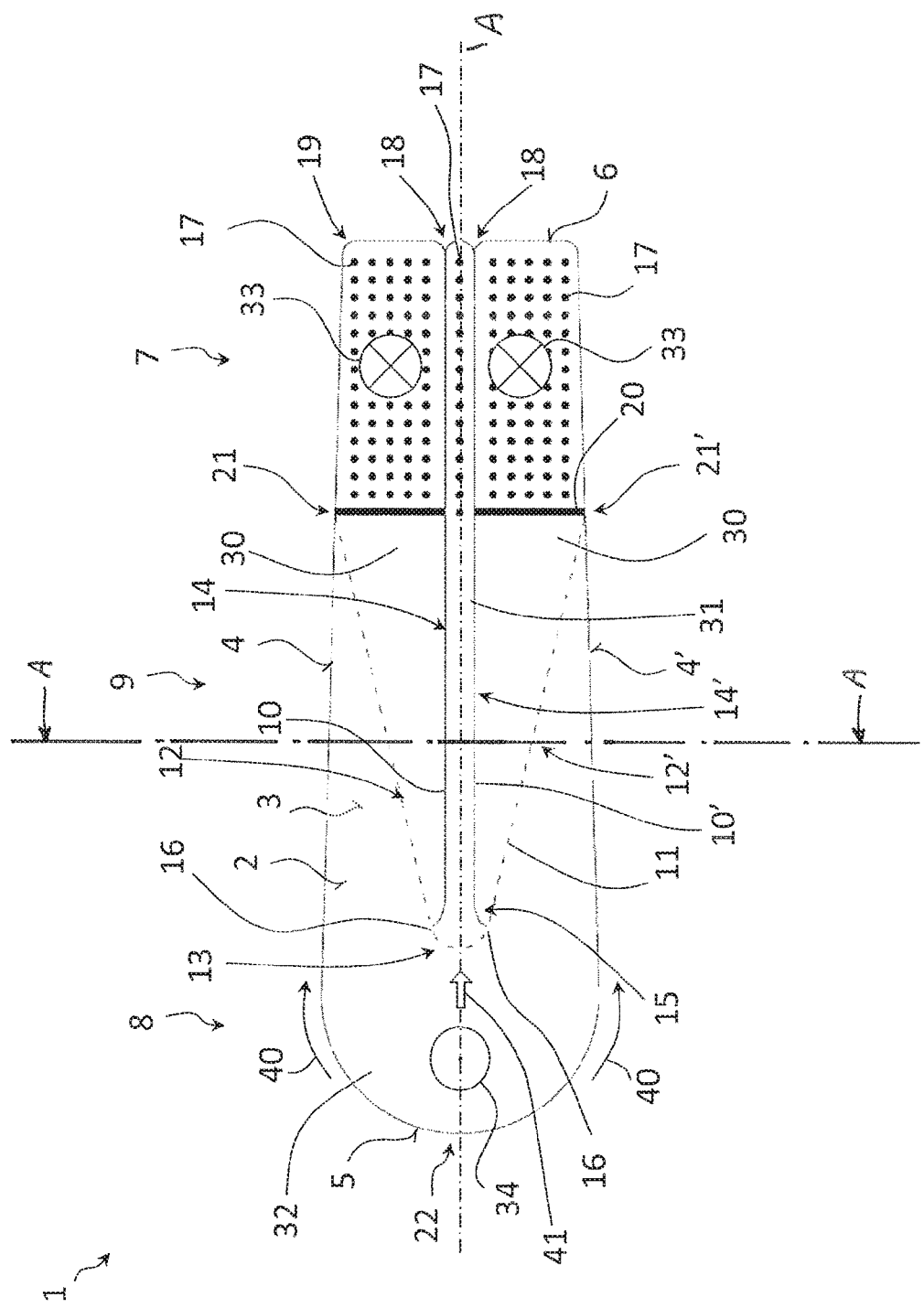
Figure 2:
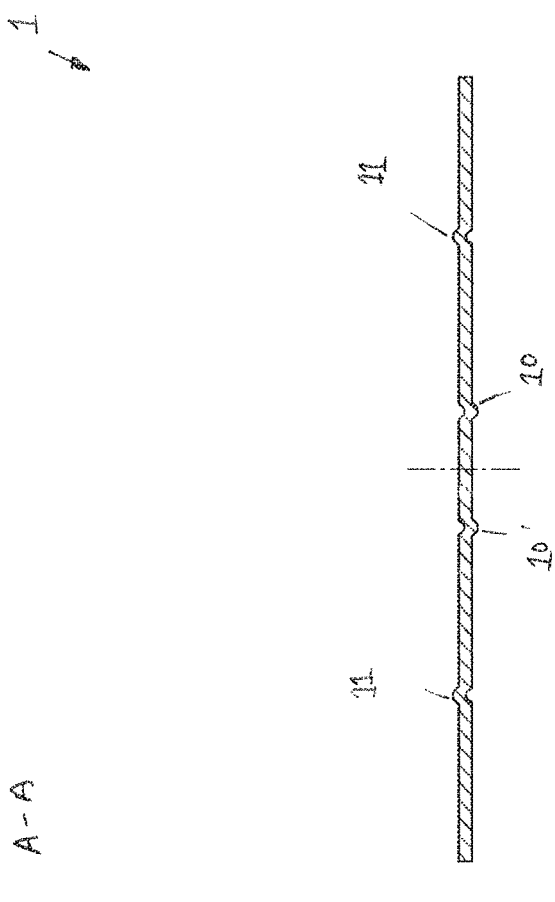
Figure 3:
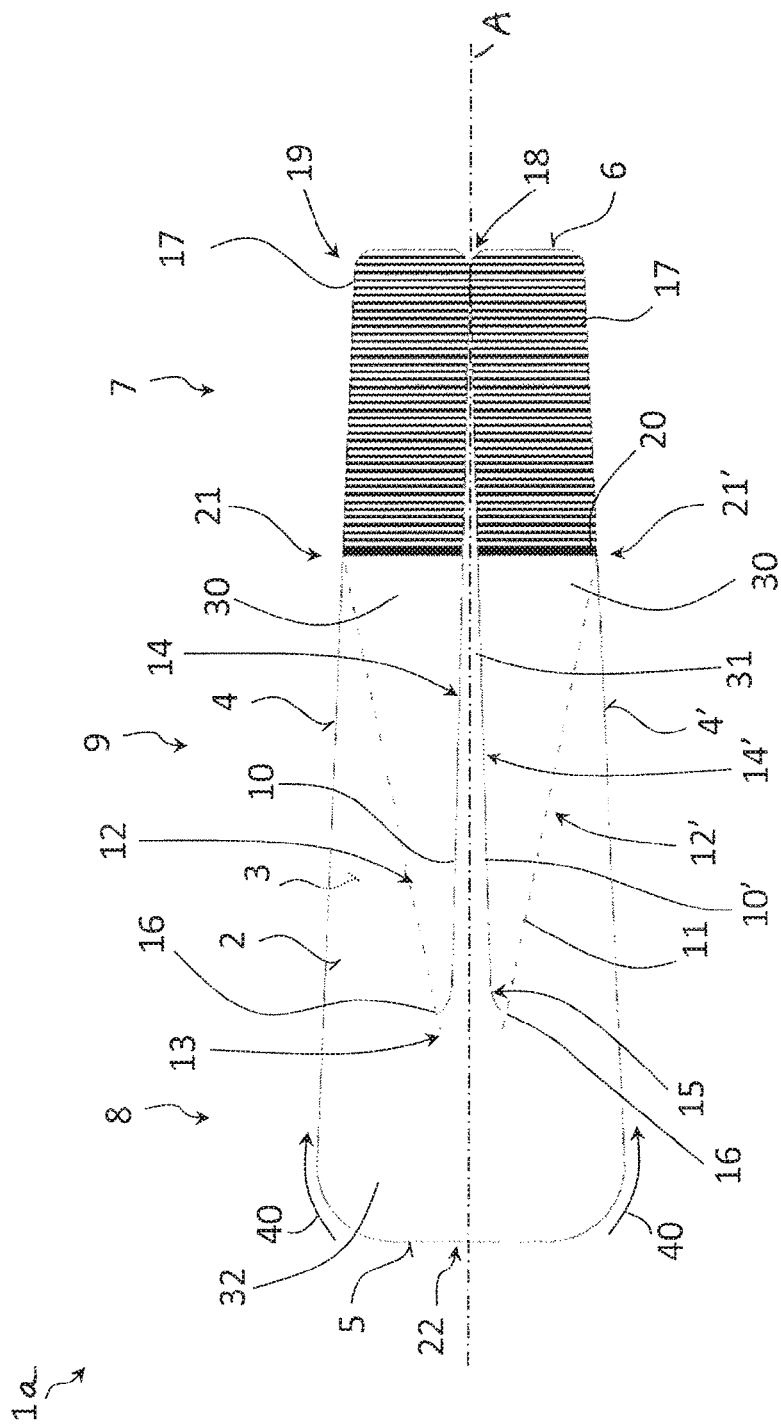
Figure 4:
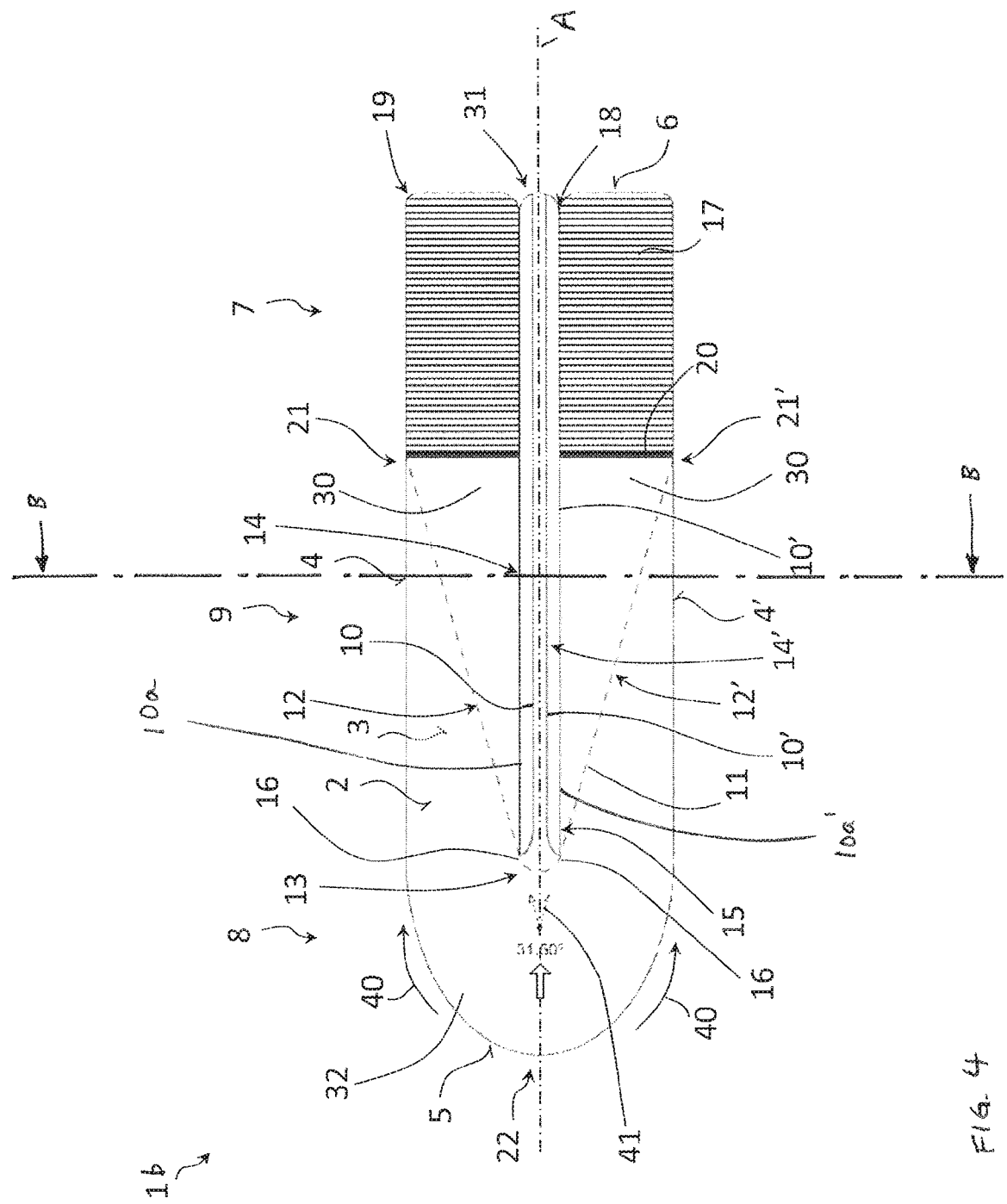
Figure 5:
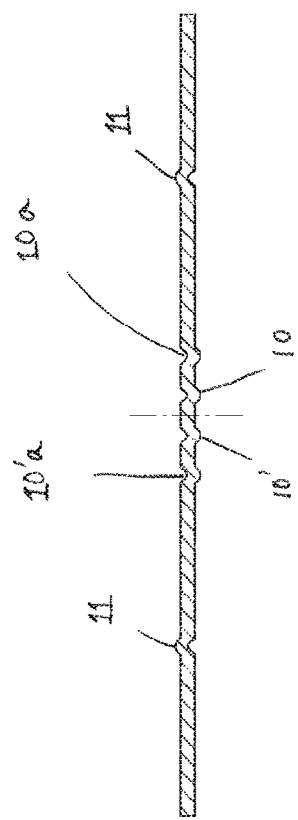
Figure 6:
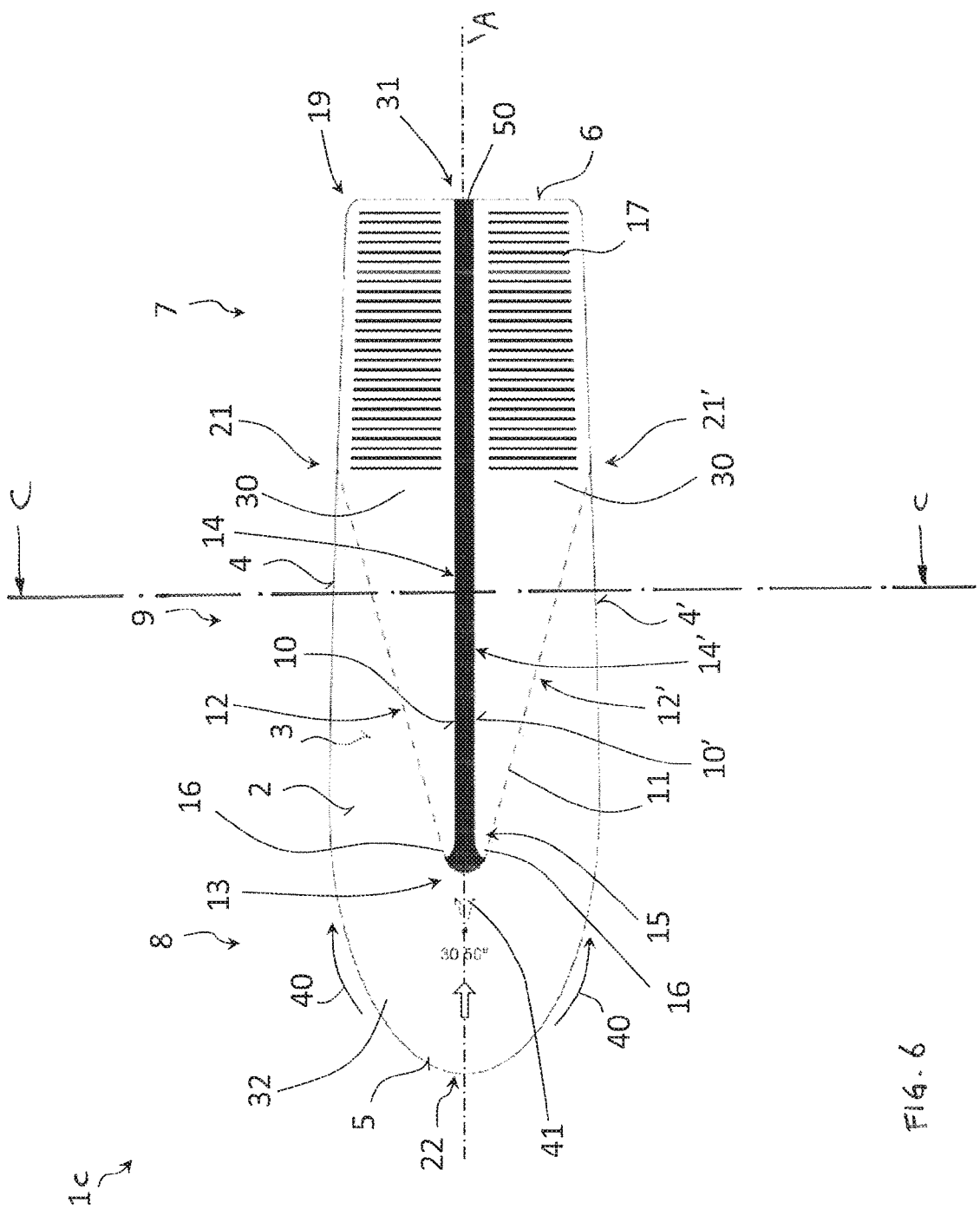
Figure 7:
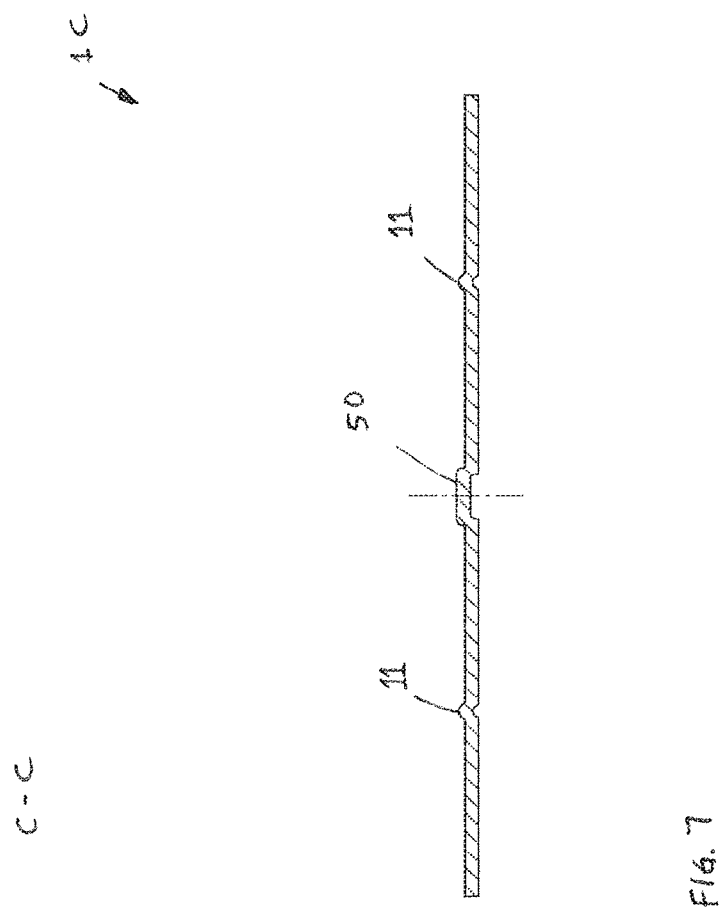
Figure 8:
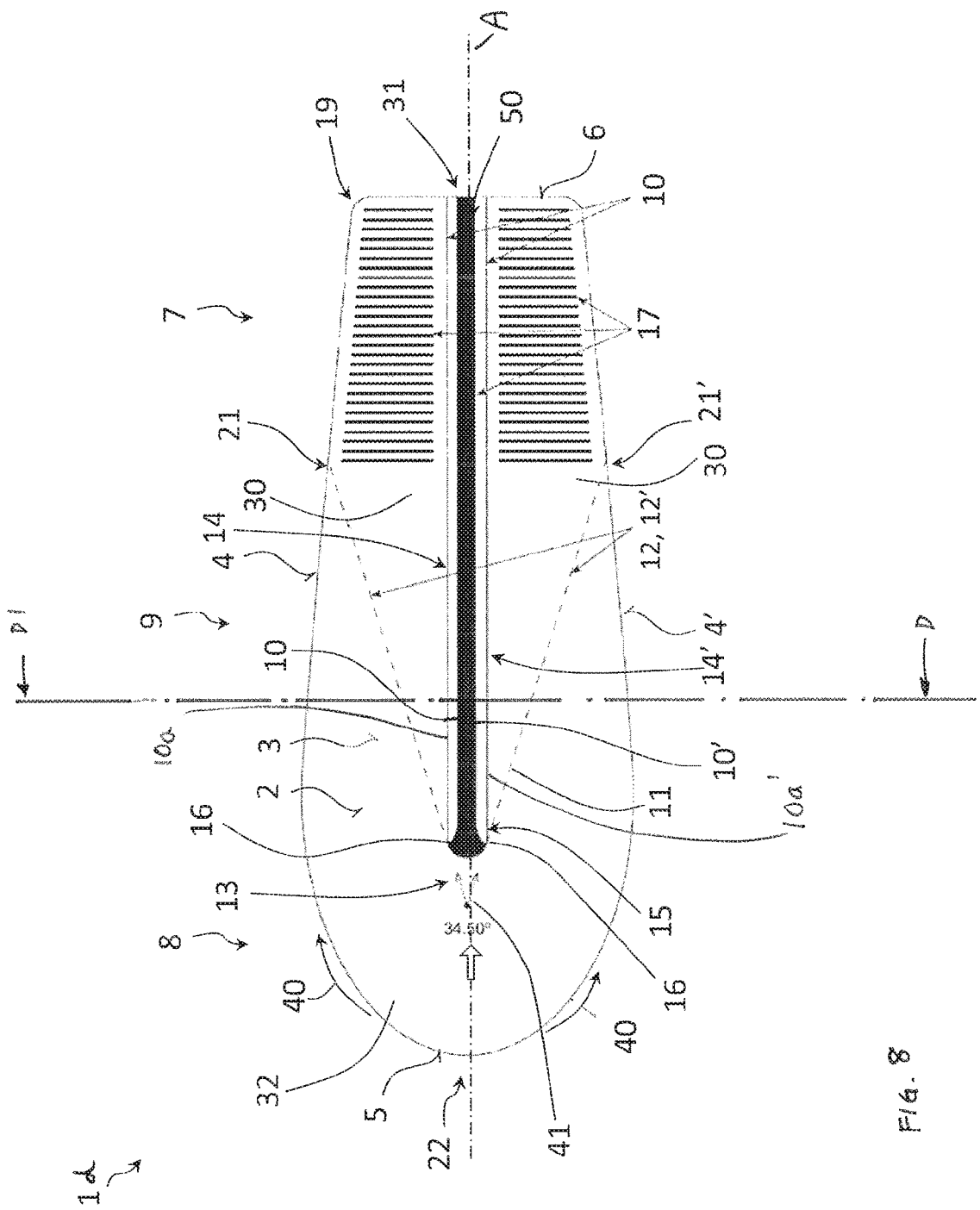
Figure 9:
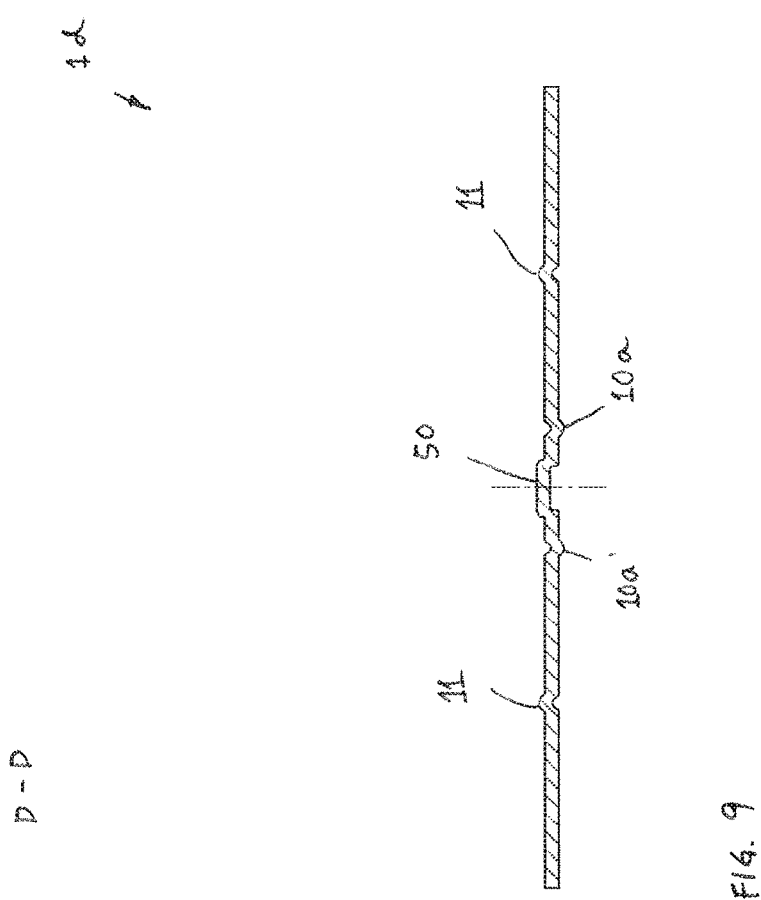
Figure 10:
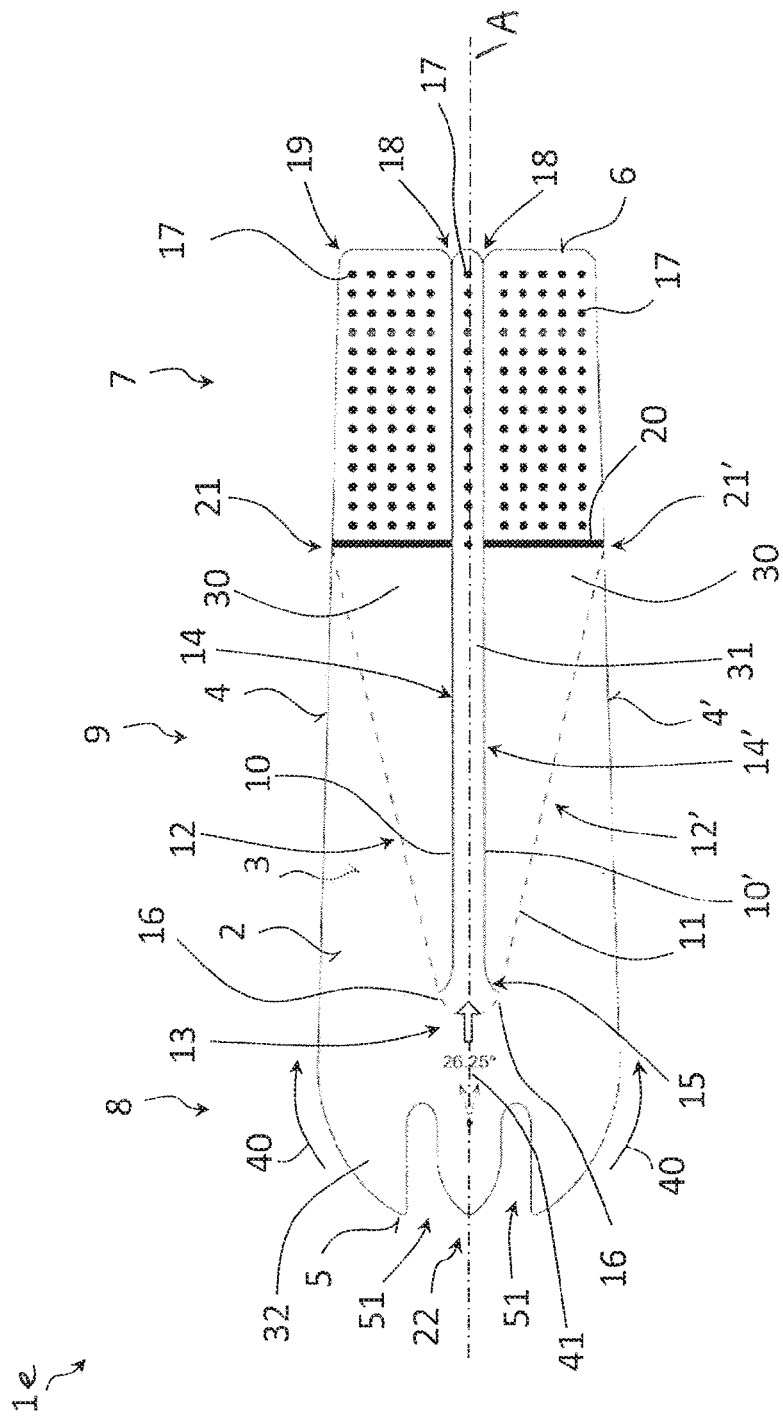
Figure 11:
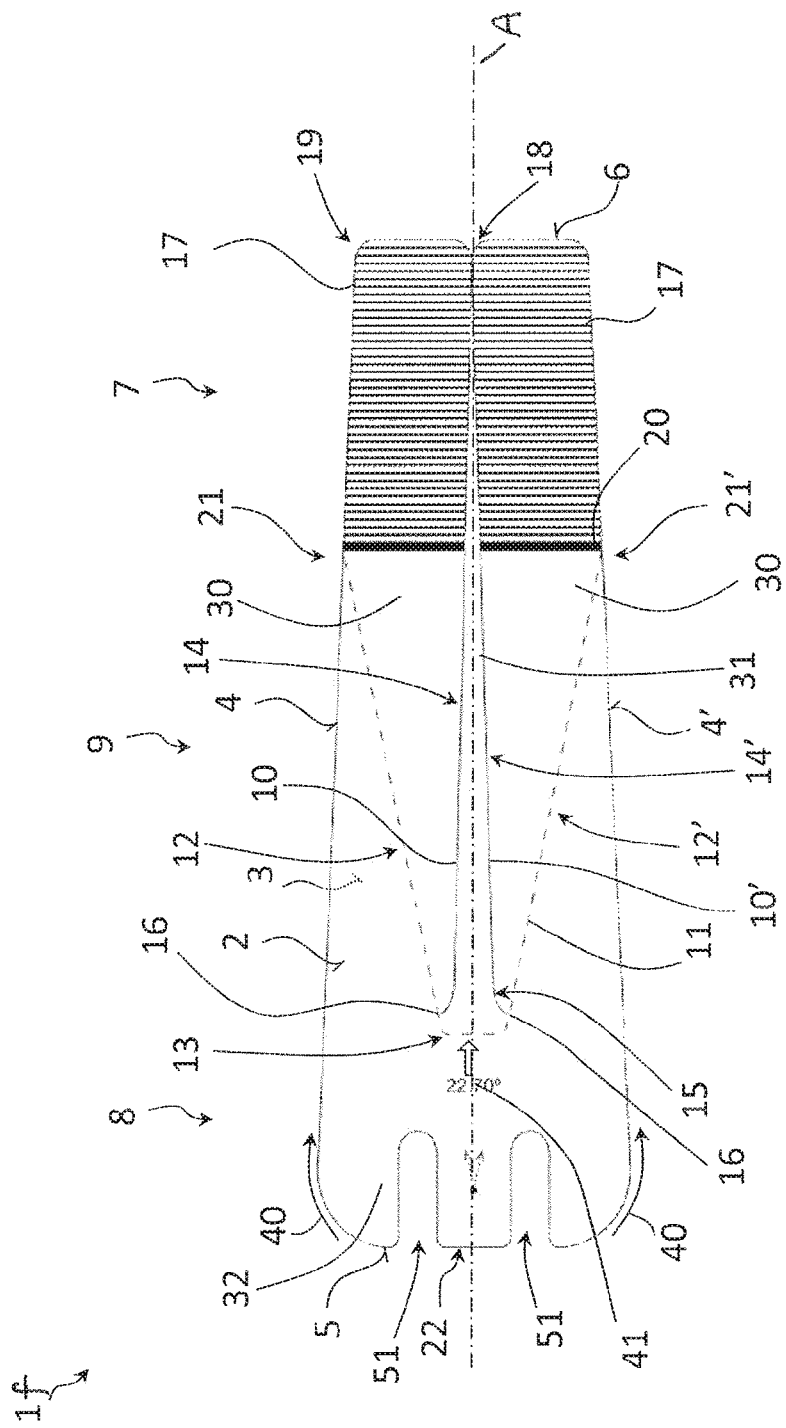
Figure 12:
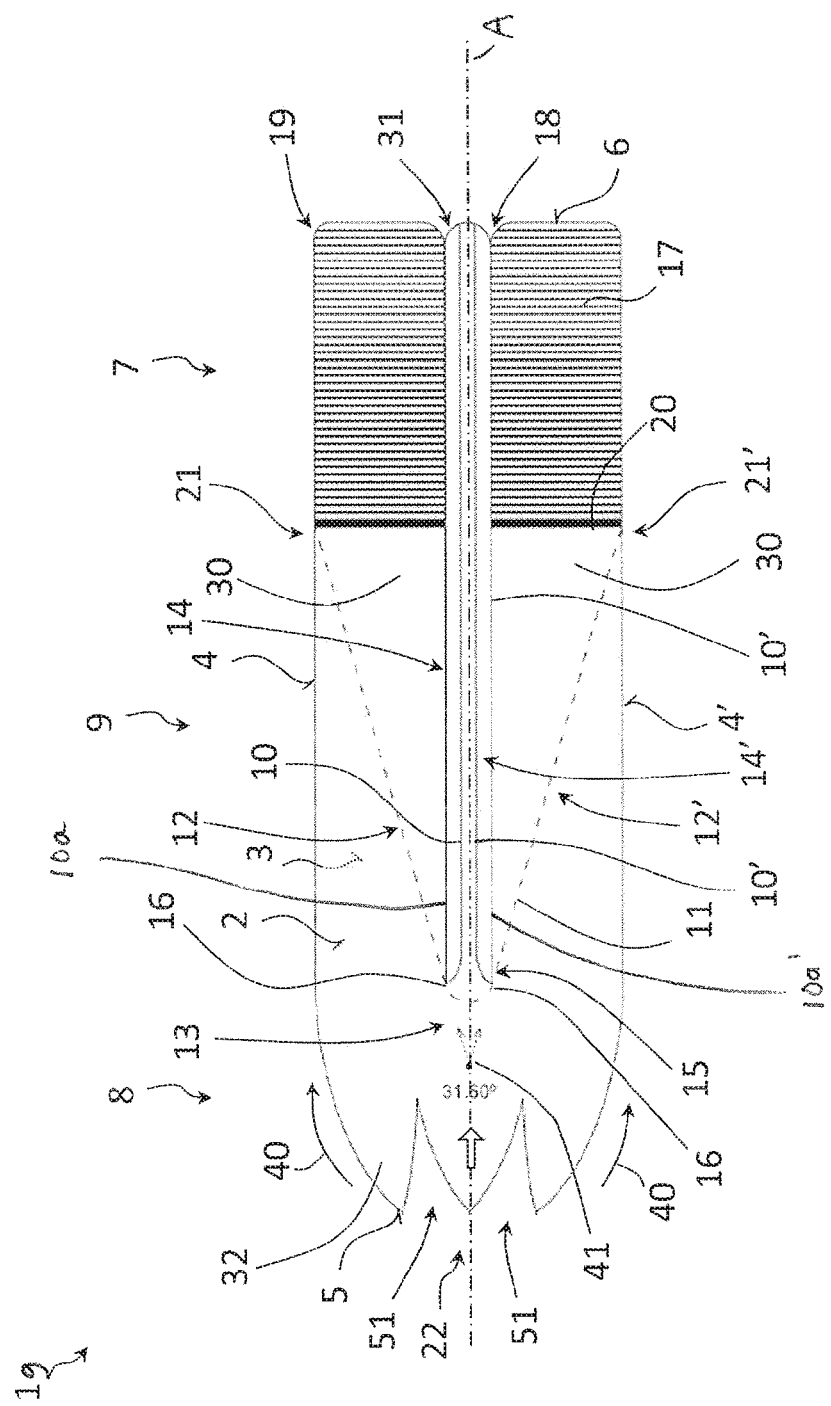
Figure 13:
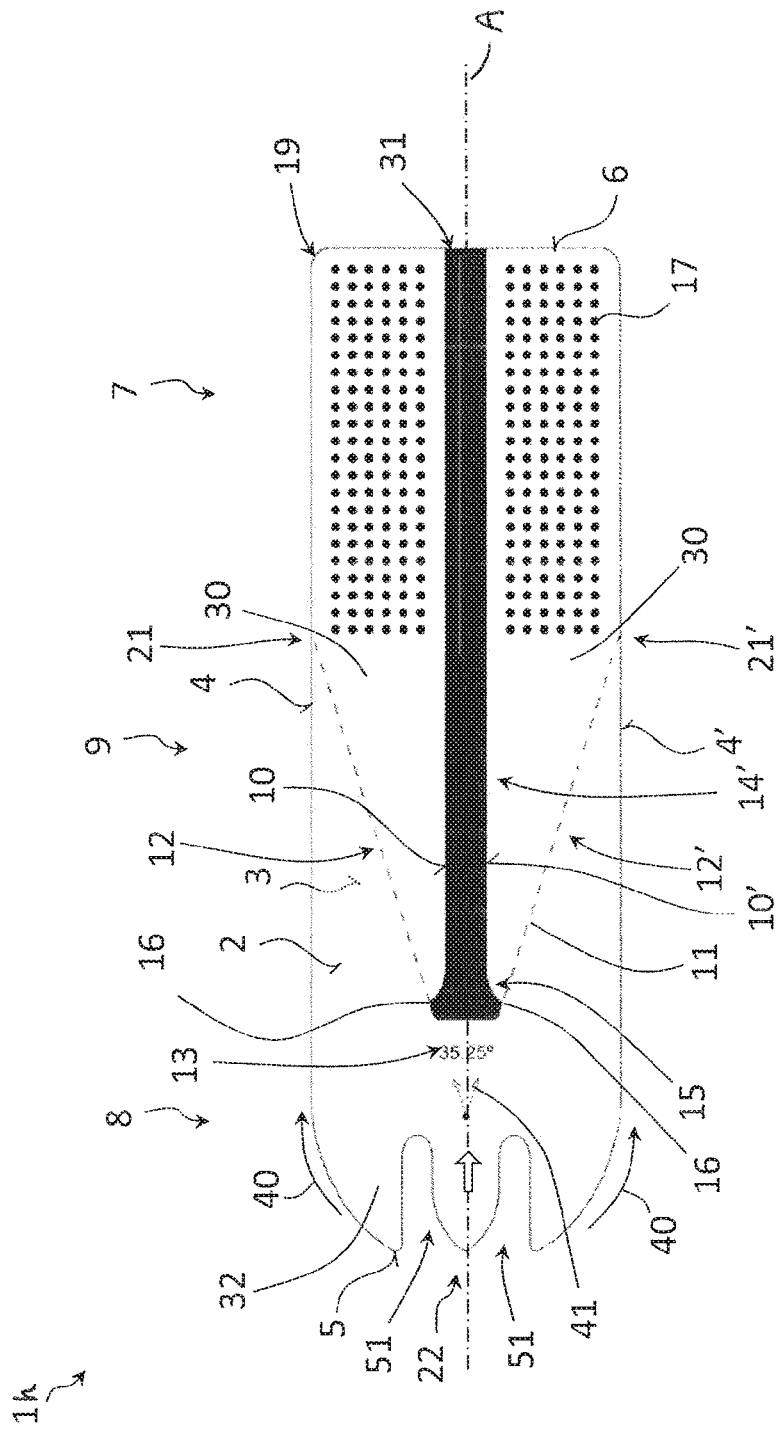
Figure 20:
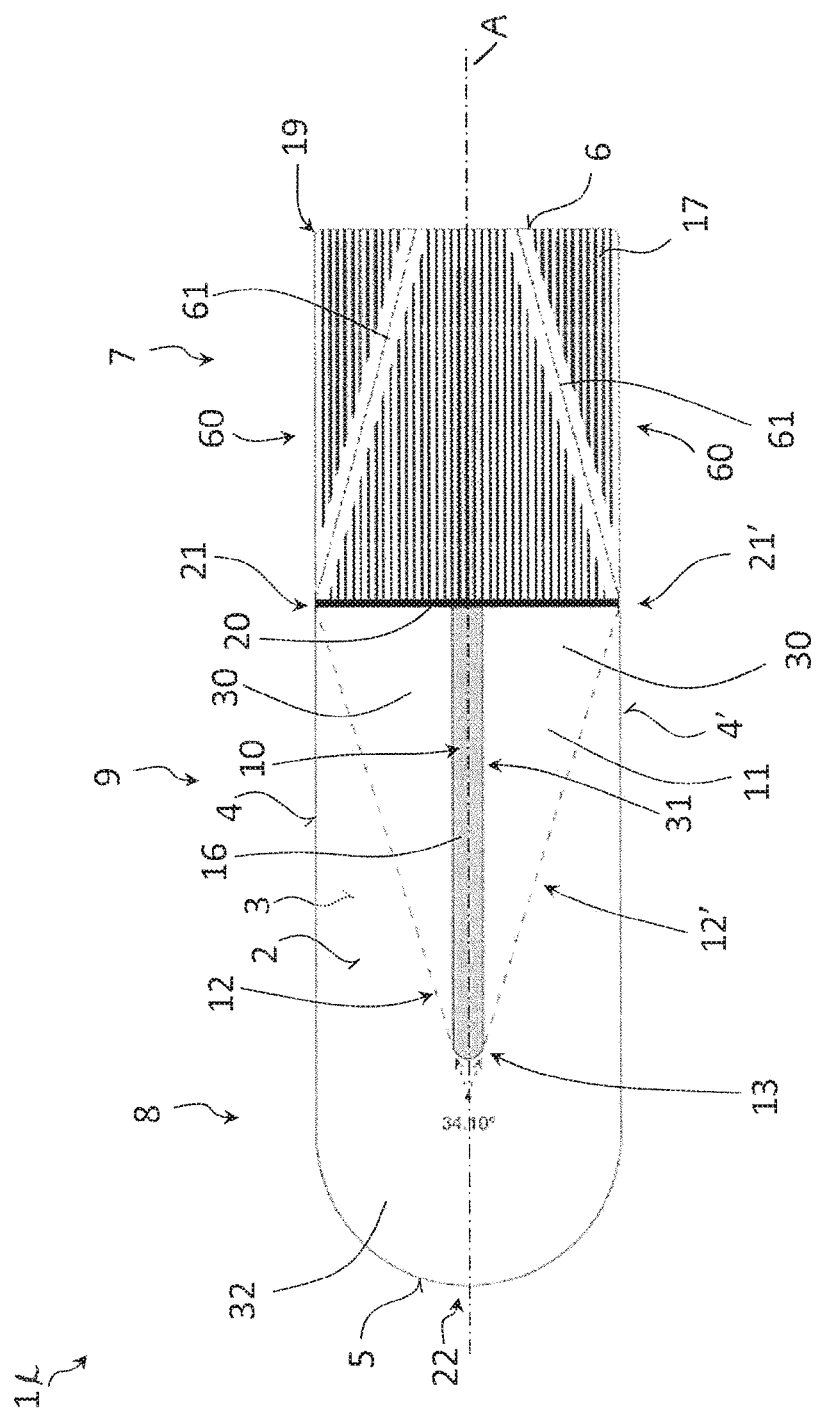
Figure 21:
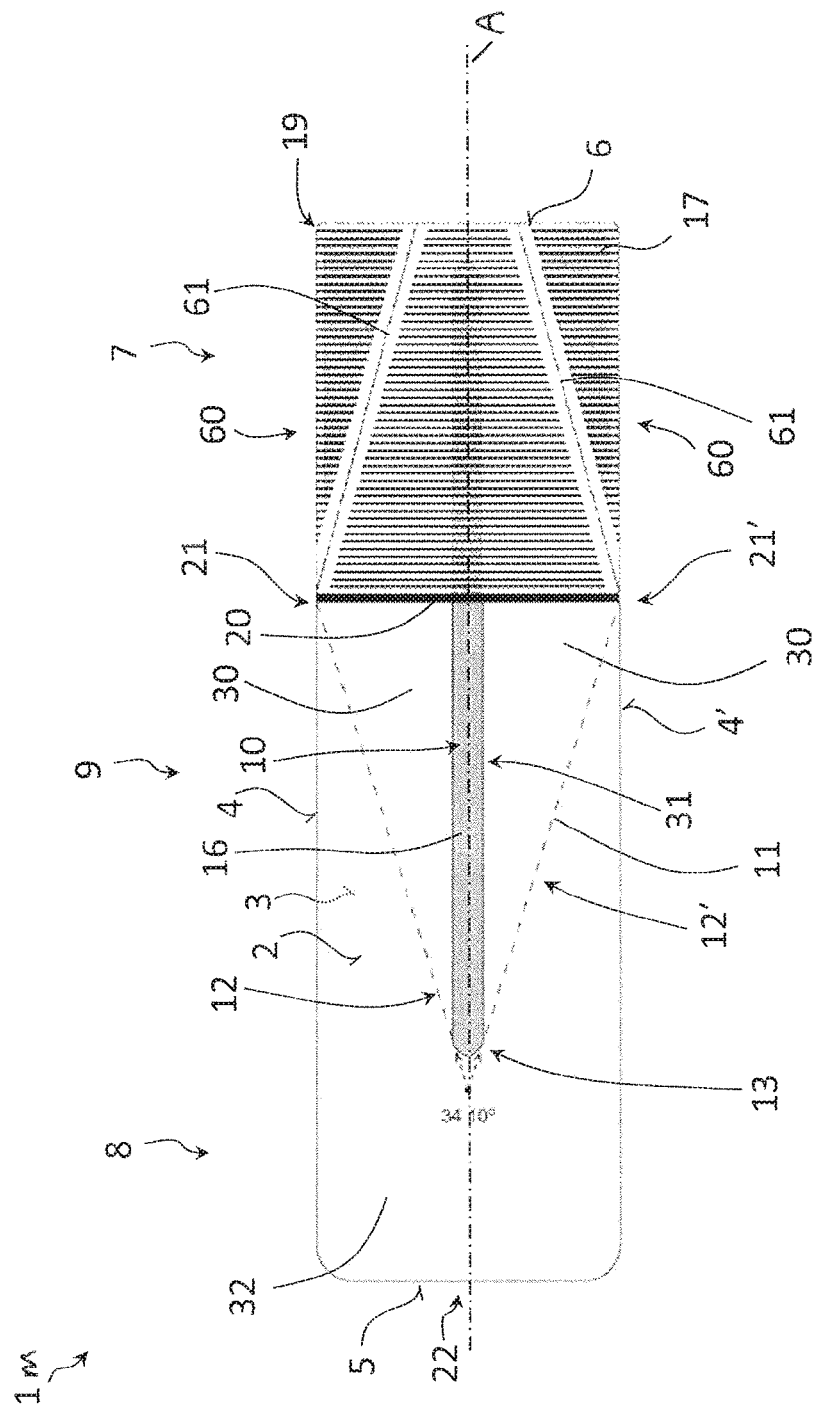
Figure 22:
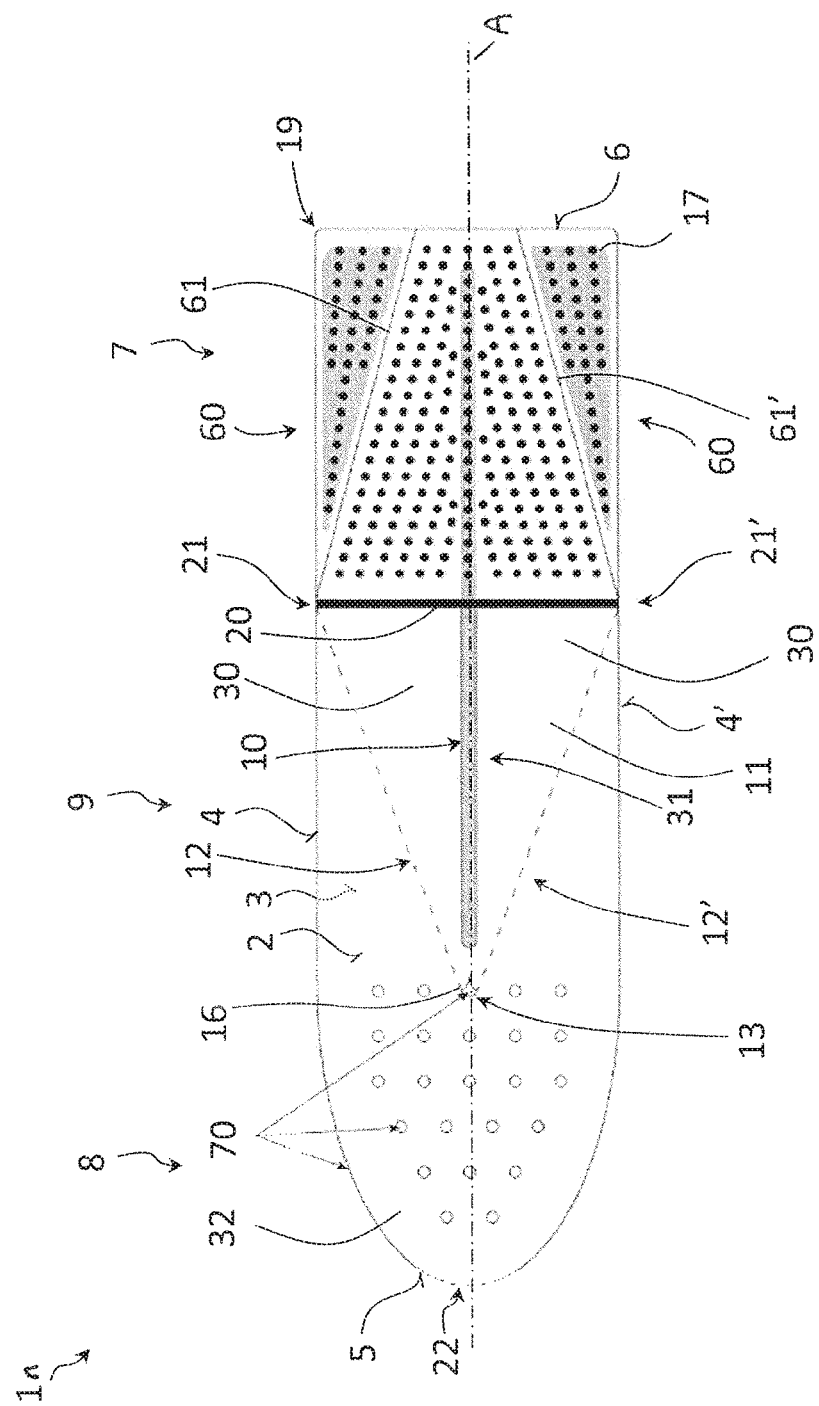
Figure 23:
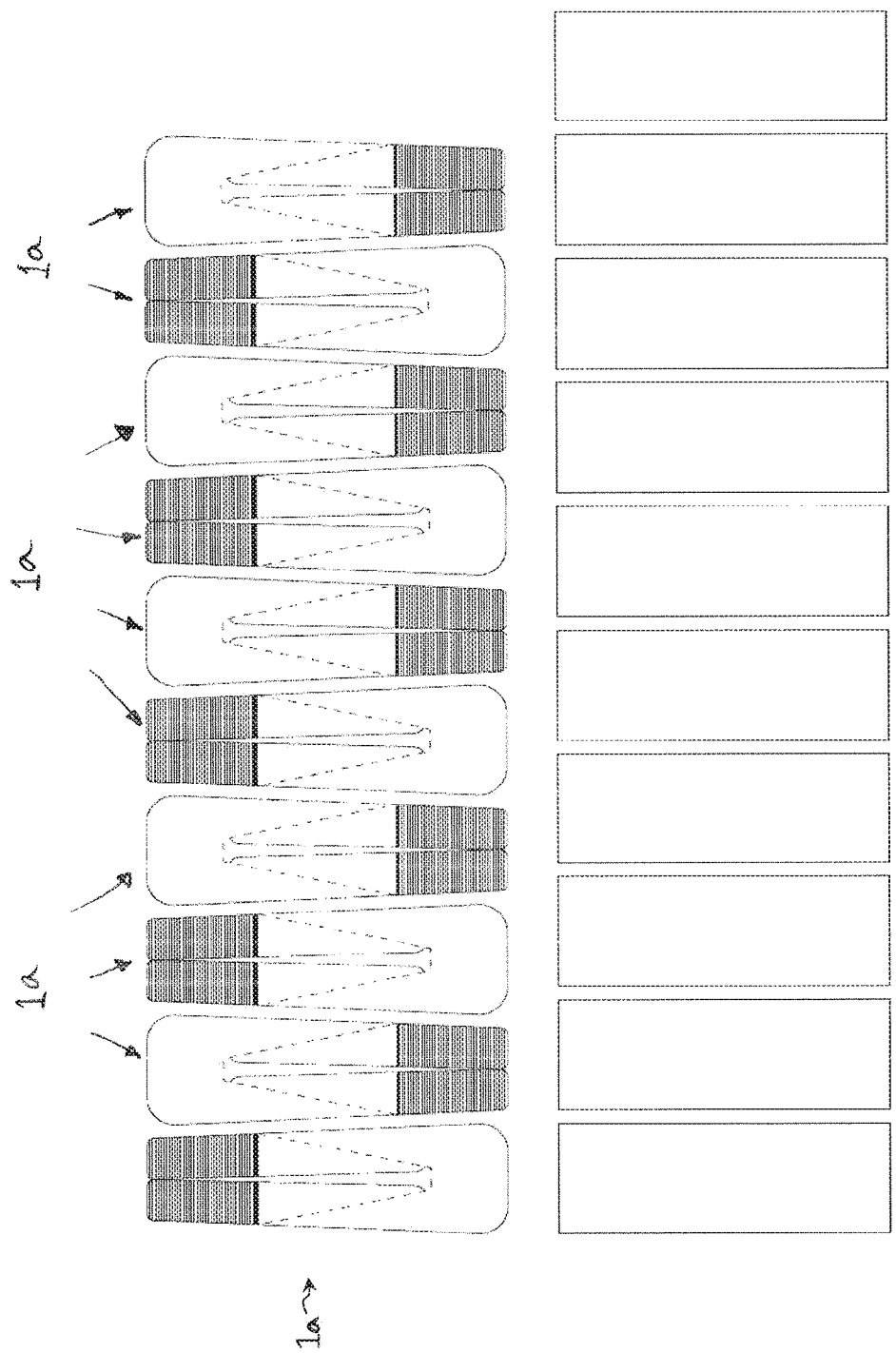
Figure 24:
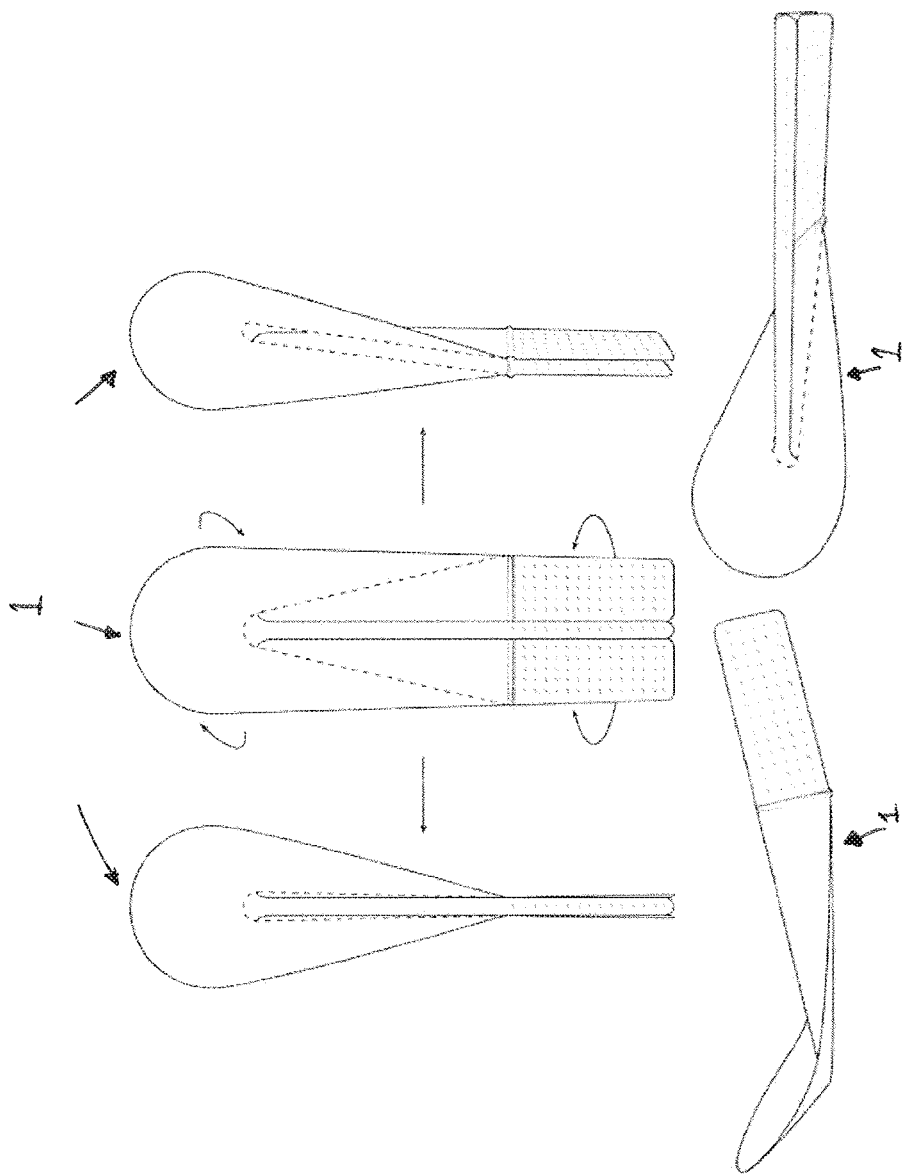
Figure 25:
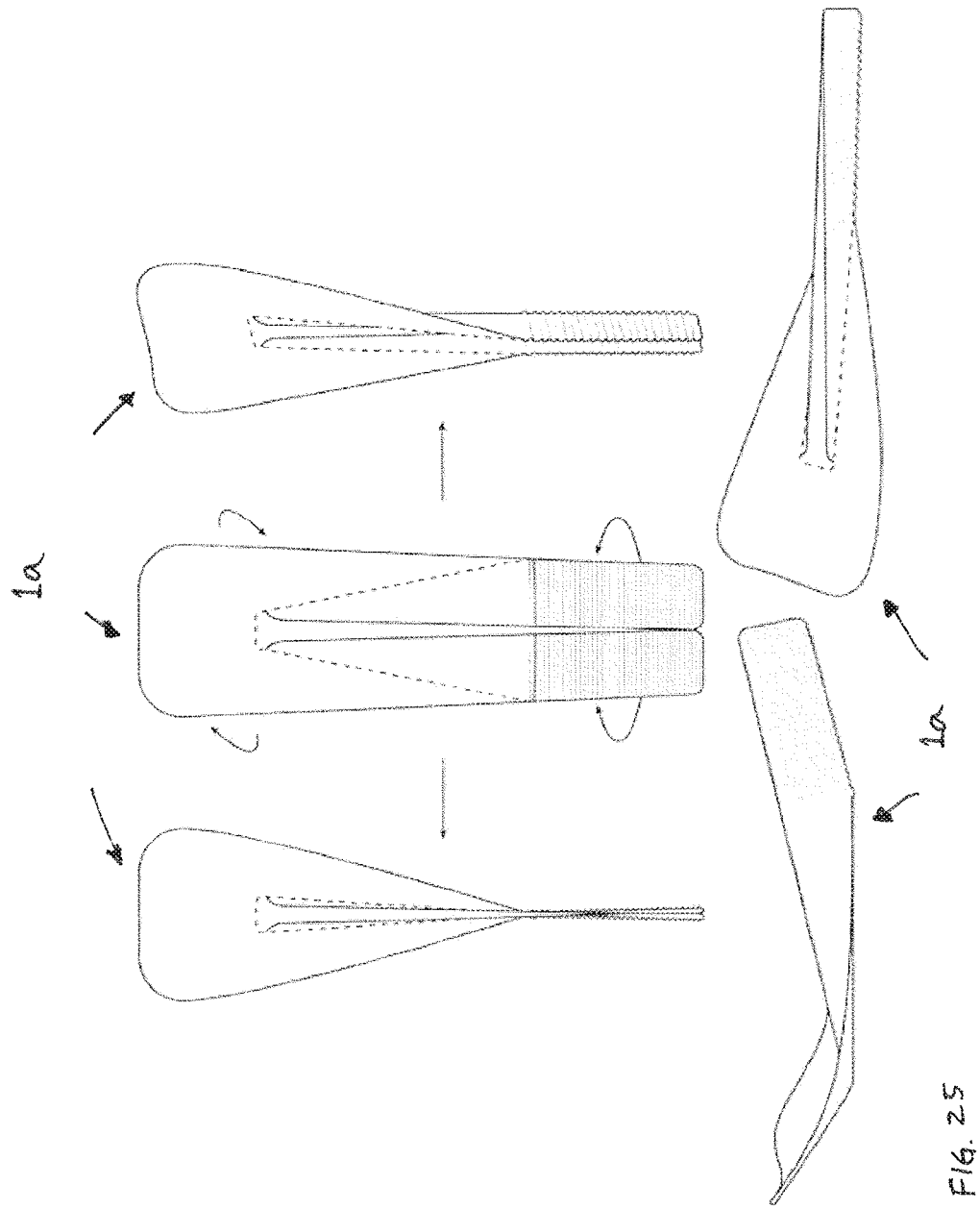
Figure 26:
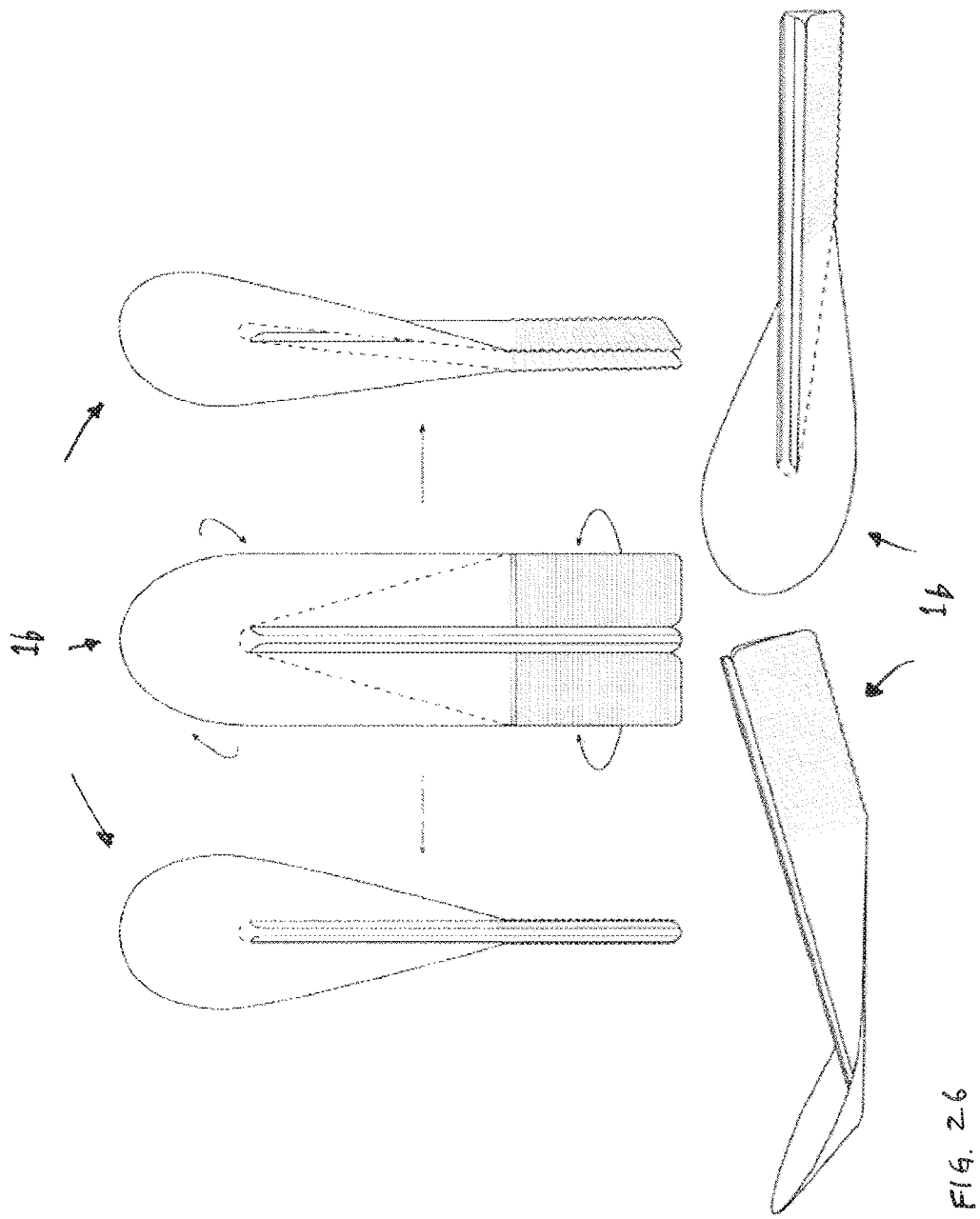
Figure 27:
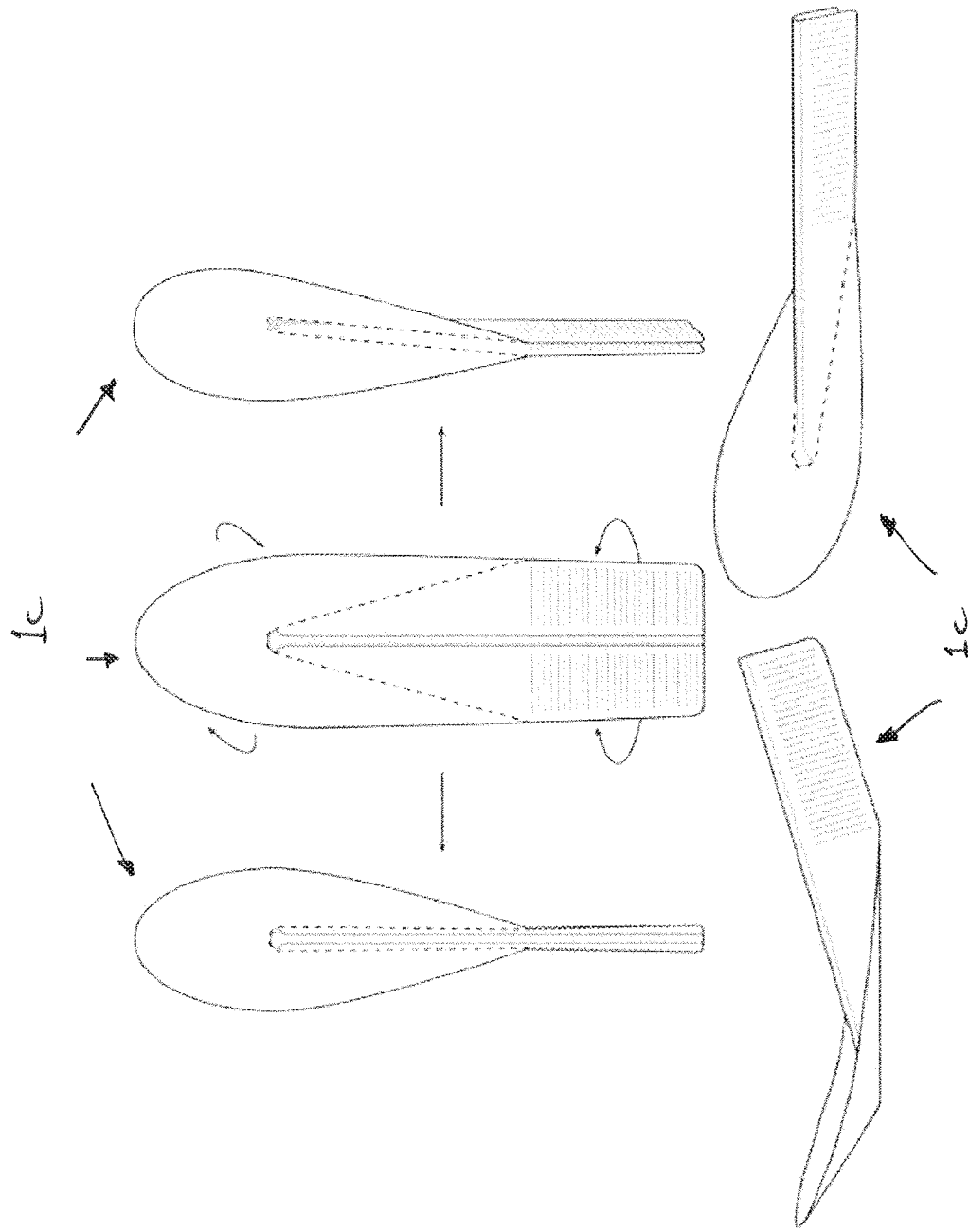
Figure 28:
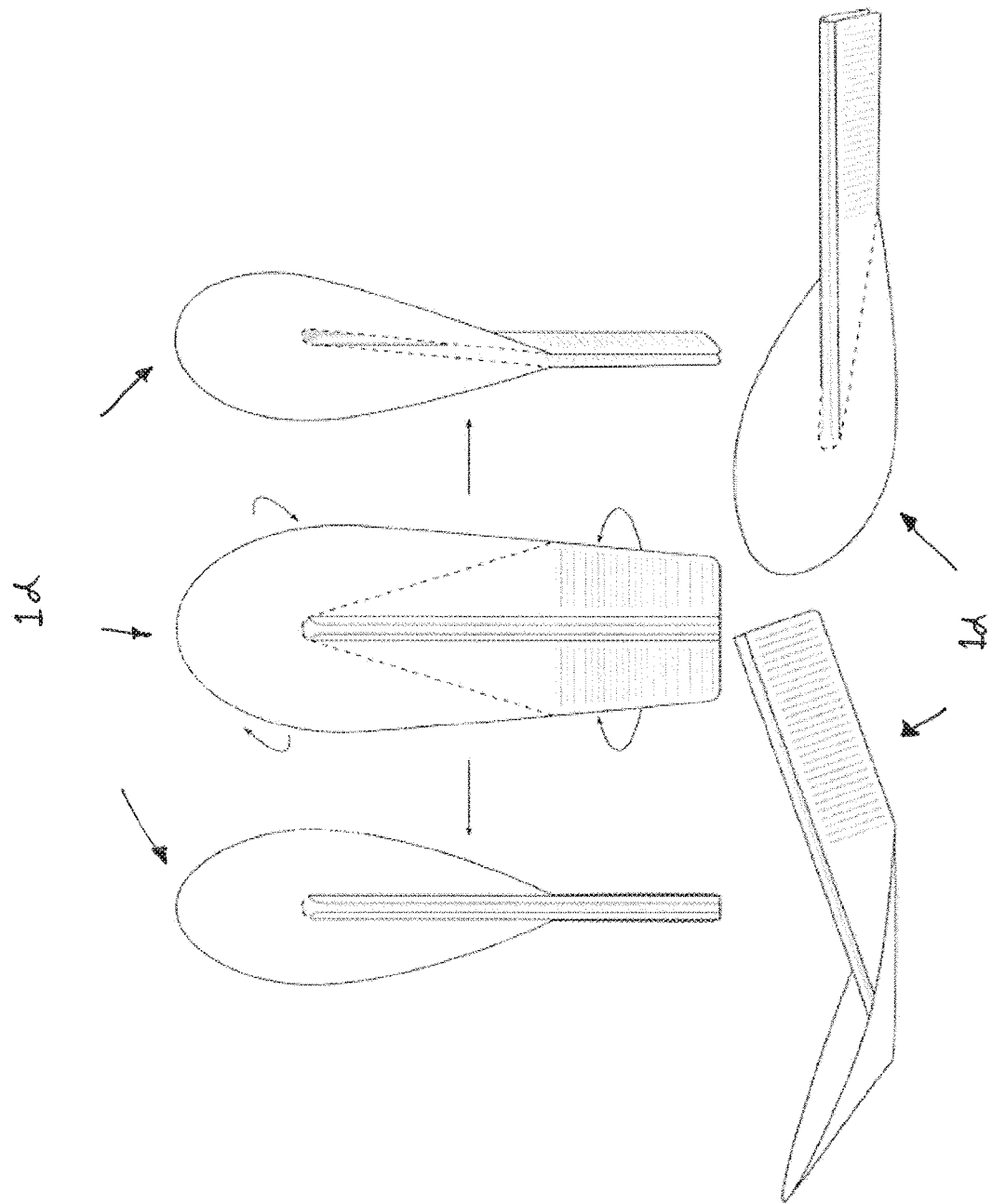
Figure 29:
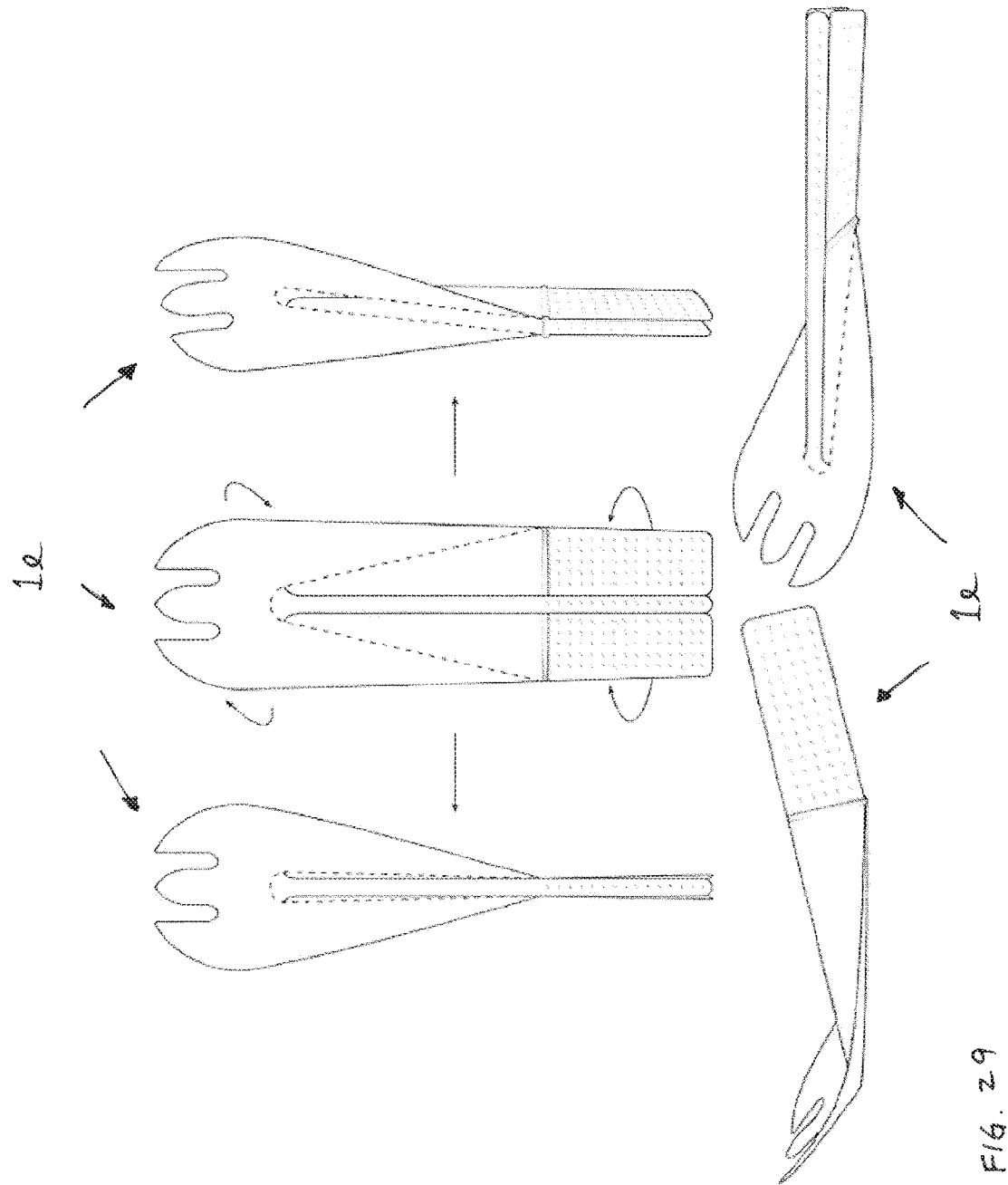
Figure 30:
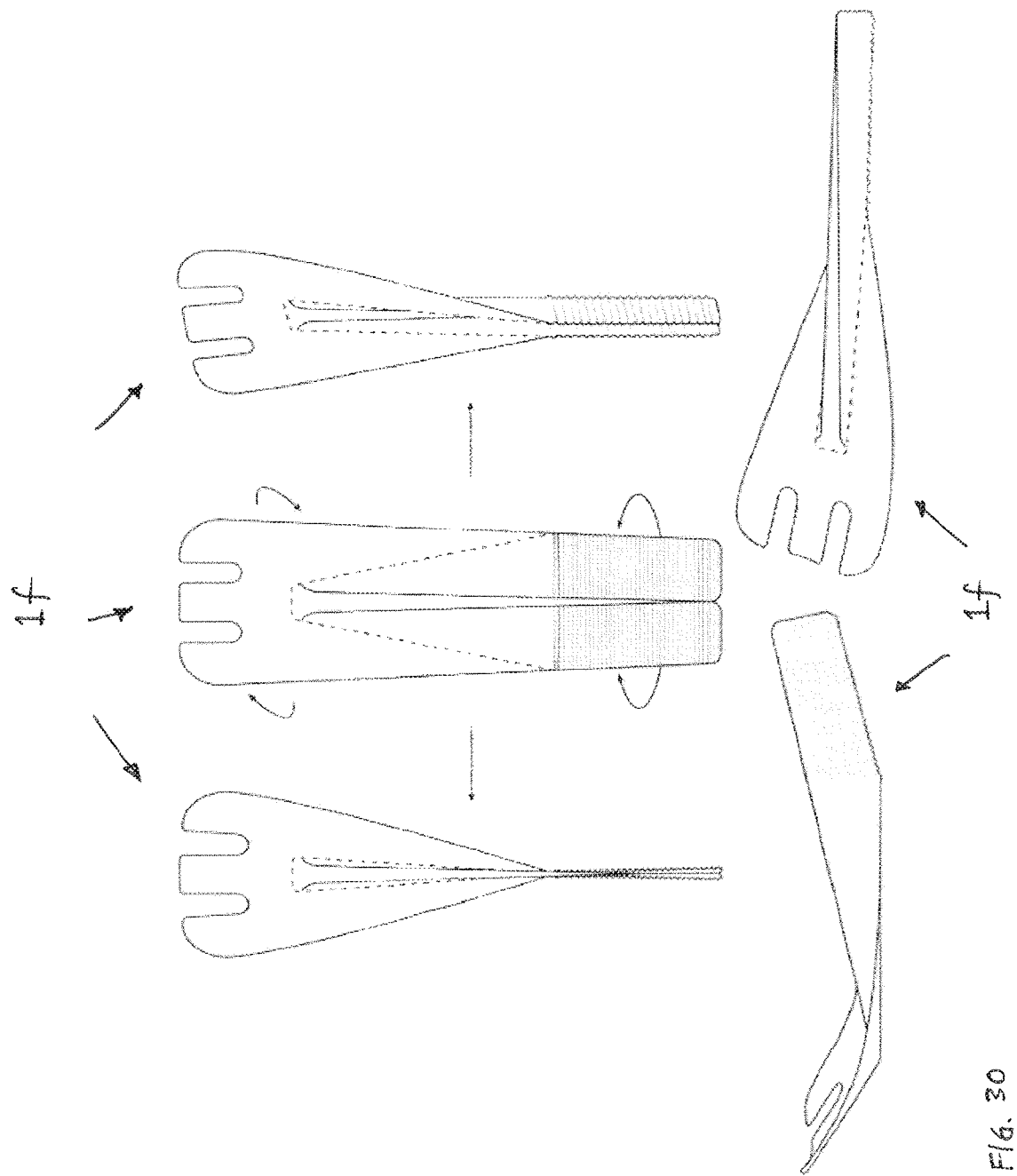
Figure 31:
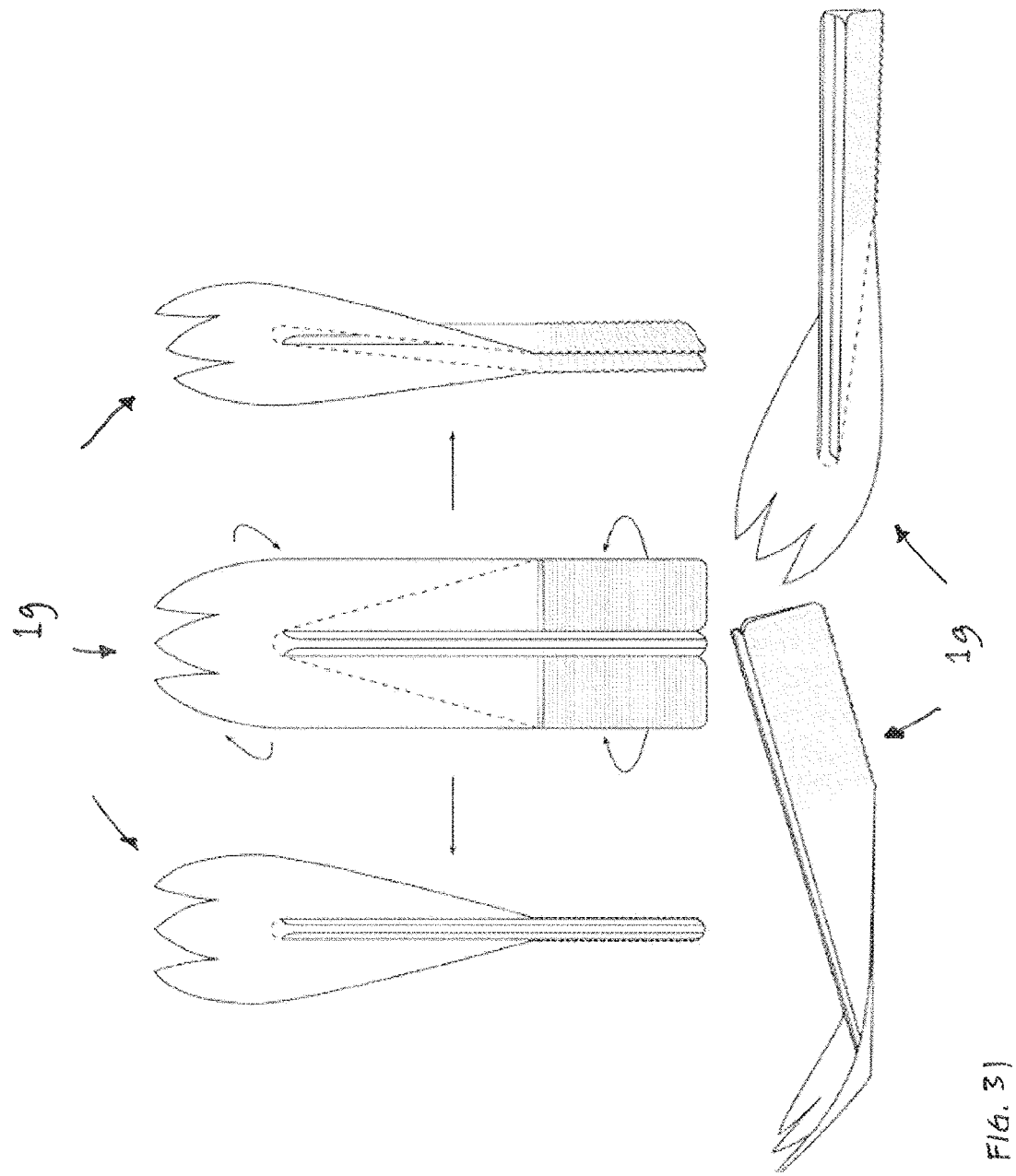
Figure 32:
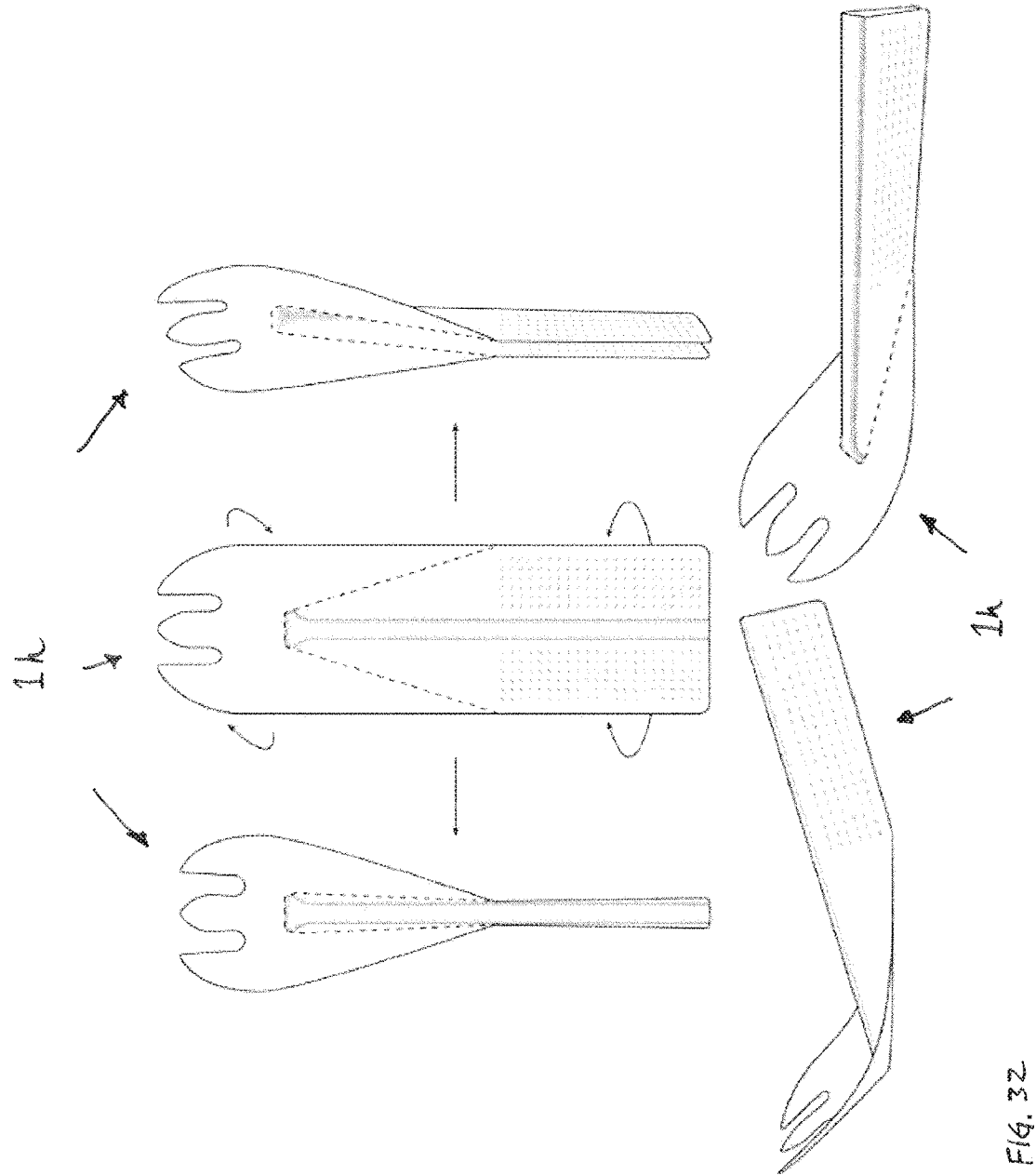
Figure 33:
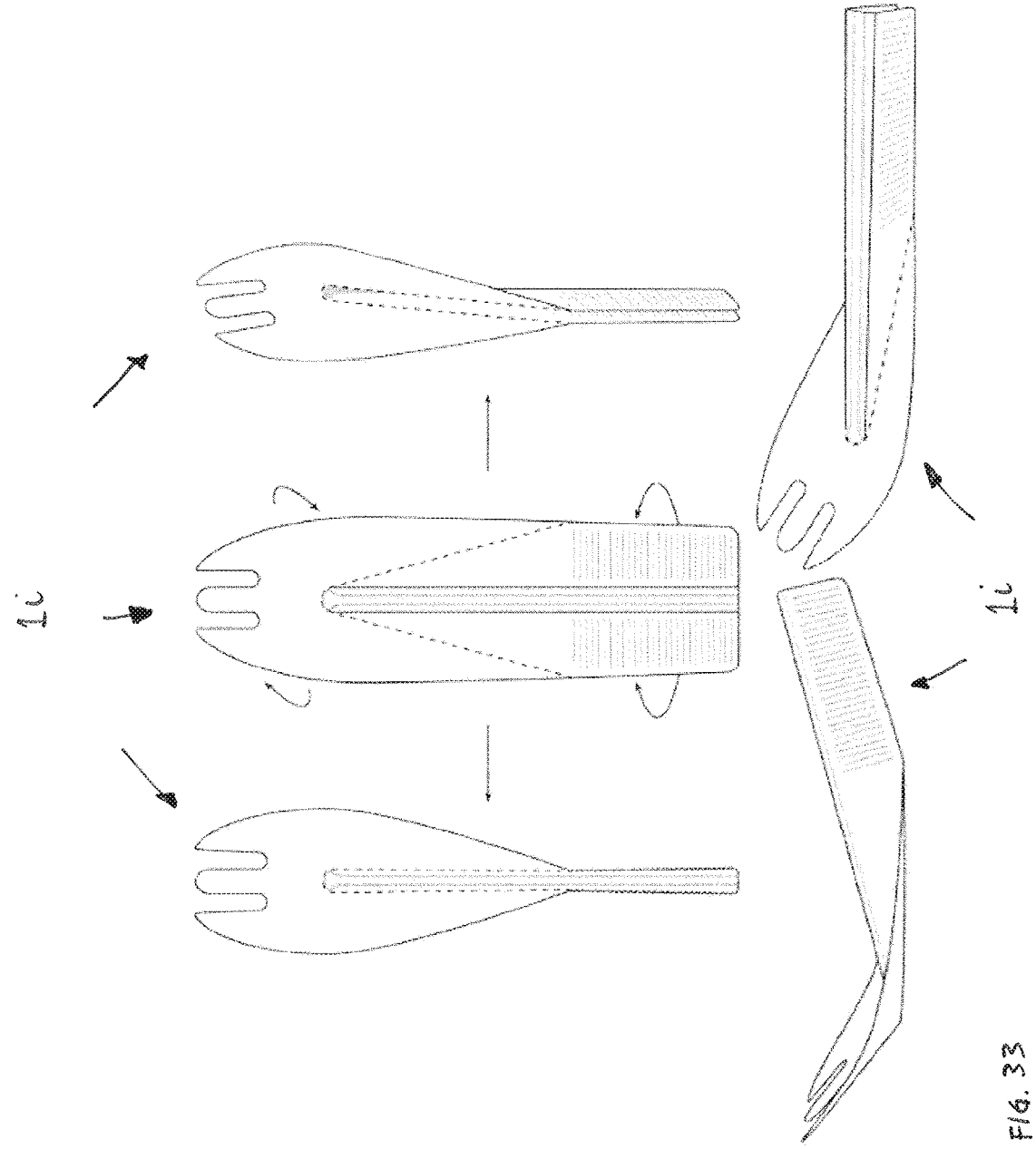
Figure 34:
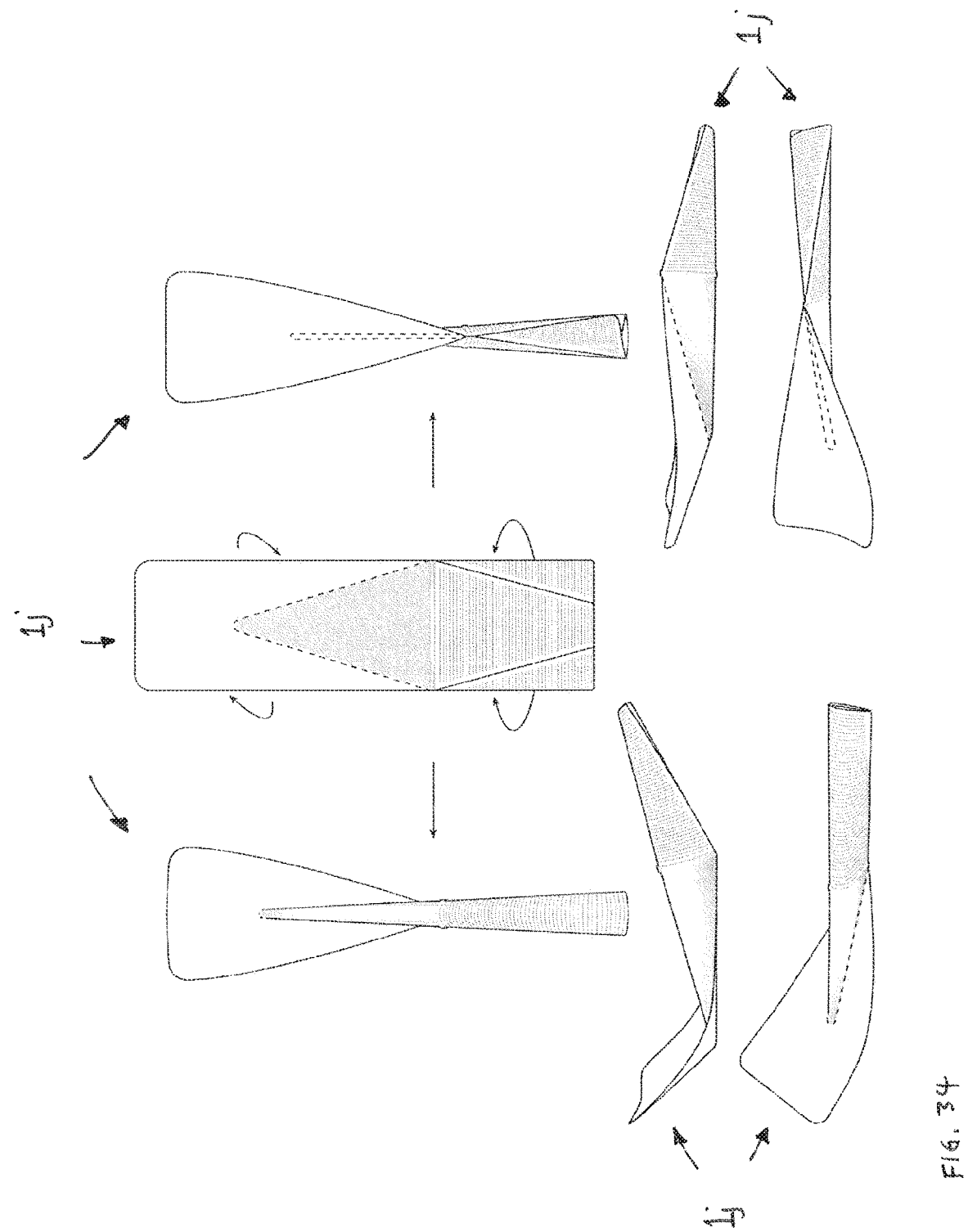
Figure 35:
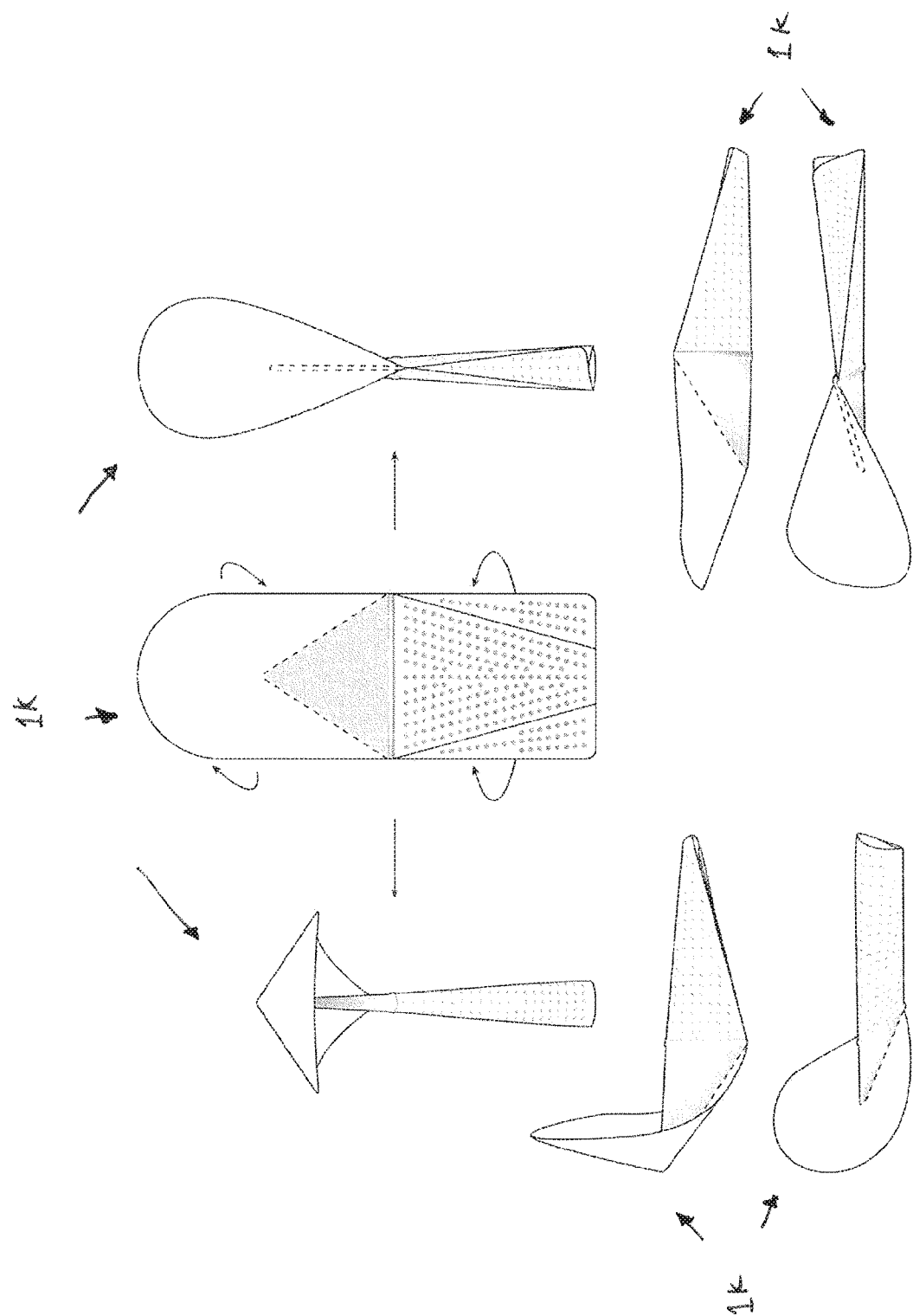
Figure 40:
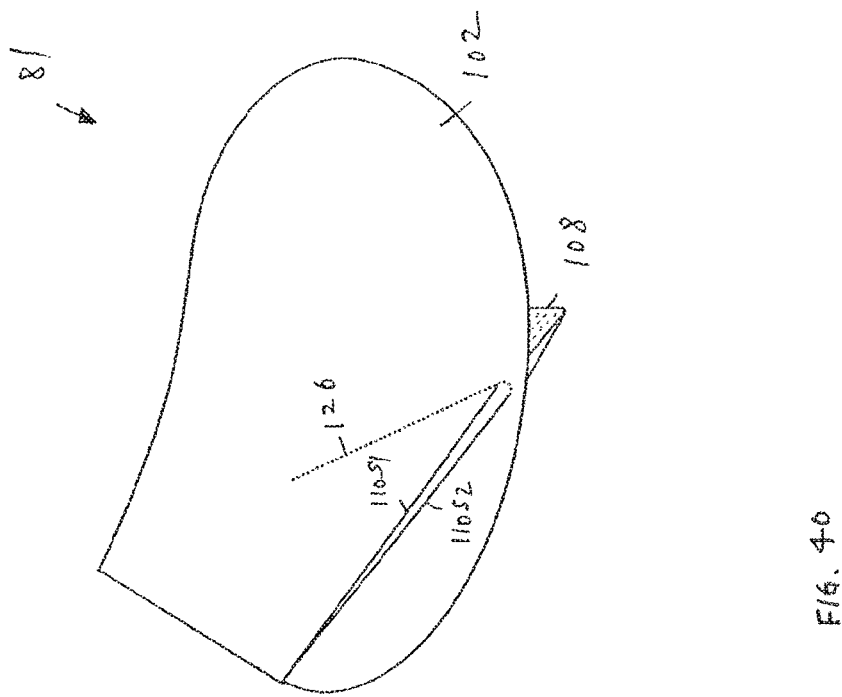
Figure 39:
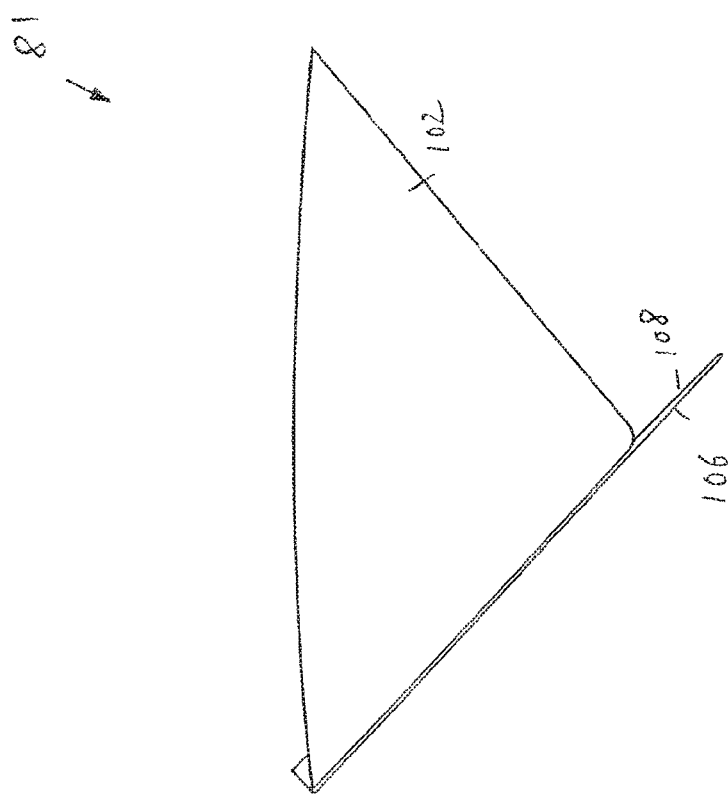
Figure 42:
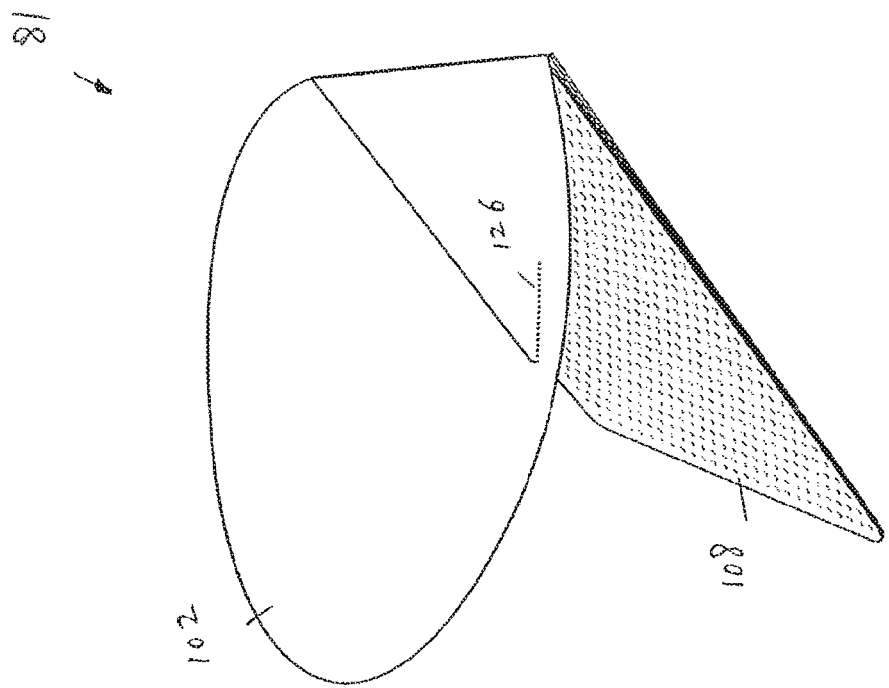
Figure 41:
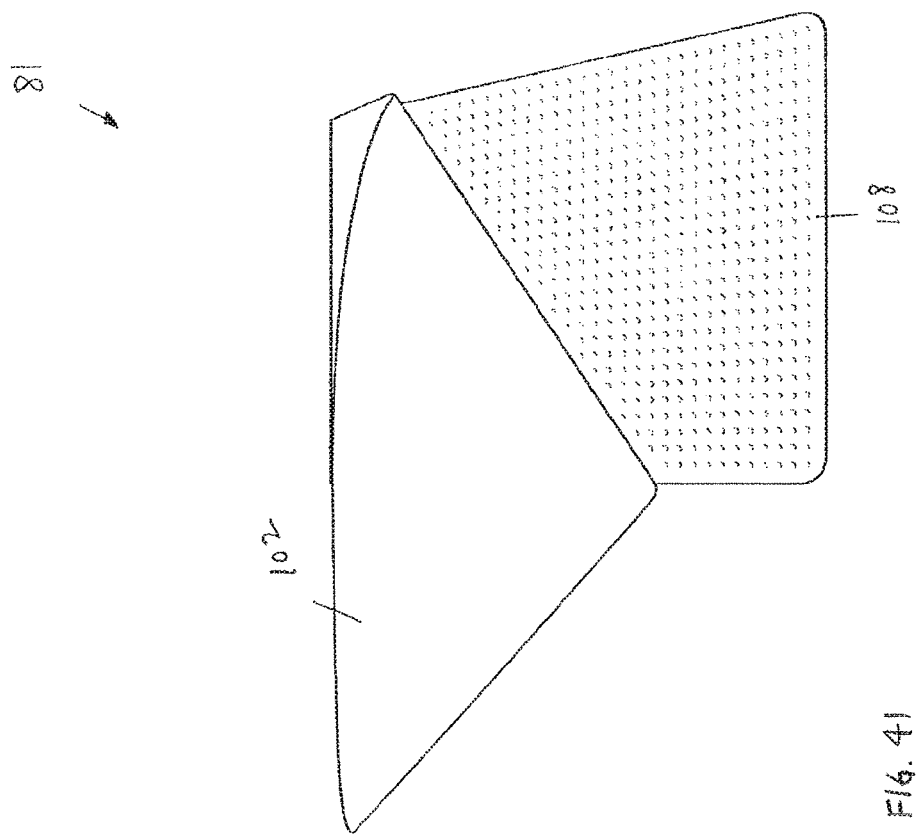

FIGS. 48 to 57 illustrate another variant of the blank of FIG. 1.

FIG. 48 shows a thick blank for folding to form a cup with a handle. The thick blank of FIG. 48 is a variant of the thin blank of FIG. 38. The thick blank of FIG. 48 and the blank of FIG. 38 have similar parts.

FIG. 48 shows a thick blank 181 for folding to form a desired cup with a handle.

The thick blank 181 comprises an elongated sheet 183 with a plurality of scored lines 185 and with a plurality of bumps 187. The scored lines 185 and the bumps 187 are located on surfaces of the sheet 183.

The elongated sheet 183 is essentially flat and is symmetrical about its longitudinal axis. The sheet 183 has a top surface 183T with a bottom surface 183B being provided opposite to the top surface 183T. The sheet 183 also has a first side edge 183S1 with a second side edge 183S2 being provided opposite to the first side edge 183S1, and a front edge 183F with a rear edge 183R being provided opposite to the front edge 183F, as illustrated in FIG. 48.

The sheet 183 also comprises a semi-circular portion 202, a first rectangular portion 204, a second rectangular portion 206, and a third rectangular portion 208. The semi-circular portion 202 is placed next to the first rectangular portion 204, which is placed next to the second rectangular portion 206. The second rectangular portion 206 is placed next to the third rectangular portion 208.

The semi-circular portion 202 comprises an arc edge 202A and a straight edge 202S. Ends of the arc edge 202A are placed next to respective ends of the straight edge 202S.

The first rectangular portion 204 includes a first-long edge 204L1 with a second-long edge 204L2, which is placed opposite to the first-long edge 204L1, and a first-short edge 204S1 with a second-short edge 204S2, which is placed opposite to the first-short edge 204S1.

Similar to the first rectangular portion 204, the second rectangular portion 206 includes a first-long edge 206L1 with a second-long edge 206L2, and a first-short edge 206S1 with a second-short edge 206S2.

Similar to the first rectangular portion 204, the third rectangular portion 208 includes a first-long edge 208L1 with a second-long edge 208L2, and a first-short edge 208S1 with a second-short edge 208S2.

Referring to the scored lines 185, they include a longitudinal-scored line, a set of lateral-scored lines, and a set of diagonal-scored lines.

The longitudinal-scored line includes a longitudinal bending line. The longitudinal-scored line is also called a long valley spine.

In detail, the longitudinal bending line include a circular bending line segment 210C and a first straight bending line segment 210S1 with a second straight bending line segment 210S2. The circular bending line segment 210C is placed on the bottom surface 183B while the first straight bending line segment 210S1 and the second straight bending line segment 210S2 are placed on the top surface 183T. A first end of the circular bending line segment 210C is placed next to a first end of the first straight bending line segment 210S1. A second end of the first straight bending line segment 210S1 is placed next to a first end of the second straight bending line segment 210S2. A second end of the second straight bending line segment 210S2 is placed next to a second end of the circular bending line segment 210C.

The first end of the first straight bending line segment 210S1 and the second end of the second straight bending line segment 210S2 are separated by a distance of about 2 mm. The second end of the first straight bending line segment 210S1 is in contact with the first end of the second straight bending line segment 210S2.

The first straight bending line segment 210S1 and the second straight bending line segment 210S2 form a small angle. The circular bending line segment 210C is placed at a midpoint of the straight edge 202S of the semi-circular portion 202. The second end of the first straight bending line segment 210S1 and the first end of the second straight bending line segment 210S2 are placed at a midpoint of the second-long edge 206L2 of the second rectangular portion 206. The first straight bending line segment 210S1 and the first end of the second straight bending line segment 210S2 extends from around the midpoint of the straight edge 202S of the semi-circular portion 202, across the first rectangular portion 204, across the second rectangular portion 206, and across the third rectangular portion 208.

The lateral-scored lines include a pair of first straight bending line segments 216A and 216B, a pair of second straight bending line segments 218A and 218B, a pair of third straight bending line segments 220A and 220B, and a pair of fourth straight bending line segments 222A and 222B.

In detail, the first straight bending line segments 216A and 216B are placed on the bottom surface 183B. They extend from the vicinity of one end of the first long edge 206L1 of the second rectangular portion 206, which is placed next to the first side edge 83S1, to the vicinity of a midpoint of the first long edge 106L1 of the second rectangular portion 206. The first straight bending line segments 216A and 216B are placed essentially parallel and close to each other.

The second straight bending line segments 218A and 218B are placed on the top surface 183T. They extend from the vicinity of the midpoint of the first long edge 206L1 of the second rectangular portion 206 to the vicinity of one end of the first long edge 206L1 of the second rectangular portion 206, which is placed next to the second side edge 183S2. The second straight bending line segments 218A and 218B are placed essentially parallel and close to each other.

The third straight bending line segments 220A and 220B are placed on the bottom surface 183B. They extend from the vicinity of one end of the first long edge 208L1 of the third rectangular portion 208, which is placed next to the first side edge 183S1, to the vicinity of a midpoint of the first long edge 208L1 of the third rectangular portion 208. The first straight bending line segments 220A and 220B are placed essentially parallel and close to each other.

The fourth straight bending line segment 222A and 222B are placed on the top surface 183T. They extend from the vicinity of the midpoint of the first long edge 208L1 of the third rectangular portion 208 to the vicinity of one end of the first long edge 208L1 of the third rectangular portion 208, which is placed next to the second side edge 183S2. The first straight bending line segments 222A and 222B are placed essentially parallel and close to each other.

The set of diagonal-scored lines include a first straight bending line segment 224 and a second straight bending line segment 226.

In detail, the first straight bending line segment 224 is placed on the bottom surface 183B and it extends from a midpoint of the straight edge 202S of the semi-circular portion 202 to one end of the second long edge 204L2 of the first rectangular portion 204, which is placed at the first side edge 183S1.

The second straight bending line segment 226 is placed on the bottom surface 183B and it extends from the midpoint of the straight edge 202S of the semi-circular portion 202 and it extends in the direction of one end of the second long edge 204L2 of the first rectangular portion 204, which is placed at the second side edge 183S2.

One end of the second straight bending line segment 226 is placed on the midpoint of the straight edge 202S of the semi-circular portion 202. Another end of the second straight bending line segment 226 is placed on a point, which lies on about midpoint between the midpoint of the straight edge 202S and the one end of the second long edge 204L2 of the first rectangular portion 204, which is placed at the second side edge 183S2.

With regards to the bumps 187, they are placed on a first elevated part and on a second elevated part of the blank 181.

The first elevated part is enclosed by a part of the first long edge 206L1, a part of the second long edge 206L2, and the second short edge 206S2 of the second rectangular portion 206, as well as the straight bending line segment 210S2 of the longitudinal bending line.

The second elevated part is enclosed by a part of the first long edge 208L1, a part of the second long edge 208L2, and the second short edge 208S2 of the third rectangular portion 208, as well as the straight bending line segment 210S2 of the longitudinal bending line.

A first trapezoid indentation or opening 228 is provided at ends of the first straight bending line segments 216A and 216B, which is placed in the vicinity of ends of the second straight bending line segments 218A and 218B.

A second trapezoid indentation 230 is provided at ends of the third straight bending line segments 220A and 220B, which is placed in the vicinity of ends of the fourth straight bending line segments 222A and 222B.

In one implementation for forming a cup with a long handle, the blank 181 has a length of approximately 285 mm and a width of approximately 120 mm. The semi-circular portion 202 has a radius of about 60 mm.

Referring to the first rectangular portion 204, the first-short edge 204S1 and the second-short edge 204S2 have a length of about 60 mm and the first-long edge 204L1 and the second-long edge 204L2 have a length of about 120 mm.

Referring to the second rectangular portion 206, the first-short edge 206S1 has a length of about 80.5 mm, the second-short edge 206S2 has a length of about 81.5 mm, the first-long edge 206L1 and the second-long edge 206L2 have a length of about 120 mm. The middle part of the second rectangular portion 206 has a width of about 81.0 mm.

Referring to the third rectangular portion 208, the first-short edge 208S1 has a length of about 77.3 mm, the second-short edge 208S2 has a length of about 77.8 mm, and the first-long edge 208L1 has a length of about 120 mm. The middle part of the third rectangular portion 208 has a width of about 80.0 mm.

The first straight bending line segment 224 of the diagonal-scored lines forms an angle of about 45 degrees with the first side edge 183S1. The circular bending line segment 210C has a minimal diameter of about 3 mm. The first straight bending line segment 210S1 and the second straight bending line segment 210S2 has a separation of about 2 mm minimal at one end and about 0 mm at another end.

In one implementation for forming a cup with a short handle, the blank 181 has a length from approximately 243.5 mm and a width of approximately 120 mm.

The semi-circular portion 202 has a radius of about 60 mm.

Referring to the first rectangular portion 204, the first-short edge 204S1 and the second-short edge 204S2 have a length of about 60 mm and the first-long edge 204L1 and the second-long edge 204L2 have a length of about 120 mm.

Referring to the second rectangular portion 206, the first-short edge 206S1 has a length of about 60.0 mm, the second-short edge 206S2 has a length of about 60.5 mm, the first-long edge 206L1 and the second-long edge 206L2 have a length of about 120 mm.

Referring to the third rectangular portion 208, the first-short edge 208S1 has a length of about 56.5 mm, the second-short edge 208S2 has a length of about 57.0 mm, and the first-long edge 208L1 has a length of about 120 mm. The middle part of the third rectangular portion 208 has a width of about 59.0 mm.

The first straight bending line segment 224 of the diagonal-scored lines forms an angle of about 45 degrees with the first side edge 183S1. The circular bending line segment 210C has a minimal diameter of about 3 mm. The first straight bending line segment 210S1 and the second straight bending line segment 210S2 has a separation of about 2 mm minimal at one end and about 0 mm at another end.

Functionally, the blank 181 can be folded manually to form a cup, which is illustrated in FIGS. 49 to 52.

The semi-circular portion 202 and the first rectangular portion 204 are intended for folding to form a container portion of the cup.

The second rectangular portion 206 and the third rectangular portion 208 are intended for folding to form a handle portion of the cup.

The scored lines 185 are intended for bending parts of the blank to bend in different pre-determined directions.

The parallel and close straight bending line segments 216A and 216B allow for easier folding of respective thick parts of blank 181.

Similarly, the parallel and close straight bending line segment 220A and 220B, and the parallel and close straight bending line segment 222A and 222B allow for easier folding of respective thick parts of blank 181.

The almost parallel and close bending line segments 210S1 and 210S2 allow for easier folding of respective thick parts of blank 181.

These trapezoid indentations 228 and 230 allow for easier folding of respective thick parts of blank 181.

The trapezoid indentations 228 and 230 act to contain material thickness of the blank 181. When the blank 181 is bent, the bent area often enlarges, especially in corners. This enlarging can deter the bending of the blank 181. The trapezoid indentations 228 and 230 serve to receive the enlarged area to allow for easier bending of the blank 181.

In the folded state, these trapezoid indentations 228 and 230 also allow for secure and stable formation of the cup and stable formation of its stand.

Figure 55:
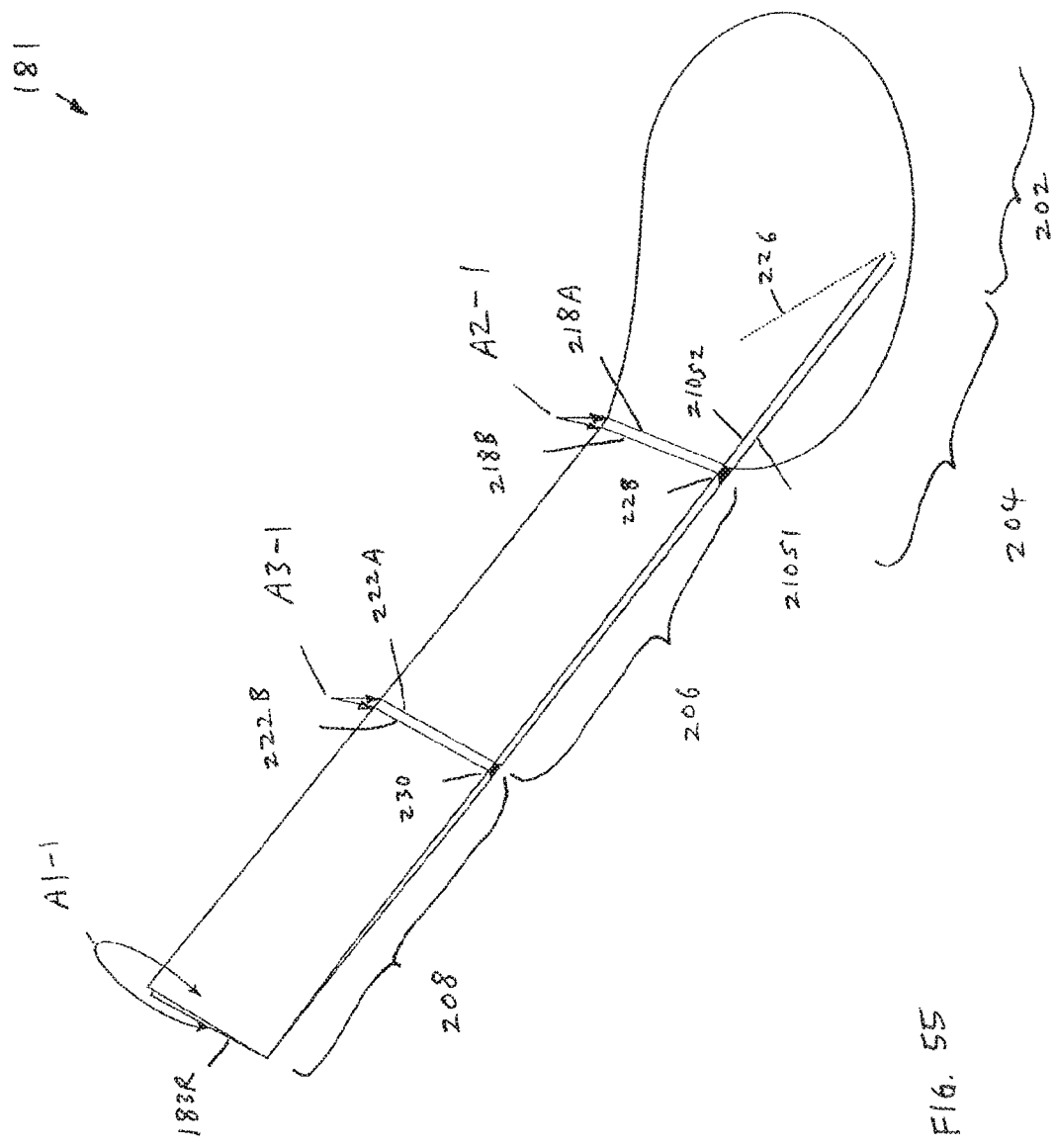
Figure 56:
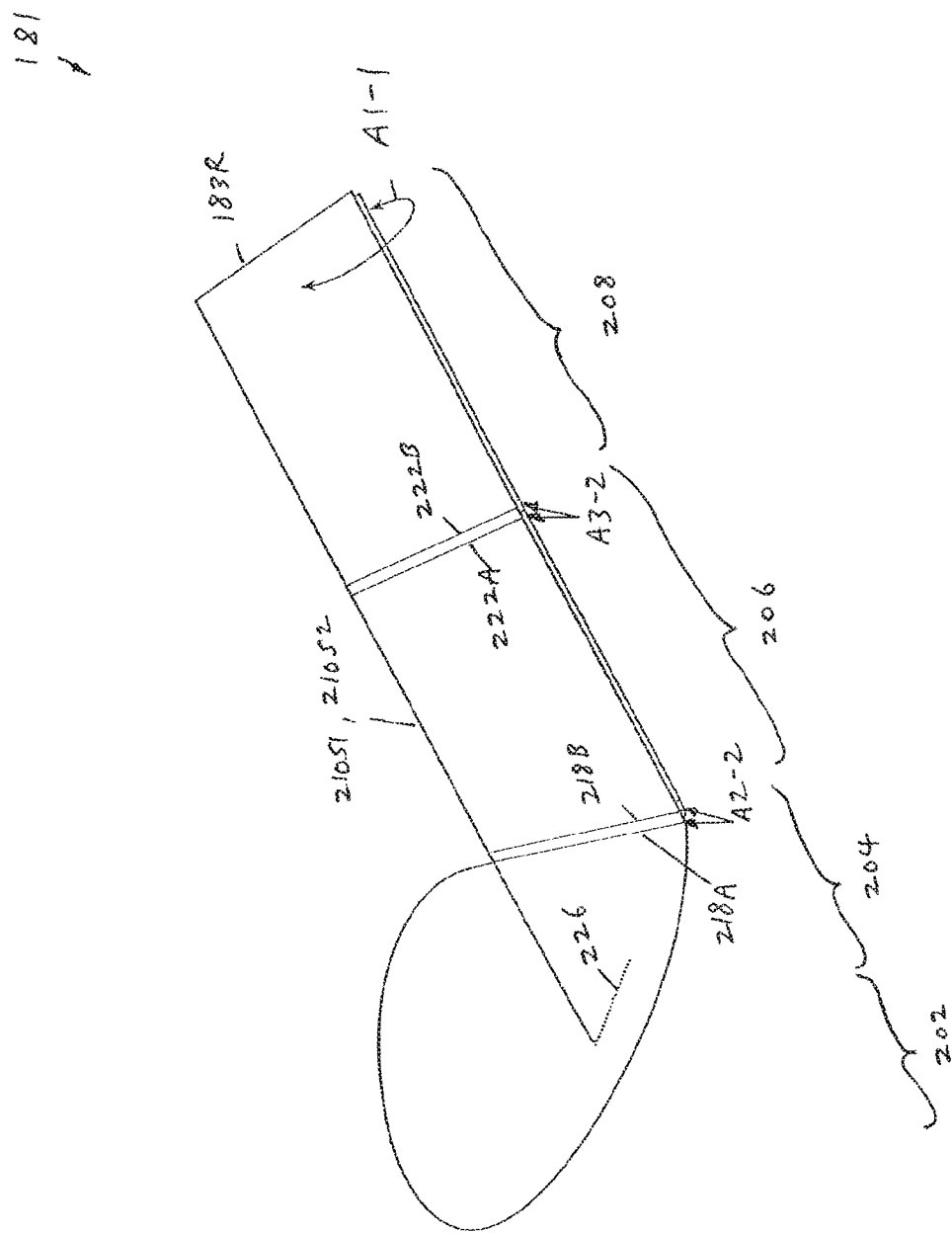
Figure 57:
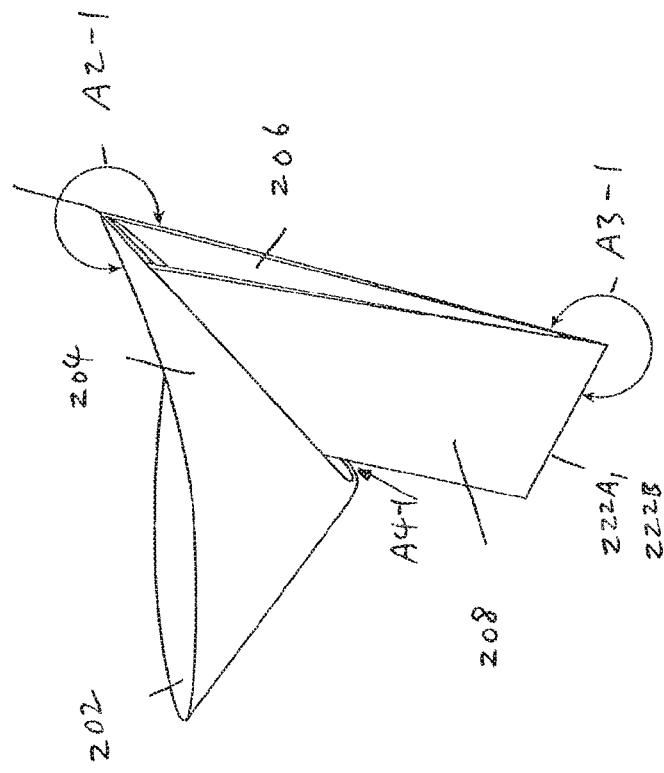

FIGS. 55, 56, and 57 show a method of folding the blank 81 to form a cup with a handle.

The method includes a step of folding the flat blank 181 along the straight bending line segments 210S1 and 210S2, as indicated by an arrow A1-1, which is shown in FIGS. 55 and 56. The semi-circular portion 202 and the first rectangular portion 204 then fold to form a container portion while the second rectangular portion 206 and the third rectangular portion 208 are folded to form an initial handle portion of the cup.

After this, the blank 181 is folded along the straight bending line segments 218A and 218B, as indicated by an arrow A2-1, which is shown in FIGS. 55, 56, and 57. The container portion is then inclined at an acute angle with respect to the handle portion.

The blank 181 is then folded along the straight bending line segments 222A and 222B, as indicated by an arrow A3-1, which is shown in FIGS. 55, 56, and 57. Put differently, the handle portion is bent about the straight bending line segments 222A and 222B.

The third rectangular portion 208 is later inserted into a slit that is formed by the folded first rectangular portion 204, as indicated by an arrow A4-1, which is shown in FIG. 57. In other words, the second rectangular portion 206 and the third rectangular portion 208 are bent and placed to form the final handle portion of the cup.

FIGS. 58 to 67 illustrate a variant of the blank of FIG. 1.

FIG. 58 shows a thin blank 381 for folding to form a desired cup with a stand. The blank 381 and the blank 81 of FIG. 38 have similar parts. The similar parts may have the same or similar part numbers.

In a general sense, the cup can also refer to a bowl, a container, or a scoop.

The thin blank 381 includes an elongated sheet 383 with a plurality of scored lines 385, with a plurality of bumps 387 and with two flap parts 388A and 388B. The scored lines 385 and the bumps 387 are located on surfaces of the sheet 383.

The elongated sheet 383 is essentially flat and is symmetrical about its longitudinal axis. The sheet 383 has a top surface 383T with a bottom surface 383B being provided opposite to the top surface 383T, as shown in FIG. 64. The sheet 383 also has a first side edge 383S1 with a second side edge 383S2 being provided opposite to the first side edge 383S1, and a front edge 383F with a rear edge 383R being provided opposite to the front edge 383F, as illustrated in FIG. 58.

The front edge 383F and the rear edge 383R are placed at longitudinal ends of the sheet 383. The front edge 383F is connected to the first side edge 383S1, which is connected to the rear edge 383R. The rear edge 383R is connected to the second side edge 383S2, which is connected to the front edge 383F.

The sheet 383 also comprises a semi-circular portion 402, a first rectangular portion 404, a second rectangular portion 406, a third rectangular portion 408, and a fourth rectangular portion 409, as illustrated in FIG. 63. The semi-circular portion 402 is placed next to the first rectangular portion 404, which is placed next to the second rectangular portion 406. The second rectangular portion 406 is placed next to the third rectangular portion 408, which is placed next to the fourth rectangular portion 409.

The semi-circular portion 402 comprises an arc edge 402A and a straight edge 402S. Ends of the arc edge 402A are placed next to respective ends of the straight edge 402S.

The first rectangular portion 404 includes a first-long edge 404L1 with a second-long edge 4104L2, which is placed opposite to the first-long edge 404L1, and a first-short edge 404S1 with a second-short edge 404S2, which is placed opposite to the first-short edge 404S1.

Similar to the first rectangular portion 404, the second rectangular portion 406 includes a first-long edge 406L1 with a second-long edge 406L2, and a first-short edge 406S1 with a second-short edge 406S2.

Similar to the first rectangular portion 404, the third rectangular portion 408 includes a first-long edge 408L1 with a second-long edge 408L2, and a first-short edge 408S1 with a second-short edge 408S2.

Similar to the first rectangular portion 404, the fourth rectangular portion 409 includes a first-long edge 409L1 with a second-long edge 409L2, and a first-short edge 409S1 with a second-short edge 409S2.

Referring to the scored lines 385, they include a set of longitudinal-scored lines, a set of lateral-scored lines, and a set of diagonal-scored lines.

The longitudinal-scored lines include a first longitudinal bending line and a second longitudinal bending line, a third longitudinal bending line, and a fourth longitudinal bending line.

In detail, the first longitudinal bending line includes a circular bending line segment 410C and a first straight bending line segment 410S1 with a second straight bending line segment 410S2.

The circular bending line segment 410C is placed on the bottom surface 383B while the first straight bending line segment 410S1 and the second straight bending line segment 410S2 are placed on the top surface 383T. A first end of the circular bending line segment 410C is placed next to a first end of the first straight bending line segment 410S1. A second end of the first straight bending line segment 410S1 is placed next to a first end of the second straight bending line segment 410S2. A second end of the second straight bending line segment 410S2 is placed next to a second end of the circular bending line segment 410C. The first straight bending line segment 410S1 and the second straight bending line segment 410S2 form a small angle. The circular bending line segment 410C is placed at a midpoint of the straight edge 402S of the semi-circular portion 402. The second end of the first straight bending line segment 410S1 and the first end of the second straight bending line segment 410S2 are placed at a midpoint of the first long edge 406L1 of the second rectangular portion 406.

The second longitudinal bending line includes a straight bending line segment 412, which is placed on the top surface 383T. The straight bending line segment 412 extends from a midpoint of the first long edge 406L1 to a midpoint of the second long edge 406L2 of the second rectangular portion 406.

The third longitudinal bending line includes a straight bending line segment 414, which is placed on the top surface 383T. The straight bending line segment 414 extends from a midpoint of the first long edge 408L1 to a midpoint of the second long edge 408L2 of the third rectangular portion 408.

The fourth longitudinal bending line includes a straight bending line segment 415, which is placed on the top surface 383T.

The straight bending line segment 415 extends from a midpoint of the first long edge 409L1 to a midpoint of the second long edge 409L2 of the third rectangular portion 409.

Referring to the lateral-scored lines, they include a first straight bending line segment 416, a second straight bending line segment 418, a third straight bending line segment 420, and a fourth straight bending line segment 421. The lateral-scored lines also include a fifth straight bending line segment 422, a sixth straight bending line segment 423.

In detail, the first straight bending line segment 416 is placed on the bottom surface 383B and it extends from one end of the first long edge 406L1 of the second rectangular portion 406, which is placed next to the first side edge 383S1, to a midpoint of the first long edge 406L1 of the second rectangular portion 406.

The second straight bending line segment 418 is placed on the top surface 383T and it extends from the midpoint of the first long edge 406L1 of the second rectangular portion 406 to one end of the first long edge 406L1 of the second rectangular portion 406, which is placed next to the second side edge 383S2.

The third straight bending line segment 420 is placed on the bottom surface 383B and it extends from one end of the first long edge 408L1 of the third rectangular portion 408, which is placed next to the first side edge 383S1, to a midpoint of the first long edge 408L1 of the third rectangular portion 408.

The fourth straight bending line segment 421 is placed on the top surface 383T and it extends from the midpoint of the first long edge 408L1 of the third rectangular portion 408 to one end of the first long edge 408L1 of the third rectangular portion 408, which is placed next to the second side edge 383S2.

The fifth straight bending line segment 422 is placed on the bottom surface 383B and it extends from one end of the first long edge 409L1 of the fourth rectangular portion 409, which is placed next to the first side edge 383S1, to a midpoint of the first long edge 409L1 of the fourth rectangular portion 409.

The sixth straight bending line segment 423 is placed on the top surface 383T and it extends from the midpoint of the first long edge 409L1 of the fourth rectangular portion 409 to one end of the first long edge 409L1 of the fourth rectangular portion 409, which is placed next to the second side edge 383S2.

Referring to the set of diagonal-scored lines, they include a first straight bending line segment 424 and a second straight bending line segment 426.

In detail, the first straight bending line segment 424 is placed on the bottom surface 383B and it extends from a midpoint of the straight edge 402S of the semi-circular portion 402 to one end of the second long edge 404L2 of the first rectangular portion 404, which is placed at the first side edge 83S1.

The second straight bending line segment 426 is placed on the bottom surface 383B and it extends from the midpoint of the straight edge 402S of the semi-circular portion 402 and it extends towards one end of the second long edge 404L2 of the first rectangular portion 404, which is placed at the second side edge 383S2.

One end of the second straight bending line segment 426 is placed on the midpoint of the straight edge 402S of the semi-circular portion 402. Another end of the second straight bending line segment 426 is placed on a point, which lies on about midpoint between the midpoint of the straight edge 402S and the one end of the second long edge 404L2 of the first rectangular portion 404, which is placed at the second side edge 383S2.

The fourth rectangular portion 409 includes the previously mentioned flap parts 388A and 388B.

The flap part 388A is located in a first half of the fourth rectangular portion 409 while the flap part 388B is located in a second half of the fourth rectangular portion 409.

The flap part 388A includes a straight scored line 388AS, a first straight cut line 388AC1 and a second straight cut line 388AC2. The straight scored line 388AS, the first straight cut line 388AC1 and the second straight cut line 388AC2 are arranged such that they form a triangle. In detail, a first end of the straight scored line 388AS is connected to a first end of the first straight cut line 388AC1. A second end of the first straight cut line 388AC1 is connected to a first end of the second straight cut line 388AC2. A second end of the second straight cut line 388AC2 is connected to a second end of the straight scored line 388AS.

Similarly, the flap part 388B includes a straight scored line 388BS, a first straight cut line 388BC1 and a second straight cut line 388BC2.

In a case wherein the blank 381 is provided using paper, the first straight cut line 388AC1 and the second straight cut line 388AC2 are provided with a single die cut line.

With regards to the bumps 387, they are placed on an elevated part of the blank 381.

The elevated part is enclosed by a part of the first long edge 408L1, a part of the second long edge 408L2, and the second short edge 408S2 of the third rectangular portion 408, as well as the straight bending line segment 414.

In one implementation for forming a cup with a stand, the blank 381, which is thin, has a length of approximately 285 mm and a width of approximately 120 mm. The semi-circular portion 402 has a radius of about 60 mm. The first rectangular portion 404 has a width of about 60 mm and a length of about 120 mm. The second rectangular portion 406 has a width of about 45.5 mm to about 46.0 mm and a length of about 120 mm. The third rectangular portion 408 has a width of about 59.5 mm to about 60.0 mm and a length of about 120 mm. The fourth rectangular portion 409 has a width of about 58.0 mm to about 59.0 mm and a length of about 120 mm. The first straight bending line segment 424 of the diagonal-scored lines forms an angle of about 45 degrees with the first side edge 383S1.

Functionally, the blank 381 can be folded manually to form a cup with a stand, which is illustrated in FIGS. 59 to 62.

The scored lines 385 are intended for bending parts of the blank to bend in different pre-determined directions.

The semi-circular portion 402 and the first rectangular portion 404 are intended for folding to form a container portion of the cup.

The second rectangular portion 406, the third rectangular portion 408, and the fourth rectangular portion 409 are intended for folding to form a stand or support for the container portion of the cup.

The flaps part 388A and 388B are intended for pop-out or folding to provide additional support for sides of the container portion of the cup.

In a special embodiment, the semi-circular portion 402 includes a plurality of holes for draining off liquid in the cup, especially when the cup acts a colander.

In another embodiment, the semi-circular portion 402 includes a plurality of measurement lines for indicating volume of liquid in the cup.

Figure 65:
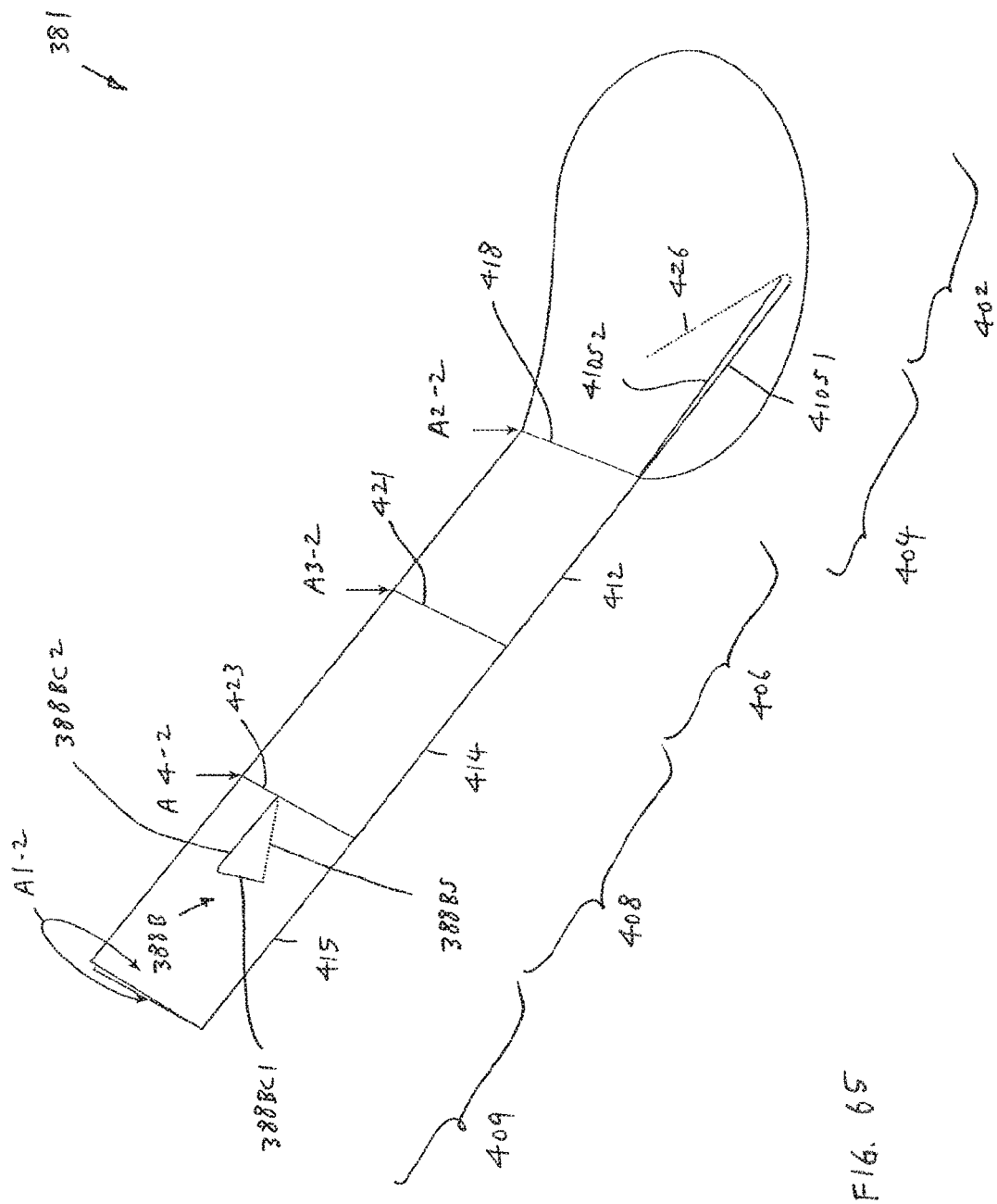
Figure 66:
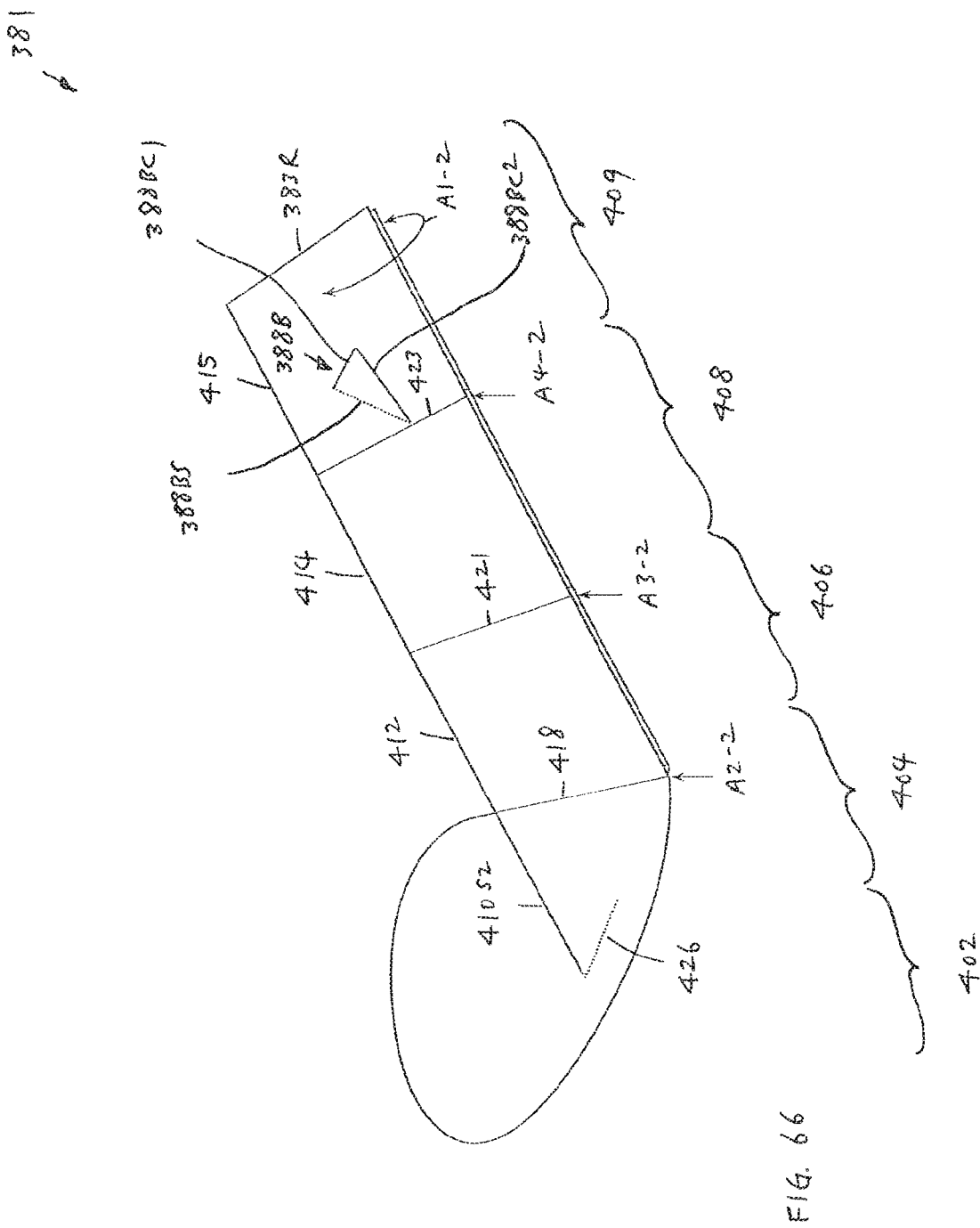
Figure 67:
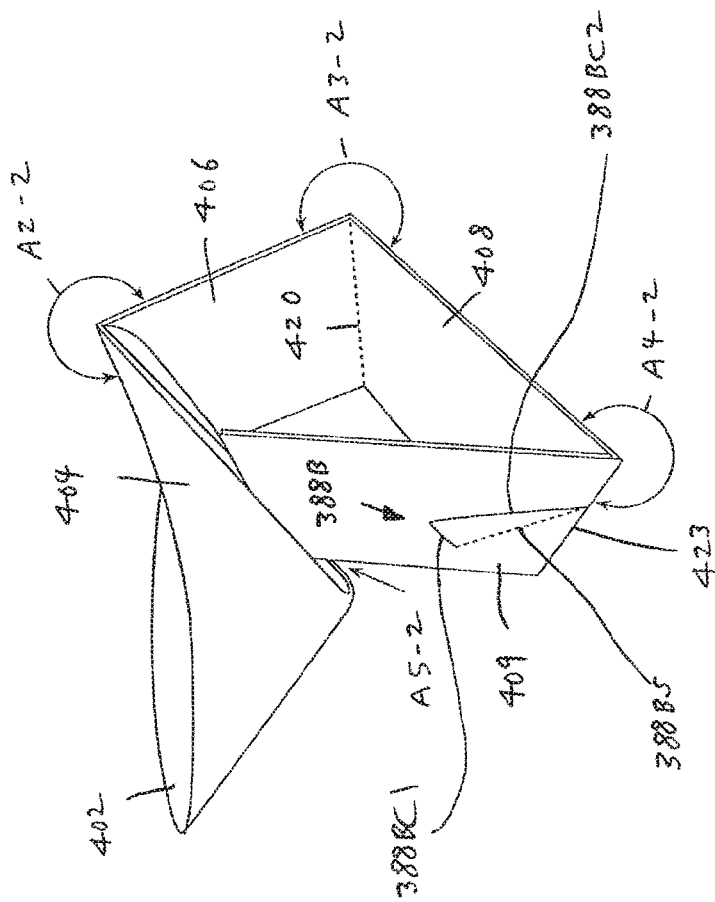

FIGS. 65, 66, and 67 show a method of folding the blank 381 to form a cup with a stand.

The method includes a step of folding the flat blank 381 along the straight bending line segments 412, 414 and the 415, as indicated by an arrow A1-2, which is shown in FIGS. 65 and 66. This causes the semi-circular portion 402 and the first rectangular portion 404 to fold for forming a container portion while also causing the second rectangular portion 406, the third rectangular portion 408, and the fourth rectangular portion 409 to fold for forming an initial handle portion of the cup.

After this, the blank 381 is folded along the straight bending line segments 416 and 418, as indicated by an arrow A2-2, which is shown in FIGS. 65, 66, and 67. The container portion is then inclined at an acute angle with respect to the handle portion.

The blank 381 is then folded along the straight bending line segments 420 and 421, as indicated by an arrow A3-2, which is shown in FIGS. 65, 66, and 67. The handle portion is then bent about the straight bending line segments 420 and 421.

The blank 381 is then folded along the straight bending line segments 422 and 423, as indicated by an arrow A4-2, which is shown in FIGS. 65, 66, and 67. The handle portion is then bent about the straight bending line segments 422 and 423.

The fourth rectangular portion 409 is later inserted into a slit that is formed by the folded first rectangular portion 404, as indicated by an arrow A5-2, which is shown in FIG. 67. The second rectangular portion 406, the third rectangular portion 408, and the fourth rectangular portion 409 are bent and placed to form the final portion of the cup.

Figure 60:
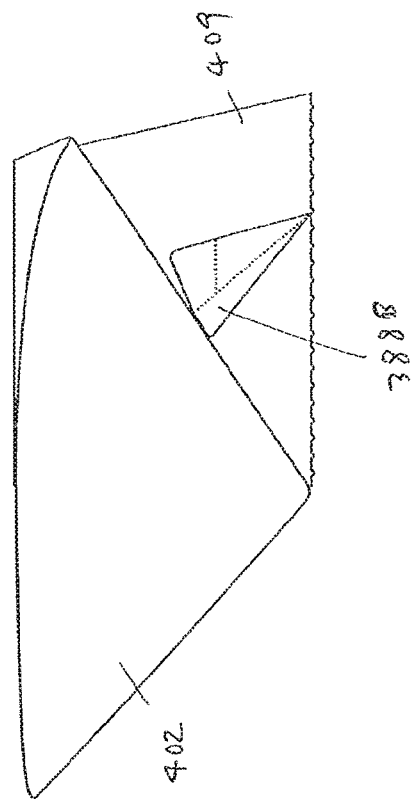
Figure 59:
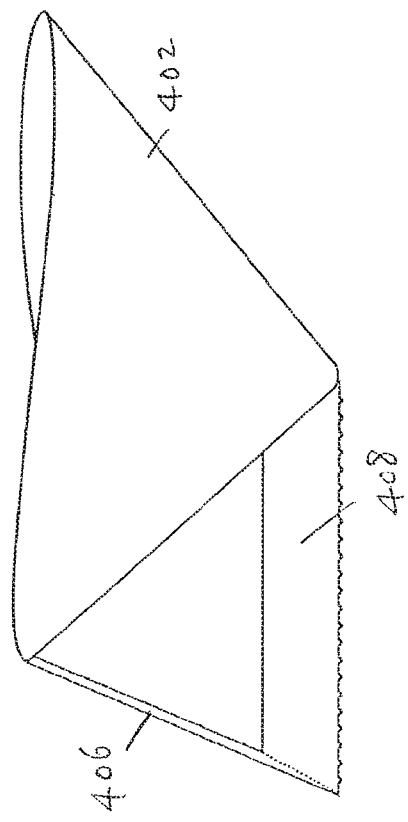
Figure 62:
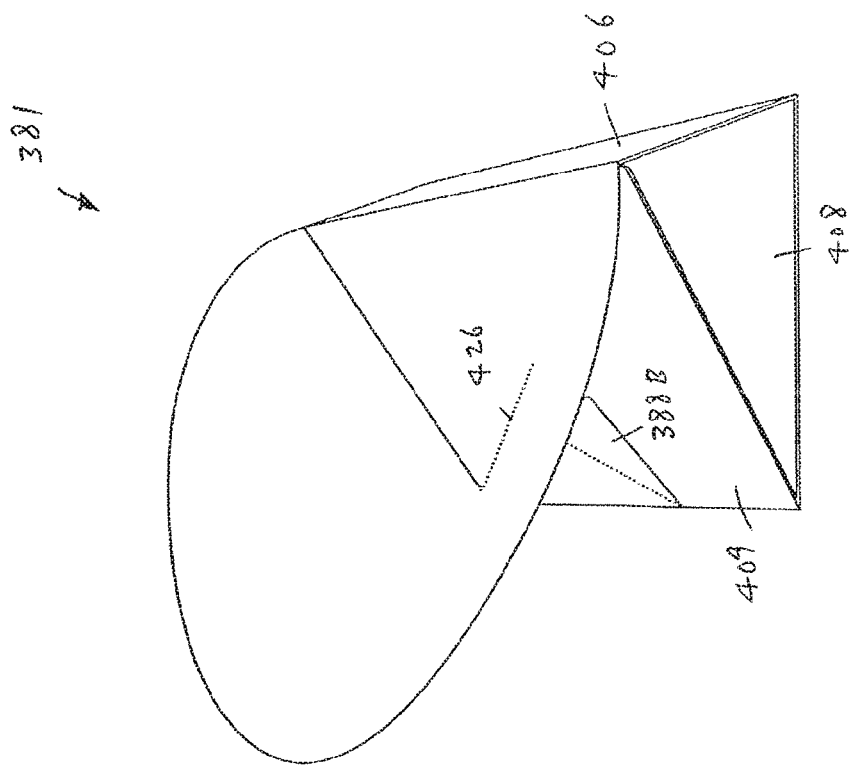
Figure 61:
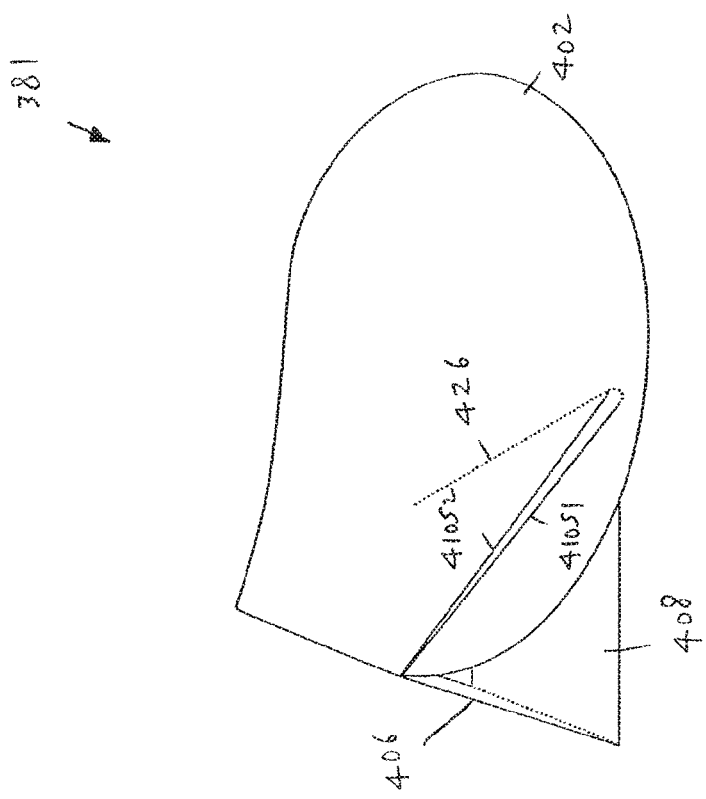

Following this, the flap parts 388A and 388B are folded outwards, as shown in FIG. 60.

FIGS. 68 to 79 illustrate another variant of the blank of FIG. 1.

Figure 68:
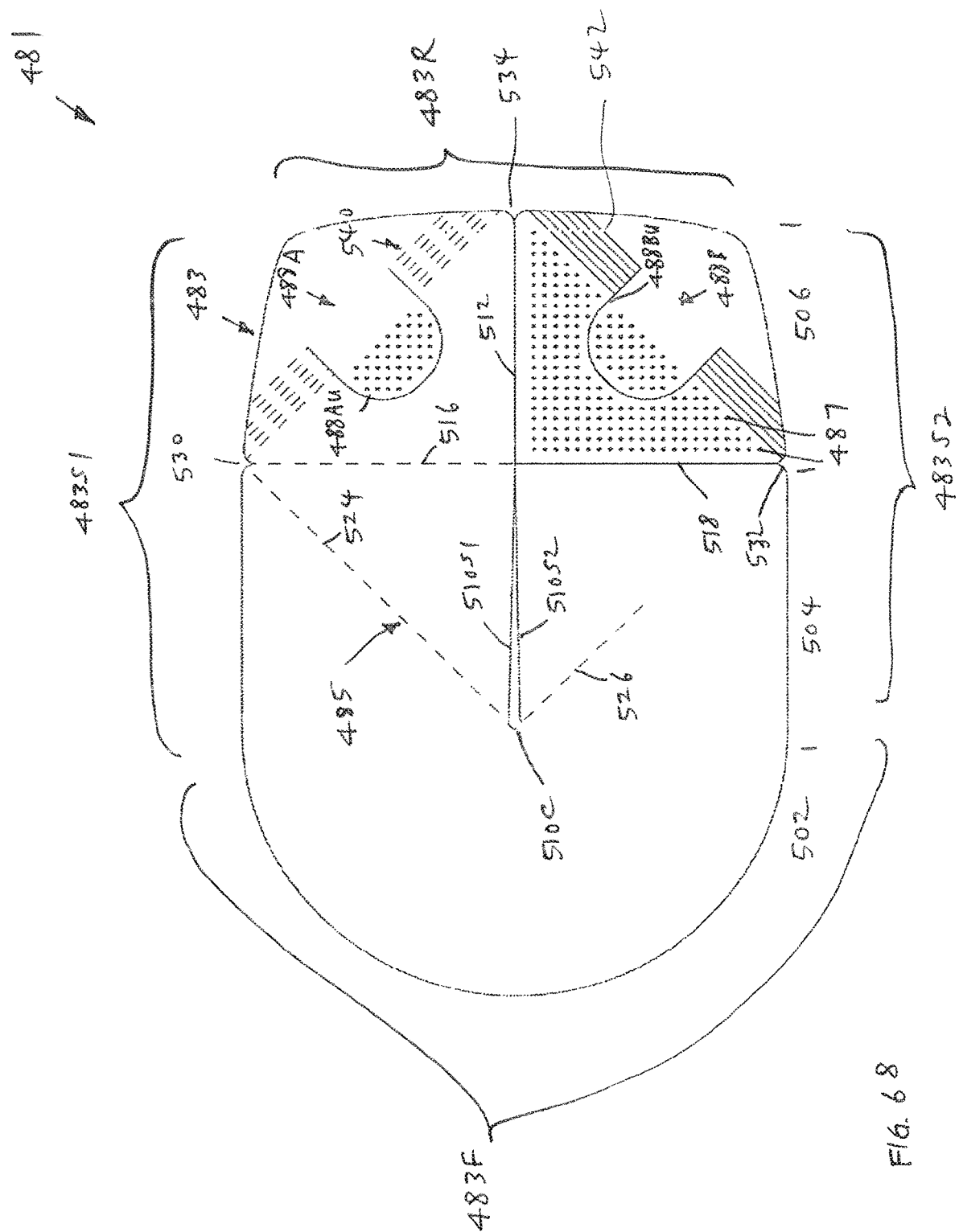
Figure 74:
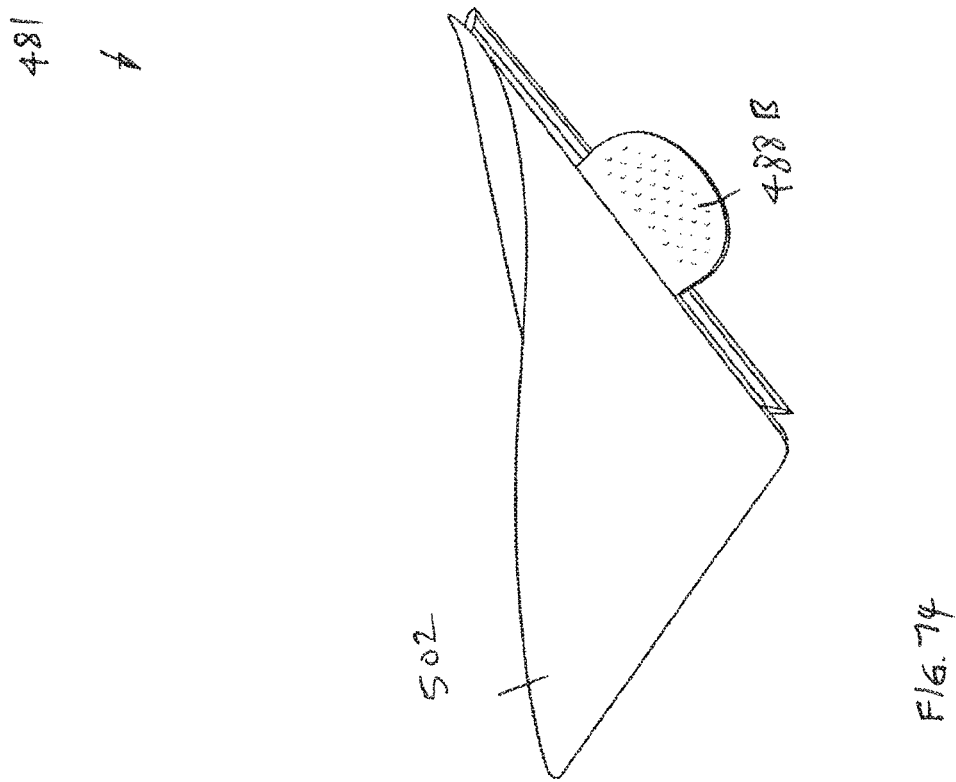
Figure 73:
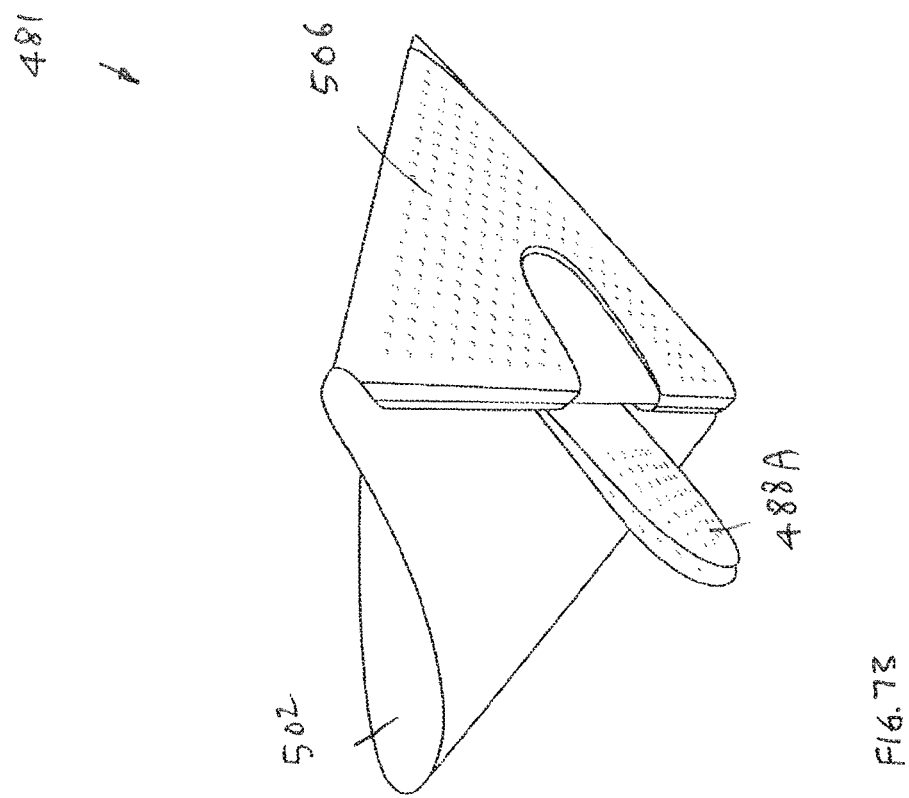
Figure 83:
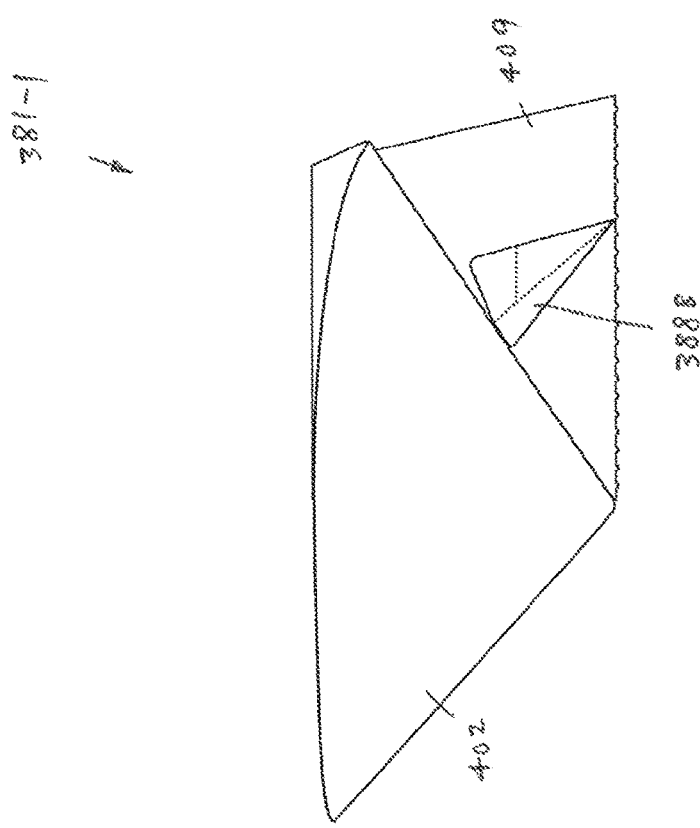
Figure 82:
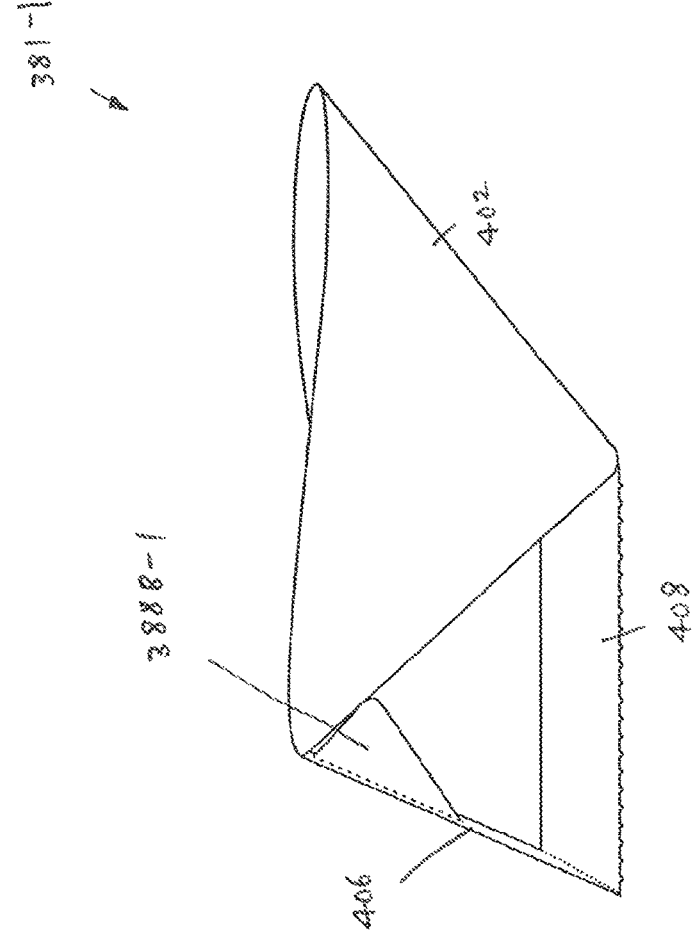
Figure 85:
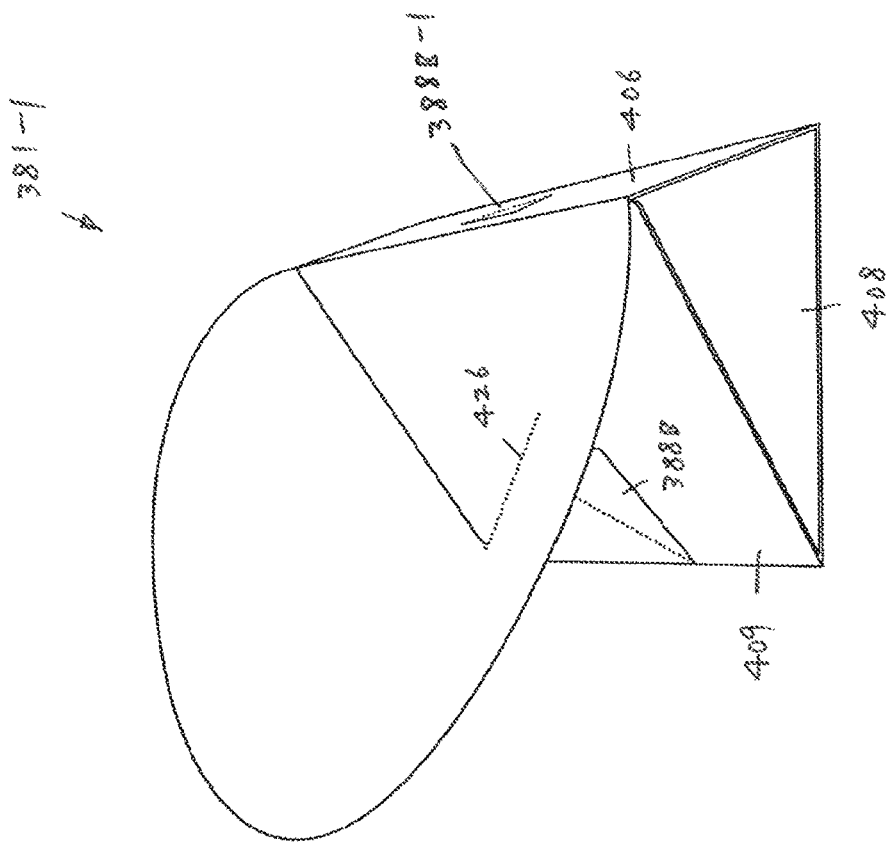
Figure 84:
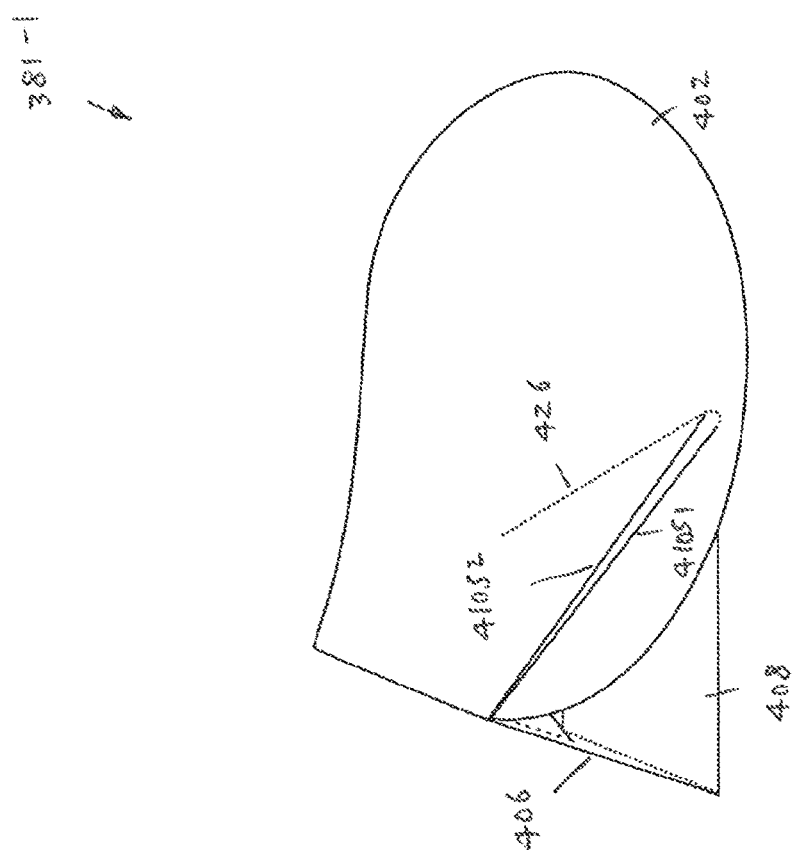

FIG. 68 depicts a thin blank 481 for folding to form a desired cup without a handle.

In a general sense, the cup can also refer to a bowl, a container, or a scoop.

The thin blank 481 includes an elongated sheet 483 with a plurality of scored lines 485, with a plurality of bumps 487, and with two flap parts 488A and 488B. The scored lines 485 and the bumps 487 are located on surfaces of the sheet 483.

Each scored line 485 includes a narrow hollow channel, a bending groove, or to a narrow elongated depressed area for facilitating bending or folding of the blank 481 to form a desired cup. The depth and the width of the scored line are adapted according to material, to thickness, and to purpose of the blank 481.

The elongated sheet 483 is essentially flat and is symmetrical about its longitudinal axis. The sheet 483 has a top surface 483T with a bottom surface 483B being provided opposite to the top surface 483T, as shown in FIG. 76. The sheet 483 also has a first side edge 483S1 with a second side edge 483S2 being provided opposite to the first side edge 483S1, and a front edge 483F with a rear edge 483R being provided opposite to the front edge 483F, as illustrated in FIG. 68.

The scored line 485 can be placed on the top surface 483T or on the bottom surface 483B of the blank 483.

The front edge 483F and the rear edge 483R are placed at longitudinal ends of the sheet 483. The front edge 483F is connected to the first side edge 483S1, which is connected to the rear edge 483R. The rear edge 483R is connected to the second side edge 483S2, which is connected to the front edge 483F.

The sheet 483 also comprises a semi-circular portion 502, a first rectangular portion 504, and a second rectangular portion 506, as illustrated in FIG. 75. The semi-circular portion 502 is placed next to the first rectangular portion 504, which is placed next to the second rectangular portion 506.

The semi-circular portion 502 comprises an arc edge 502A and a straight edge 502S. Ends of the arc edge 502A are placed next to respective ends of the straight edge 502S.

The first rectangular portion 504 includes a first-long edge 504L1 with a second-long edge 504L2, which is placed opposite to the first-long edge 504L1, and a first-short edge 504S1 with a second-short edge 504S2, which is placed opposite to the first-short edge 504S1. A first end of the first-long edge 504L1 is placed next to a first end of the first-short edge 504S1. A second end of the first-short edge 504S1 is placed next to a first end of the second-long edge 504L2. A second end of the second-long edge 504L2 is placed next to a first end of the second-short edge 504S2. A second end of the second-short edge 504S2 is placed next to a second end of the first-long edge 504L1. The first-long edge 504L1, the second-long edge 504L2, the first-short edge 504S1, and the second-short edge 504S2 are essentially straight.

Similar to the first rectangular portion 504, the second rectangular portion 506 includes a first-long edge 506L1 with a second-long edge 506L2, and a first-short edge 506S1 with a second-short edge 506S2.

Referring to the semi-circular portion 502, the arc edge 502A is placed next to the front edge 483F. The straight edge 502S is placed next to the first-long edge 504L1 of the first rectangular portion 504.

Referring to the first rectangular portion 504, the first-short edge 504S1 is placed next to the first side edge 483S1. The second short edge 504S2 is placed next to the second side edge 483S2. The second-long edge 504L2 is placed next to the first-long edge 506L1 of the second rectangular portion 506.

Referring to the second rectangular portion 506, the first-short edge 506S1 is placed next to the first side edge 483S1. The second short edge 506S2 is placed next to the second side edge 483S2. The second-long edge 506L2 is placed next to the rear edge 483R.

The straight edge 502S of the semi-circular portion 502, the long edges 504L1 and 504L2 of the first rectangular portion 504, and the long edges 506L1 and 506L2 of the second rectangular portion 506 have the same length.

The first short edge 504S1 of the first rectangular portion 504 and the first short edge 506S1 of the second rectangular portion 506 are placed such that they form essentially a straight line with a slight bend. In other words, the first short edge 506S1 has a small inclination with respect to the first short edge 504S1.

Similarly, the second short edge 504S2 of the first rectangular portion 504 and the second short edge 506S2 of the second rectangular portion 506 are placed such that they form essentially a straight line with a slight bend. In other words, the second short edge 506S2 has a small inclination with respect to the second short edge 504S2.

Referring to the scored lines 485, they include a set of longitudinal-scored lines, a set of lateral-scored lines, and a set of diagonal-scored lines.

The longitudinal-scored lines include a first longitudinal bending line and a second longitudinal bending line.

In detail, the first longitudinal bending line includes a circular bending line segment 510C and a first straight bending line segment 510S1 with a second straight bending line segment 510S2.

The circular bending line segment 510C is placed on the bottom surface 483B while the first straight bending line segment 510S1 and the second straight bending line segment 510S2 are placed on the top surface 483T. A first end of the circular bending line segment 510C is placed next to and in contact with a first end of the first straight bending line segment 510S1. A second end of the first straight bending line segment 510S1 is placed next to and in contact with a first end of the second straight bending line segment 510S2. A second end of the second straight bending line segment 510S2 is placed next to and in contact with a second end of the circular bending line segment 510C. The first straight bending line segment 510S1 and the second straight bending line segment 510S2 form a small angle. The circular bending line segment 510C is placed at a midpoint of the straight edge 502S of the semi-circular portion 502. The second end of the first straight bending line segment 510S1 and the first end of the second straight bending line segment 510S2 are placed at a midpoint of the first long edge 506L1 of the second rectangular portion 506.

The second longitudinal bending line includes a straight bending line segment 512, which is placed on the top surface 483T. The straight bending line segment 512 extends from a midpoint of the first long edge 506L1 to a midpoint of the second long edge 506L2 of the second rectangular portion 506.

With respect to the lateral-scored lines, they include a first straight bending line segment 516 and a second straight bending line segment 518.

In detail, the first straight bending line segment 516 is placed on the bottom surface 483B and it extends from one end of the first long edge 506L1 of the second rectangular portion 506, which is placed next to the first side edge 483S1, to a midpoint of the first long edge 506L1 of the second rectangular portion 506.

The second straight bending line segment 518 is placed on the top surface 483T and it extends from the midpoint of the first long edge 506L1 of the second rectangular portion 506 to one end of the first long edge 506L1 of the second rectangular portion 506, which is placed next to the second side edge 483S2.

With respect to the set of diagonal-scored lines, they include a first straight bending line segment 524 and a second straight bending line segment 526.

In detail, the first straight bending line segment 524 is placed on the bottom surface 483B and it extends from a midpoint of the straight edge 502S of the semi-circular portion 502 to one end of the second long edge 504L2 of the first rectangular portion 504, which is placed at the first side edge 483S1.

The second straight bending line segment 526 is placed on the bottom surface 483B and it extends from the midpoint of the straight edge 502S of the semi-circular portion 502 and it extends towards one end of the second long edge 504L2 of the first rectangular portion 504, which is placed at the second side edge 483S2.

One end of the second straight bending line segment 526 is placed on the midpoint of the straight edge 502S of the semi-circular portion 502. Another end of the second straight bending line segment 526 is placed on a point, which lies on about midpoint between the midpoint of the straight edge 502S and the one end of the second long edge 504L2 of the first rectangular portion 504, which is placed at the second side edge 483S2.

The fourth rectangular portion 409 includes the previously mentioned flap parts 488A and 488B.

The flap part 488A is located in a first half of the second rectangular portion 506 while the flap part 488B is located in a second half of the second rectangular portion 506.

The flap part 488A includes a U-shaped cut line 488AU. The cut line 488AU is produced using a die cut process.

A plurality of scored lines, which includes several straight bending line segments 540 that are placed on the bottom surface 483B. They extend between the U-shaped cut line 488AU and one end of the second long edge 504L2 of the first rectangular portion 504, which is placed at the first side edge 483S1. They also extend between the U-shaped cut link 488AU and the midpoint of the second long edge 506L2 of the second rectangular portion 506. The number of the scored lines is dependent on the material of the blank 481.

Similarly, the flap part 488B includes a U-shaped cut line 488BU. The cut line 488BU is produced using a die cut process.

A plurality of scored lines, which includes several straight bending line segments 542 that are placed on the top surface 483T. They extend between the U-shaped cut link 488BU and the midpoint of the second long edge 506L2 of the second rectangular portion 506. They also extend between the U-shaped cut line 488BU and one end of the second long edge 504L2 of the first rectangular portion 504, which is placed at the second side edge 483S2.

The straight bending line segments 540 and 542 allow for easy inserting of the flap parts 488A and 488B for locking the flap parts 488A and 488B to a part of the blank 481. The straight bending line segments 540 and 542 also allow for easy unlocking or removing of the flap parts 488A and 488B from the lock.

With regards to the bumps 487, they are placed on an elevated part of the blank 481.

The elevated part is enclosed by a part of the first long edge 506L1, a part of the second long edge 506L2, and the second short edge 506S2 of the second rectangular portion 506, as well as the straight bending line segment 512.

The bumps 487 are placed on the flap parts 488A and 488B. These bumps 487 allow easy friction gripping of the flap parts 488A and 488B.

The bumps 487 can be produced via blind emboss for a blank that comprises paper. The bumps 487 can be studded or attached to a blank that comprises silicone or rubber material.

A curve edge or rounded corner 530 is provided at one end of the first straight bending line segment 516, which is placed next to the first side edge 483S1.

Similarly, a curve edge or rounded corner 532 is provided at one end of the second straight bending line segment 518, which is placed next to the second side edge 483S2.

A curve edge or rounded corner 534 is also provided at one end of the straight bending line segment 512, which is placed next to the rear edge 483R.

In one implementation for forming a cup, the blank 481 has a length of approximately 179 mm and a width of approximately 120 mm. The semi-circular portion 502 has a radius of about 60 mm. The first rectangular portion 504 has a width of about 60 mm and a length of about 120 mm. The second rectangular portion 506 has a width of about 57.0 mm and a length of about 120 mm. The first straight bending line segment 524 of the diagonal-scored lines forms an angle of about 45 degrees with the first side edge 483S1.

Functionally, the blank 481 can be folded manually to form a cup, which is illustrated in FIGS. 69 to 74 and 77 and 79.

The scored lines 485 are intended for bending parts of the blank to bend in different pre-determined directions.

The semi-circular portion 502 and the first rectangular portion 504 are intended for folding to form a container portion of the cup.

The flap parts 488A and 488B are intended for forming a tab, which allows a user to easily lock and unlock the container portion.

The rounded corners 530, 532, and 534 are intended to provide safety to prevent cutting of a user of the cup.

FIGS. 77, 78, and 79 show a method of folding the blank 481 to form a cup without a handle.

The method includes a step of folding the flat blank 481 along the straight bending line segment 512, as indicated by an arrow A1-3, which is shown in FIGS. 77 and 78. This causes the semi-circular portion 502 and the first rectangular portion 504 to fold for forming a container portion while the second rectangular portion 506 folds to form an initial handle portion of the cup.

After this, the blank 481 is folded along the straight bending line segment 518, as indicated by an arrow A2-3, which is shown in FIGS. 77, 78, and 79. The container portion is then inclined at an acute angle with respect to the handle portion.

The second rectangular portion 506 is then bent, as indicated by the arrow A3-3, wherein the flap parts 488A and 488B form a tab, which is shown in FIG. 79.

The tab is later inserted into a slit that is formed by the folded first rectangular portion 504, as indicated by an arrow A4-3, which is shown in FIG. 79.

FIG. 80 illustrates a variant of the blank of FIG. 68.

FIG. 80 depicts a thick blank 481' for folding to form a desired cup without a handle.

The blank 481' is similar to the blank 481 of FIG. 68. The blank 481' and the blank 481 have similar parts with the same name or similar name with a prime or alphabet symbol.

The thick blank 481' includes an elongated sheet 483 with a plurality of scored lines 485.

The elongated sheet 483 is essentially flat and is symmetrical about its longitudinal axis. The sheet 483 has a top surface 483T with a bottom surface 483B being provided opposite to the top surface 483T. The sheet 483 also has a first side edge 483S1 with a second side edge 483S2 being provided opposite to the first side edge 483S1, and a front edge 483F with a rear edge 483R being provided opposite to the front edge 483F.

Referring to the scored lines 485, they include a set of longitudinal-scored lines and a set of lateral-scored lines.

The longitudinal-scored lines include a set of first longitudinal bending lines, which includes a circular bending line segment 510C' and a first straight bending line segment 510S1' with a second straight bending line segment 510S2'.

The circular bending line segment 510C' is placed on the bottom surface 483B while the first straight bending line segment 510S1' and the second straight bending line segment 510S2' are placed on the top surface 483T.

The first straight bending line segment 510S1' and the second straight bending line segment 510S2' are essentially parallel to each other.

The circular bending line segment 510C' is placed at a midpoint of the straight edge 502S of the semi-circular portion 502. A first end of the circular bending line segment 510C' is placed next to a first end of the first straight bending line segment 510S1'. A second end of the first straight bending line segment 510S1' is placed near to a midpoint of the rear edge 483R. Similarly, a second end of the circular bending line segment 510C' is placed next to a first end of the second straight bending line segment 510S2'. A second end of the second straight bending line segment 510S2' is placed next to the midpoint of the rear edge 483R.

With respect to the lateral-scored lines, they include a pair of first straight bending line segments 516A and 516B as well as a pair of second straight bending line segments 518A and 518B.

In detail, the first straight bending line segments 516A and 516B are positioned essentially parallel and near to each other. The first straight bending line segments 516A and 516B are placed on the bottom surface 483B and they extend from one end of the first long edge 506L1 of the second rectangular portion 506, which is placed next to the first side edge 483S1, to a midpoint of the first long edge 506L1 of the second rectangular portion 506.

The second straight bending line segments 518A and 518B are positioned essentially parallel and near to each other. The second straight bending line segments 518A and 518B are placed on the top surface 483T and they extend from the midpoint of the first long edge 506L1 of the second rectangular portion 506 to one end of the first long edge 506L1 of the second rectangular portion 506, which is placed next to the second side edge 483S2.

A trapezoid indentation or opening 550' is provided at an area, where the pair of the first straight bending line segments 516A and 516B meet with the pair of second straight bending line segments 518A and 518B.

Functionally, the straight bending line segments 510S1' and 510S2' provide additional bending lines for allowing easier folding of the thick blank 481'.

Similarly, the first straight bending line segments 516A and 516B as well as a pair of second straight bending line segments 518A and 518B provide additional bending lines for allowing easier folding of the thick blank 481'.

FIGS. 81 to 88 illustrate a variant of the blank of FIG. 81.

FIG. 81 shows a thin blank 381-1 for folding to form a desired cup with a stand. The blank 381-1 and the blank 381 of FIG. 38 have similar parts. The similar parts may have the same or similar part numbers.

The thin blank 381-1 includes an elongated sheet 383-1 with two flap parts 388A-1 and 388B-1.

The sheet 383 also comprises a semi-circular portion 402, a first rectangular portion 404, a second rectangular portion 406, a third rectangular portion 408, and a fourth rectangular portion 409 as illustrated in FIG. 63.

In detail, the fourth rectangular portion 406 includes the previously mentioned flap parts 388A-1 and 388B-1.

The flap part 388A-1 is located in a first half of the fourth rectangular portion 406 while the flap part 388B-1 is located in a second half of the fourth rectangular portion 406.

The flap part 388A-1 includes a straight scored line 388AS-1, a first straight cut line 388AC1-1 and a second straight cut line 388AC2-1. The straight scored line 388AS-1, the first straight cut line 388AC1-1 and the second straight cut line 388AC2-1 are arranged such that they form a triangle. In detail, a first end of the straight scored line 388AS-1 is connected to a first end of the first straight cut line 388AC1-1. A second end of the first straight cut line 388AC1-1 is connected to a first end of the second straight cut line 388AC2-1. A second end of the second straight cut line 388AC2-1 is connected to a second end of the straight scored line 388AS-1.

Similarly, the flap part 388B-1 includes a straight scored line 388BS-1, a first straight cut line 388BC1-1 and a second straight cut line 388BC2-1.

In a case, wherein the blank 381-1 is provided using paper, the first straight cut line 388AC1-1 and the second straight cut line 388AC2-1 are provided with a single die cut line.

Functionally, the flaps part 388A-1 and 388B-1 are intended for pop-out or folding to provide additional support for the cup.

Figure 86:
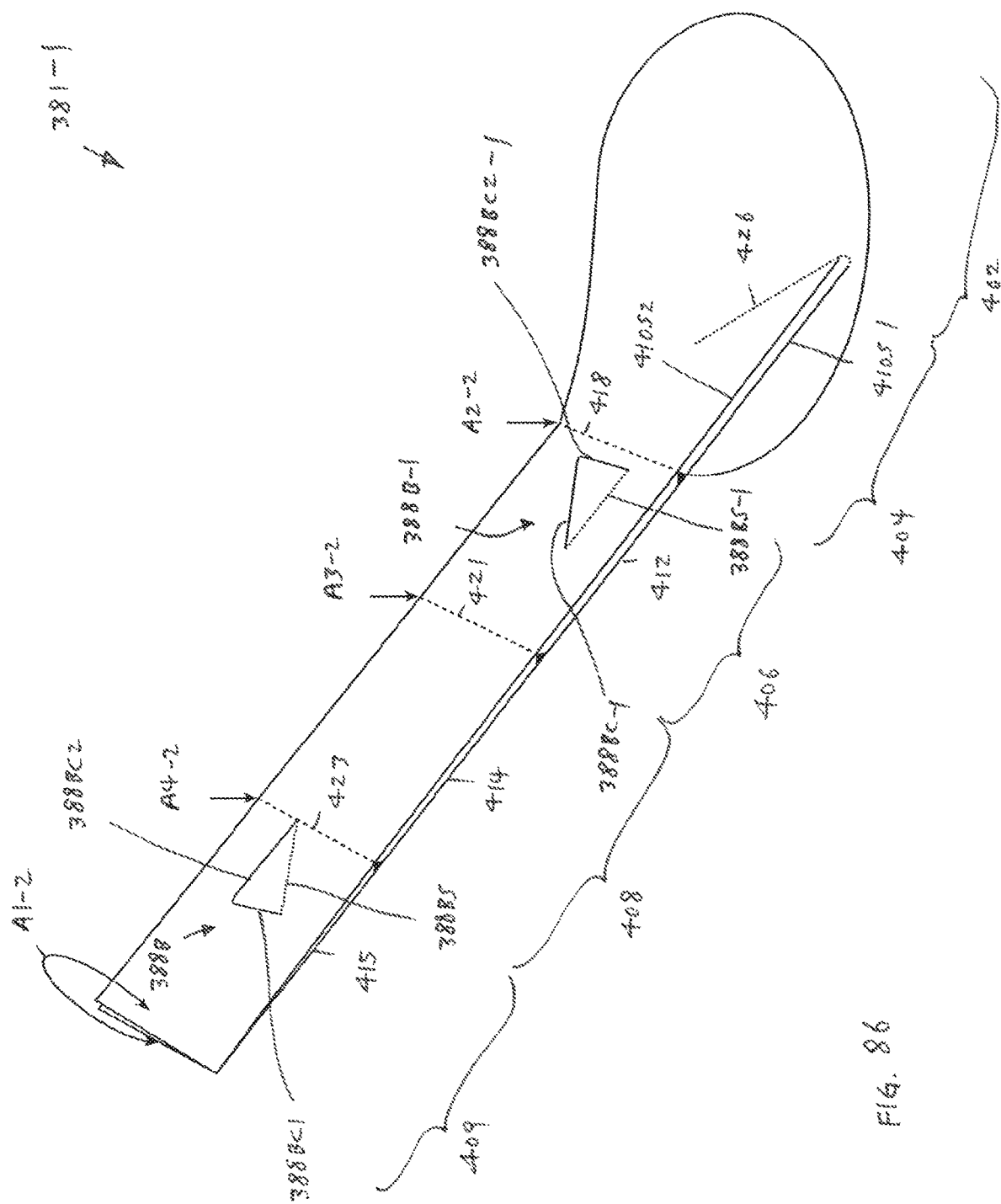
Figure 87:
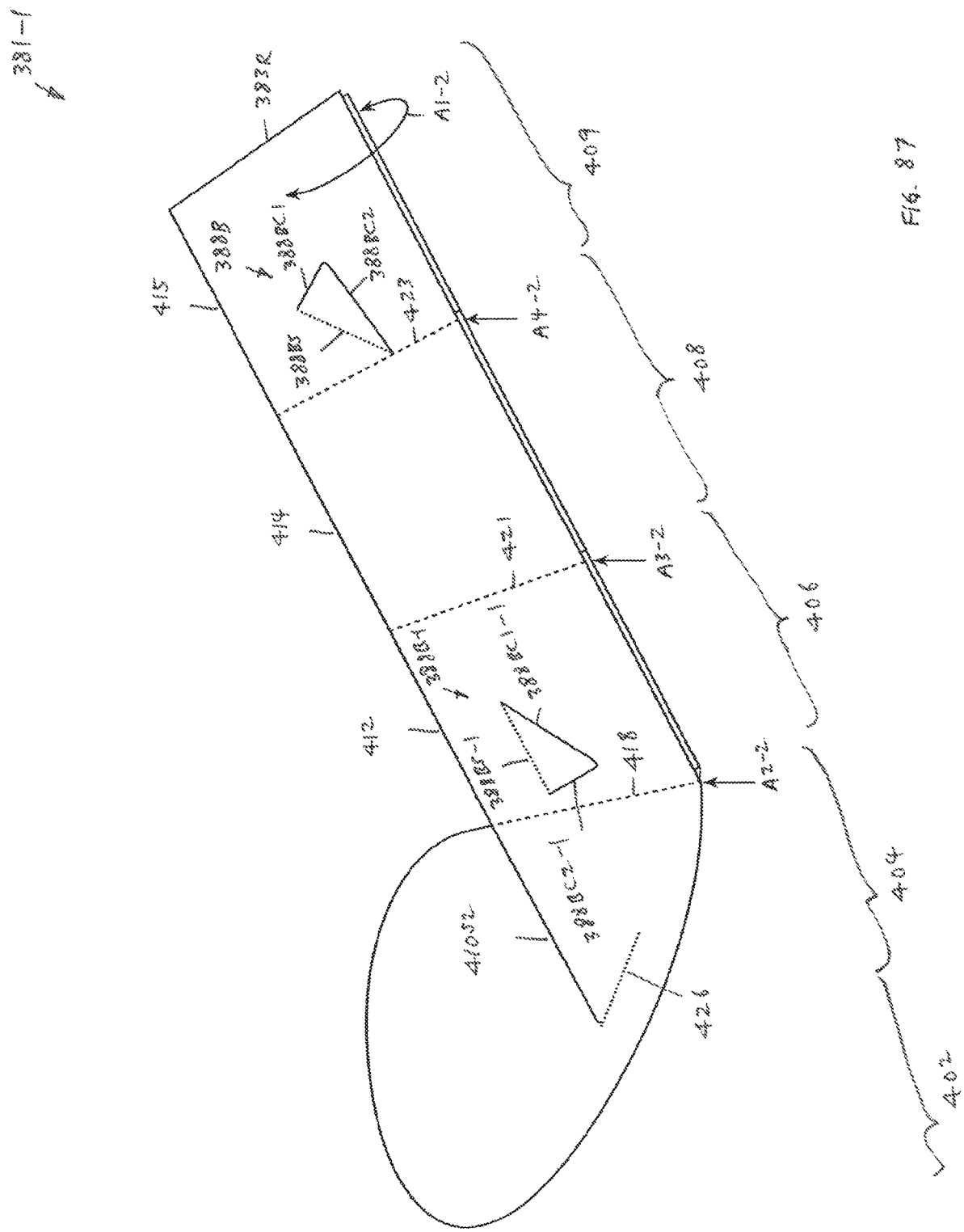
Figure 88:
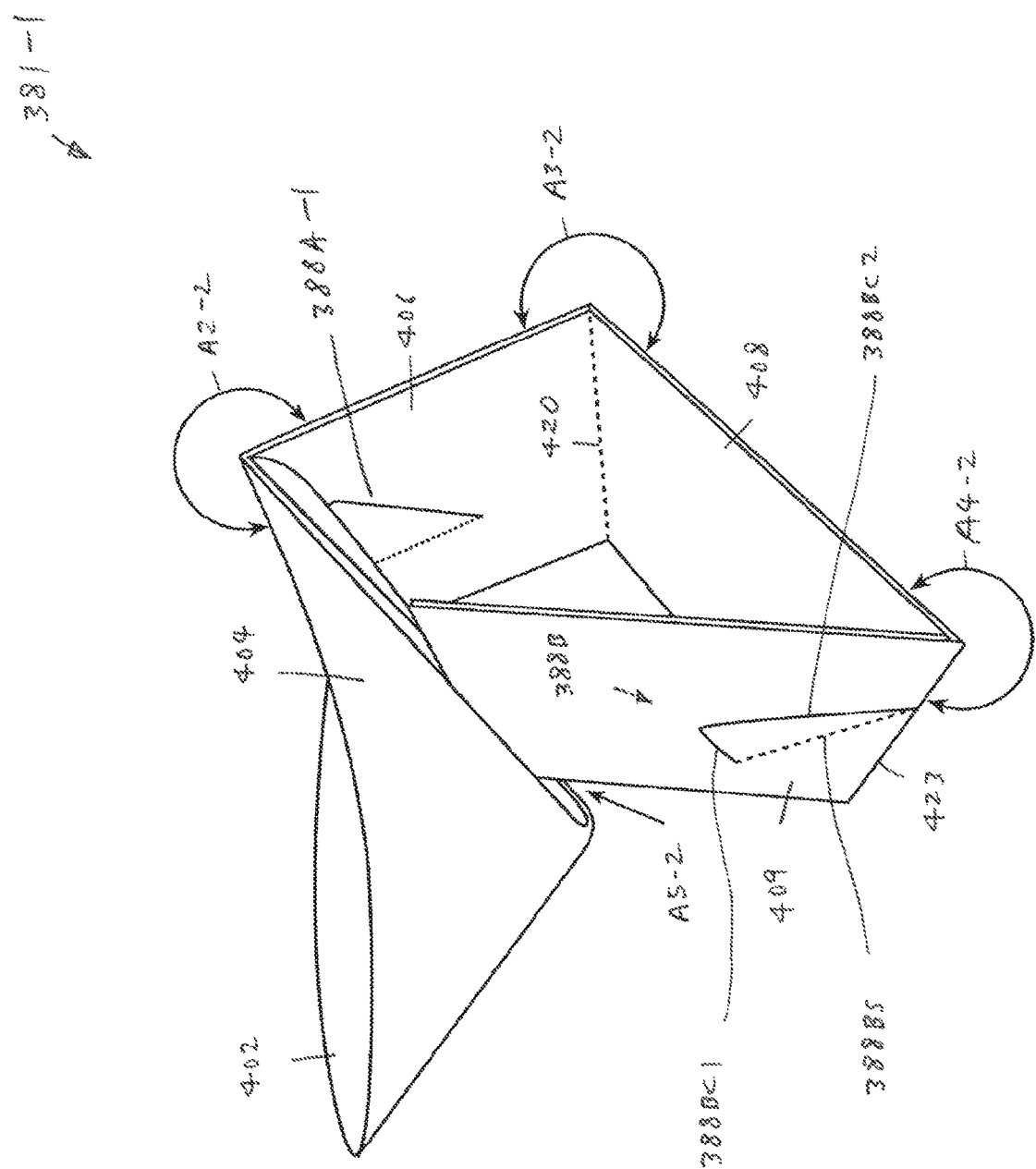

FIGS. 86, 87, and 88 show a method of folding the blank 381-1 to form a cup with a stand.

The method includes a step of folding the flap parts 388A-1 and 388B-1 outwards, as shown in FIG. 81.

FIGS. 89 to 92 show a moulded blank 1*p*, which is intended for folding to form a handheld tool, namely a spoon or scoop. The blank 1*p* is not subjected to external compressive force.

The moulded blank 1*p* is a variant of the blank of FIG. 1, wherein the moulded blank 1*p* and the blank of FIG. 1 have similar parts.

Figure 89:
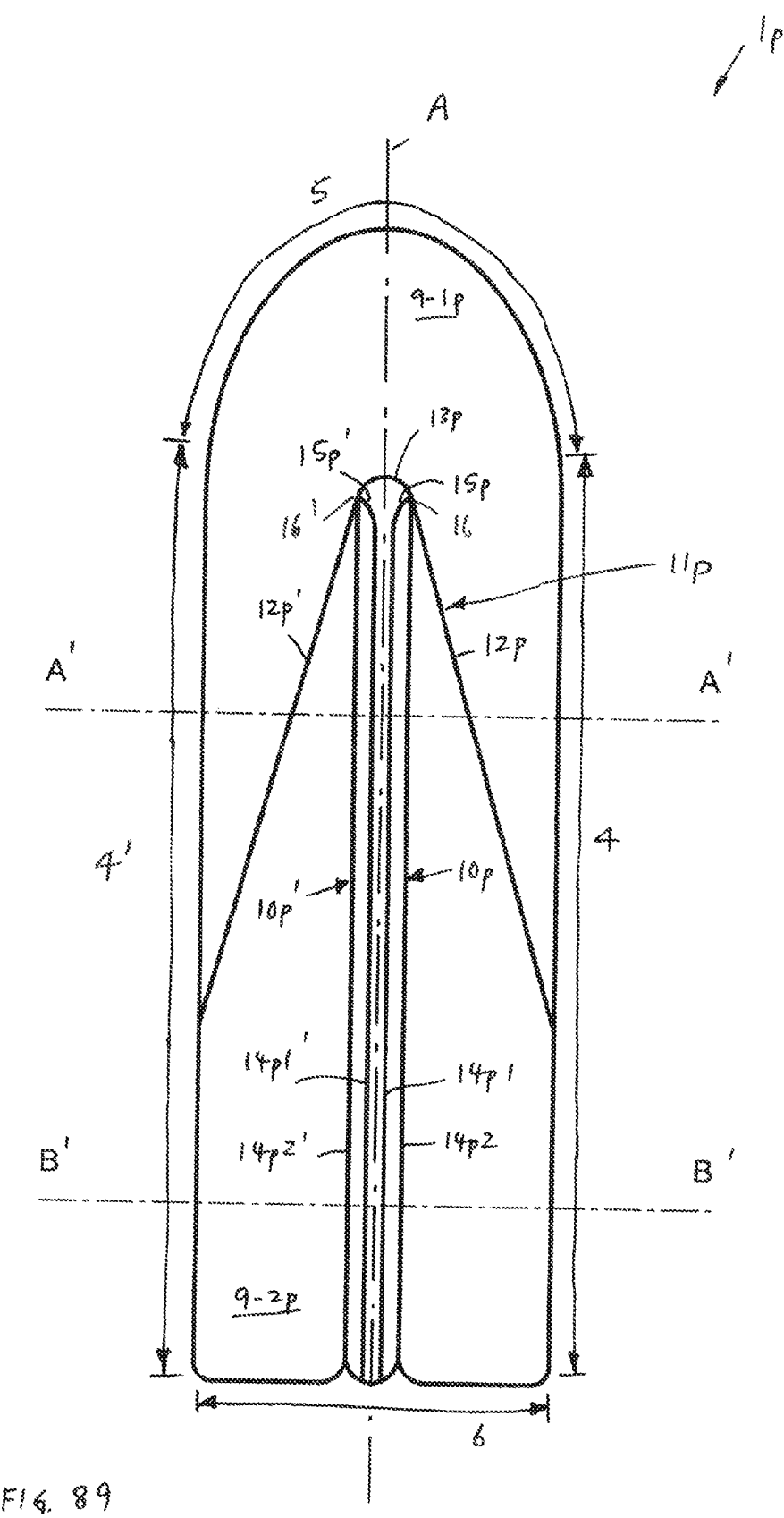

As better seen in FIG. 89, the moulded blank 1*p* includes an elongated, and essentially symmetric sheet with a symmetrical axis A.

As better seen in FIGS. 89 to 92, the sheet includes a major top surface 2 and a major bottom surface 3 being provided opposite the major top surface 2, a first side edge 4 and a second side edge 4' being provided opposite the first side edge 4, as well as a front edge 5 and a rear edge 6 being provided opposite the front edge 5. A first end part of the first side edge 4 is placed next to a first end part of the rear edge 6. A second end part of the rear edge 6 is placed next to a first end part of the second side edge 4'. A second end part of the second side edge 4' is placed next to a first end part of the front edge 5. A second end part of the front edge 5 is placed next to a second end part of the second side edge 4.

Figure 90:
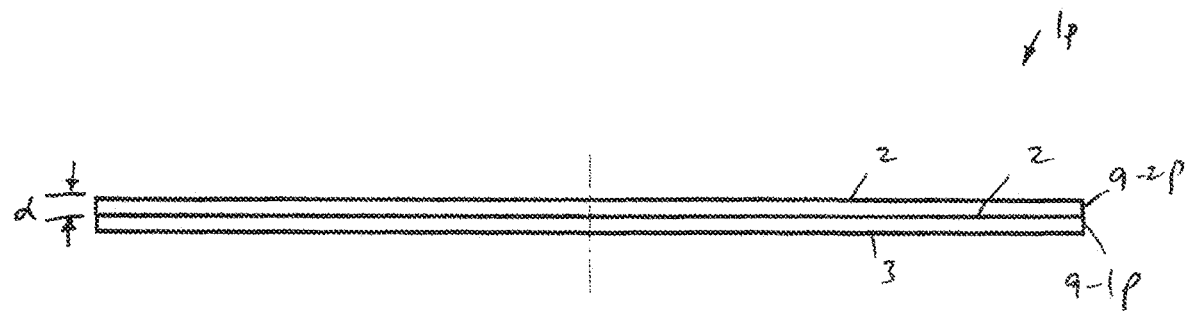
Figure 91:
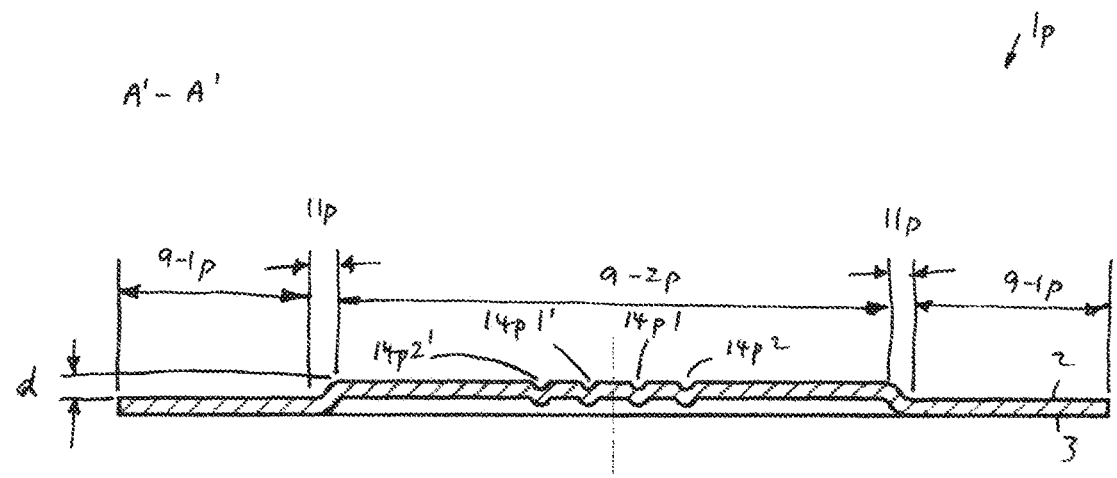
Figure 92:
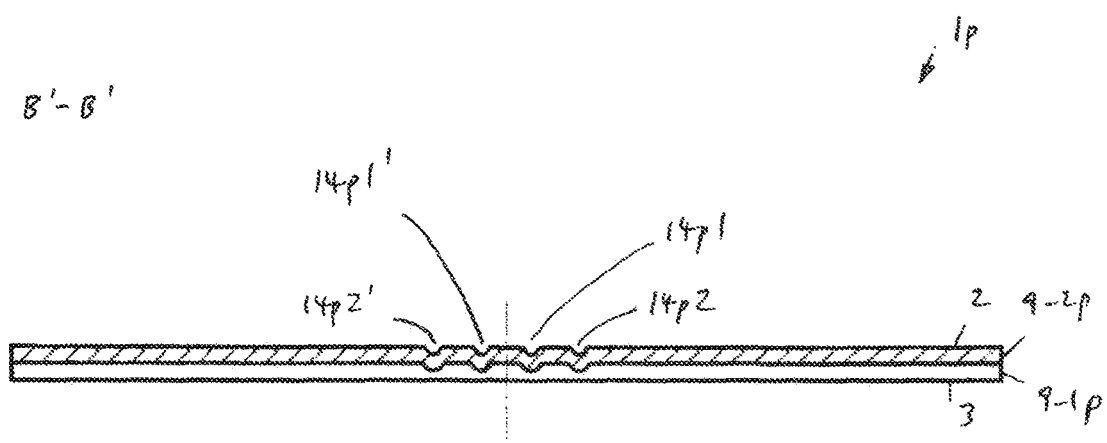

Referring to FIG. 89, the sheet includes a first flat portion 9-1*p* together with a second flat portion 9-2*p*, and a bending cum connection strip 11*p*. The first flat portion 9-1*p* is integrally connected to the bending cum connection strip 11*p*, which is integrally connected to the second flat portion 9-2*p*. As seen in FIGS. 90 and 91, a plane of the first flat portion 9-1*p* is also separated from a plane of the second flat portion 9-2*p* by a predetermined distance d. In other words, the second flat portion 9-2*p* is elevated or raised with respect to the first flat portion 9-1*p*.

Referring to FIG. 89, the bending cum connection strip 11*p* includes two essentially straight strip segments 12*p* and 12*p'* and an essentially circular strip segment 13*p*. The straight strip segments 12*p* and 12*p'* are connected to the circular strip segment 13*p* such that the bending cum connection strip 11*p* is symmetrical around the axis A. The circular strip segment 13*p* is also called a vertex.

In detail, a first end of the straight strip segment 12*p* is placed next to the first side edge 4. The straight strip segment 12*p* extends from the side edge 4 towards the symmetrical axis A. The straight strip segment 12*p* is placed at an acute angle with respect to the side edge 4. A second end of the straight strip segment 12*p* is placed next to a first end of the circular strip segment 13*p*. The second end of the straight strip segment 12*p* and the first end of the circular strip segment 13*p* are placed at a junction point 16.

Similarly, a first end of the straight strip segment 12*p'* is placed next to the second side edge 4'. The straight strip segment 12*p'* extends from the side edge 4' towards the symmetrical axis A. The straight strip segment 12*p'* is placed at an acute angle with respect to the side edge 4'. A second end of the straight strip segment 12*p'* is placed next to a second end of the circular strip segment 13*p*. A second end of the straight strip segment 12*p'* and the second end of the circular strip segment 13 are placed at a junction point 16'.

Referring to the second flat portion 9-2*p*, it includes bending lines 10*p* and 10*p'*. The bending lines 10*p* and 10*p'* extend between the rear edge 6 of the moulded blank 1*p* and the circular strip segment 13*p*. The bending lines 10*p* and 10*p'* are placed on the top surface 2.

The bending line 10*p* comprises two straight bending line segments 14*p*1 and 14*p*2 together with a curved bending line segment 15*p*. A first end part of the straight bending line segment 14*p*1 is placed next to the rear edge 6. A second end part of the straight bending line segment 14*p*2 is placed next to a first end part of the curved bending line segment 15*p*. A second end part of the curved bending line segment 15*p* is placed next to the junction point 16. The second end part of the curved bending line segment 15*p* is also placed next to a first end part of the straight bending line segment 14*p*2. A second end part of the straight bending line segment 14*p*2 is placed next to the rear edge 6.

Similarly, the bending line 10*p'* comprises two straight bending line segment 14*p*1' and 14*p*2' and a curved bending line segment 15*p'*. A first end part of the straight bending line segment 14*p*1' is placed next to the rear edge 6. A second end part of the straight bending line segment 14*p*1' is placed next to a first end part of the curved bending line segment 15*p'*. A second end part of the curved bending line segment 15*p'* is placed next to the junction point 16'. The second end part of the curved bending line segment 15*p'* is also placed next to a first end part of the straight bending line segment 14*p*2'. A second end part of the straight bending line segment 14*p*2' is placed next to the rear edge 6.

The straight bending line segments 14*p*1 and 14*p*2 and the straight bending line segments 14*p*1' and 14*p*2' extend longitudinally with respect to the blank 1*p*.

The straight bending line segments 14*p*1 and 14*p*2 are placed on a first side of the symmetrical axis A while the straight bending line segments 14*p*1' and 14*p*2' are placed on a second side of the symmetrical axis A, which is opposite the first side. The straight bending line segments 14*p*1 and 14*p*2 and the straight bending line segments 14*p*1' and 14*p*2' are placed closed to and parallel to the symmetrical axis A such that the straight bending line segments 14*p*2 and 14*p*2' and the curved bending line segments 15*p* and 15*p'* and the circular strip segment 13*p* enclose a stripe or channel that extends from the rear edge 6 to the circular strip segment 13*p*.

The channel has an essentially constant width over its whole length, except in the vertex region, in which the curved bending line segments 15*p* and 15*p'* separates further away from the symmetrical axis A.

In use, the shape of the moulded blank 1*p* can change under pressure. In other words, the moulded blank 1*p* is flexible. Without external pressure or force, specifically external compressive forces, the blank 1*p* has a shape as shown in FIGS. 89 to 92. This shape can change when a predetermined compressive force is applied to the moulded blank 1*p*.

The bending line 10*p'* includes a groove or channel, wherein the groove is connected to two opposing parts. One part can bend or rotate around the groove, with respect to the other part.

A connection or joint between the first flat portion 9-1p and the bending cum connection strip 11p acts as a bending line. The first flat portion 9-1p can bend or rotate around the bending line, with respect to the bending cum connection strip 11p.

Similarly, a connection or joint between the second flat portion 9-2p and the bending cum connection strip 11p also acts as a bending line. The second portion 9-2p can bend or rotate around the bending line, with respect to the bending cum connection strip 11p.

A method producing the blank 1p using pulp molding is described below.

A fine wire mesh is initially provided. The wire mesh, which acts as mold, is connected a chamber with a vacuum pump, wherein the wire mesh is suspended above a liquid return pool. The wire mesh has a shape of an upper or exposed surface of the blank 1p, wherein the surface includes bending lines.

After this, a food-safe wet fibrous slurry is sprayed from below onto the wire mesh. The fibrous slurry is produced using food-safe fibers.

The vacuum pump then draws the slurry tightly against the wire mesh, wherein fibers of the slurry fills all or most gaps and spaces of the wire mesh while also drawing water of the slurry through the wire mesh into the vacuum chamber. When airflow through the wire mesh has been sufficiently blocked by the fibers, excess slurry falls into the return pool for recycling.

The wire mesh together with the fibers, which are shaped by the wire mesh, later moves to an area for drying the fibers, wherein the dried fibers form the blank 1p.

Following this, the wire mesh is separated from the dried blank 1p.

In another embodiment, a sheet of paper is provided. After this, a mold is used to press the sheet to form the first flat portion 9-1p together with the elevated second flat portion 9-2p of the blank 1p. Following this, the bending line 10p and 10p' are provided on the paper using scoring to form the finished blank 1p. Heat can also be applied to form the elevated second flat portion 9-2p.

The blank 1p provides a benefit in that the separation of plane of the first flat portion 9-1p from the plane of the second flat portion 9-2p allows for easier folding of the blank 1p to form the spoon.

A user can just bend the bank 1p to form a spoon in one movement. The user presses the side edges 4 and 4' toward each other. The bending cum connection strip 11p then allows and eases the first flat portion 9-1p to bend or rotate around the bending line or joint, which is provided between the first flat portion 9-1p and the bending cum connection strip 11p. Similarly, the bending cum connection strip 11p also allows and facilitates the second flat portion 9-2p to bend or rotate around the bending line or joint, which is provided between the second portion 9-2p and the bending cum connection strip 11p.

In summary, the blank includes a first flat part, a second flat part, and a connection part. The first flat part is connected to the connection part, which is connected to the second flat part such that the first flat part is elevated with respect to the second flat part.

The elevation or separation between the two flat parts can be formed using different methods. Each method can include different process steps, such as application of pressure, application of vacuum or suction, and/or application of heat.

Referring to the blank, height of the elevation can be selected according to material of the blank. In general, the height should be more than a thickness of the blank.

The blank can be produced from paper material or metal material or other food-safe material.

In use, the elevated part is often selected to serve as a handle/bridge section.

Figure 93:
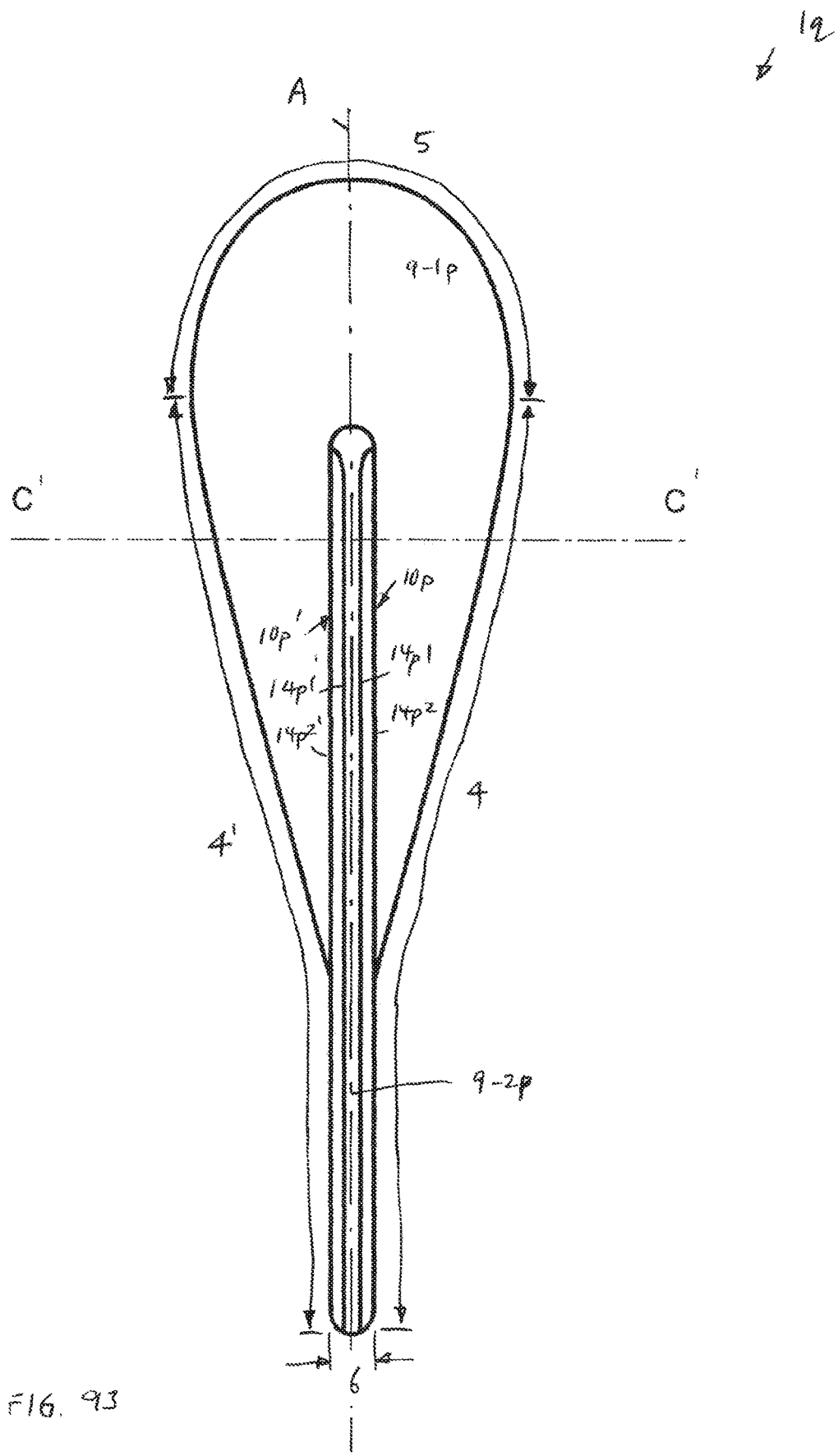
Figure 94:
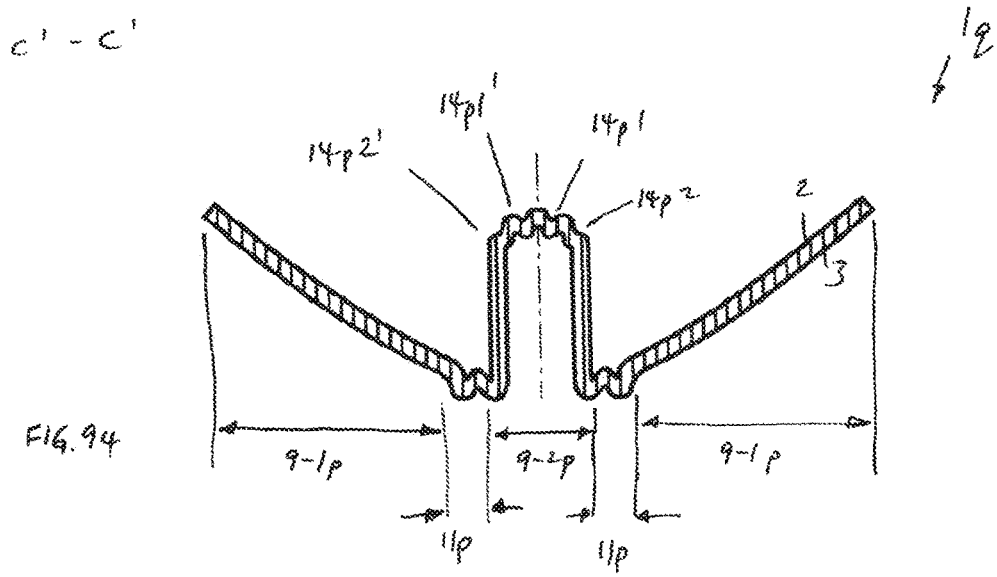

FIGS. 93 and 94 show a moulded blank 1q, which is intended for folding to form a handheld tool, namely a spoon or scoop.

The moulded blank 1q is a variant of the blank of FIG. 89. The moulded blank 1q and the blank of FIG. 89 have similar parts.

As better seen in FIG. 93, the moulded blank 1p includes an elongated, and essentially symmetric sheet with a symmetrical axis A.

As better seen in FIG. 93, the sheet includes a major top surface 2 and a major bottom surface 3 being provided opposite the major top surface 2, a first side edge 4 and a second side edge 4' being provided opposite the first side edge 4, as well as a front edge 5 and a rear edge 6 being provided opposite the front edge 5.

Referring to FIG. 94, the sheet includes a first flat portion 9-1p together with a second flat portion 9-2p and a bending cum connection strip 11p. The first flat portion 9-1p is integrally connected to the bending cum connection strip 11p, which is integrally connected to the second flat portion 9-2p.

The first flat portion 9-1p is bent to serve as a container portion of a spoon. The second flat portion 9-2p is bent to serve as a handle portion of the spoon.

Referring to FIG. 89, the bending cum connection strip 11p includes two essentially straight strip segments 12p and 12p' and an essentially circular strip segment 13p. The straight strip segments 12p and 12p' are connected to the circular strip segment 13p such that the bending cum connection strip 11p is symmetrical around the axis A. The circular strip segment 13p is also called a vertex.

Referring to the second flat portion 9-2p, it includes bending lines 10p and 10p'. The bending lines 10p and 10p' extend between the rear edge 6 of the moulded blank 1q and the circular strip segment 13p. The bending lines 10p and 10p' are placed on the top surface 2.

The bending line 10p comprises two straight bending line segments 14p1 and 14p2 together with a curved bending line segment 15p. Similarly, the bending line 10p' comprises two straight bending line segment 14p1' and 14p2' and a curved bending line segment 15p'.

The straight bending line segments 14p1 and 14p2 and the straight bending line segments 14p1' and 14p2' extend longitudinally with respect to the blank 1q.

The blank 1q is formed by scoring the top surface 2 and the bottom surface 3 and by debossing the bottom surface 3.

Figure 95:
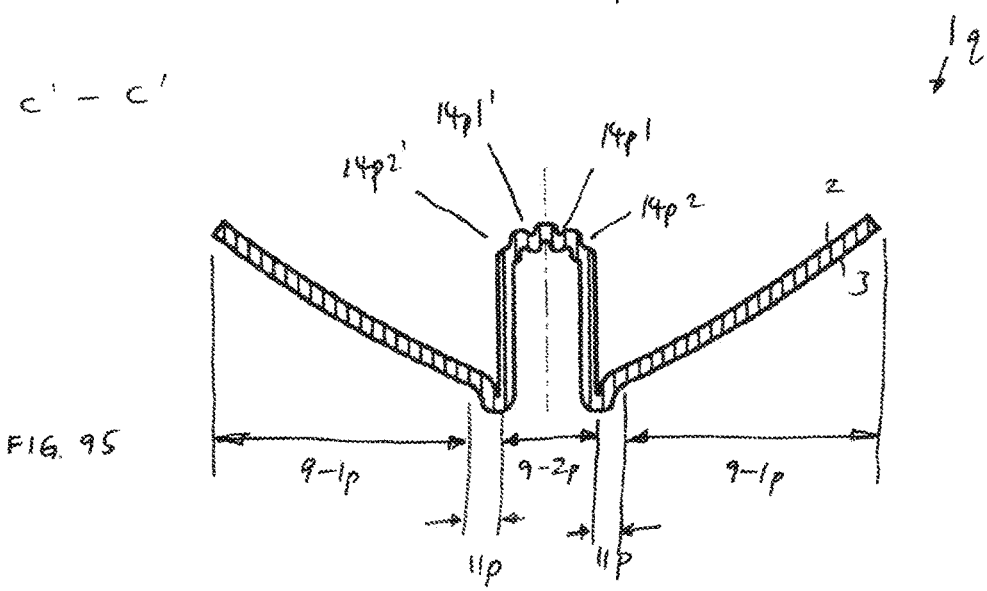

FIG. 95 shows an embodiment of the blank 1q, wherein the blank 1q is formed using by debossing of the top surface 2 and the bottom surface 3.

Figure 96:
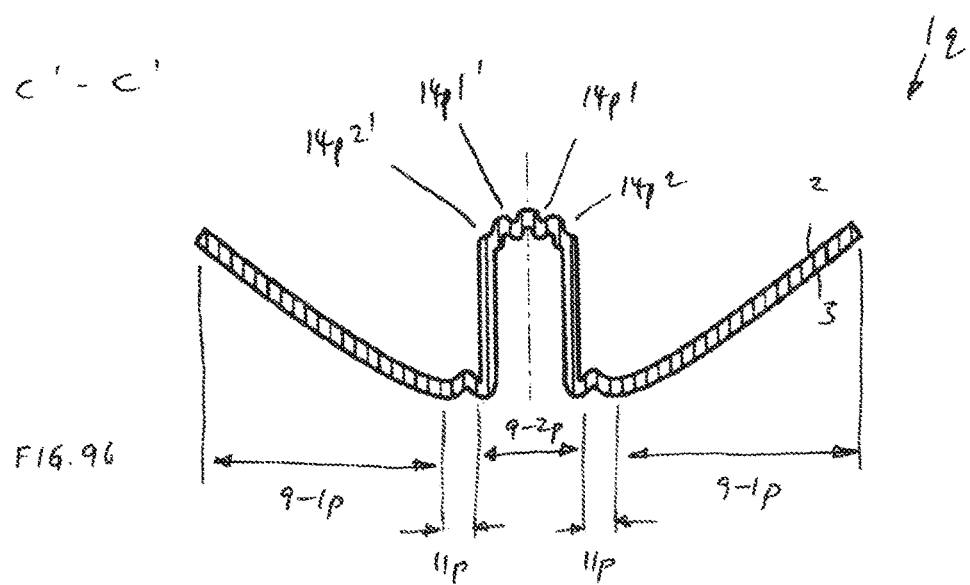

FIG. 96 shows another embodiment of the blank 1q, wherein the blank 1q is formed by scoring of the top surface 2 and the bottom surface 3.

The blank 1q provides a benefit in that the shape of the moulded blank 1q allows for easier folding of the blank 1q to form a spoon. A user can just bend the bank 1q to form a spoon in one movement by pressing the side edges 4 and 4' toward each other.

The embodiments can also be described with the following lists of features or elements being organized into an item list. The respective combinations of features, which are disclosed in the item list, are regarded as independent subject matter, respectively, that can also be combined with other features of the application.

1. A blank (1p) for forming a handheld tool, the blank (1p) comprising an elongated sheet that comprises
   a top surface (2) and a bottom surface (3) being provided opposite the top surface (2),
   a first longitudinal end and a second longitudinal end being provided opposite the first longitudinal end,
   a first side end and a second side end being provided opposite the first side end, and
   a circumferential edge that comprises a rear edge (6) being provided at the first longitudinal end, a front edge (5) being provided at the second longitudinal end, a first side edge (4) being provided at the first side end, and a second side edge (4') being provided at the second side end,
the elongated sheet further comprising
   a bending cum connecting strip (11p) extending between the side edges (4, 4') of the blank (1p), the bending cum connecting strip (11p) comprising a first strip segment (12p), a second strip segment (12p'), and a (partially circular) connecting strip segment (13p), the first strip segment (12p) and the second strip segments (12p') extending at an oblique angle inwards from respective endpoints at the side edges (4, 4') of the blank (1p), pointing along a longitudinal direction towards the front edge (5) of the blank (1p) and the connecting strip segment (13p) providing a (blunt) vertex, (the vertex comprising at least partially rounded shape,)
the elongated sheet further comprising
   a first downward bending line (10p) extending between the rear edge (4) and the first strip segment (12p) and
   a second downward bending line (10p') extending between the rear edge (4) and the second strip segment (12p'),
wherein the bending cum connecting strip (11p) and the front edge (5) enclosing a first flat portion (9-1p) being provided in a first plane, and
the bending cum connecting strip (11p) and the rear edge (6) enclosing a second flat portion (9-2p) being provided in a second plane, and
   the second plane is separated from the first plane by a predetermined distance (d).

2. A blank (1q) for forming a handheld tool, the blank (1q) comprising an elongated sheet that comprises
   a top surface (2) and a bottom surface (3) being provided opposite the top surface (2),
   a first longitudinal end and a second longitudinal end being provided opposite the first longitudinal end,
   a first side end and a second side end being provided opposite the first side end, and
   a circumferential edge that comprises a rear edge (6) being provided at the first longitudinal end, a front edge (5) being provided at the second longitudinal end, a first side edge (4) being provided at the first side end, and a second side edge (4') being provided at the second side end,
the elongated sheet further comprising
   a bending cum connecting strip (11p) extending between the side edges (4, 4') of the blank (1q), the bending cum connecting strip (11p) comprising a first strip segment (12p), a second strip segment (12p'), and a connecting strip segment (13p), the first strip segment (12) and the second strip segment (12') extending at an oblique angle inwards from respective endpoints at the side edges (4, 4') of the blank (1q), pointing along a longitudinal direction towards the front edge (5) of the blank (1q) and providing a (blunt) vertex, (the vertex comprising at least partially rounded shape,)
the elongated sheet further comprising
   a first downward bending line (10p) extending between the rear edge (4) and the first strip segment (12p) and
   a second downward bending line (10p') extending between the rear edge (4) and the second strip segment (12p'),
wherein the bending cum connecting strip (11p) and the front edge (5) enclosing a first flat portion (9-1p) being provided in a first plane, and
the bending cum connecting strip (11p) and the rear edge (6) enclosing a second flat portion (9-2p) being provided in a second plane,
wherein the first flat portion (9-1p) is bent to serve as a container portion and the second flat portion (9-2p) is bent to serve as a handle portion of the handheld tool.

3. The blank according to item 1 or 2, wherein a middle area (31) extending between the downward bending lines (10, 10'), the upward bending line (11), and the rear edge (4), and
   the downward bending lines (10) are arranged in such a way that a widening of the middle lane (31) at the connecting segment (13) is provided.

4. The blank according to one of the items 1 to 3, wherein the angle between the first upward bending segment (12) and the second upward bending segment (12') is in a range from 20° to 66°, more specifically from 26° to 35°.

5. The blank according to one of the items 1 to 4, wherein each of the downward bending lines (10, 10') meet the upward bending line (11) at a respective junction point (16) adjacent to the connecting segment (13).

6. The blank according to item 5, wherein at the junction points (16), the angle between the upward bending line (11) and the respective downward bending line (10, 10') is essentially perpendicular or lies between 60° and 90°, more specifically between 80° and 90°.

7. The blank according to one of the items 1 to 6, wherein at least one of the bending lines (10, 11) is provided by a bending groove on at least one surface of the blank.

8. The blank according to one of the items 1 to 7, wherein elevated portions (17) between the rear edge (4) and the endpoints at the side edges (4,4') of the blank are provided.

9. The blank according to one of the items 1 to 8, wherein the blank has an essentially tapered shape, such that the width of the blank at the rear edge (6) is smaller than the width of the blank between the tip of the front edge (5) and the connecting segment (13).

10. A handheld tool being formed by folding the blank according to one of the items 1 to 9.

While at least one exemplary embodiment has been presented in the foregoing detailed description, it should be appreciated that a vast number of variations exists. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

REFERENCE NUMBERS 1 blank
1a, 1b, 1c, 1d, 1e, 1f, 1g, 1h, 1i, 1j, 1ja, 1jb, 1k, 1l, 1m, 1n, 1p blank
2 top surface
3 bottom surface
4, 4' side edge
5 front edge
6 rear edge
7 handle section
8 functional section
9 intermediate section
9-1p first flat portion
9-2p second flat portion
10, 10' downward bending line
10p bending line
10p' bending line
11 upward bending line
11p bending cum connection strip
12, 12' upward bending segment
12p straight strip segment
12p' straight strip segment
13 connecting segment
13p circular strip segment
14, 14' straight segment of downward bending line
14p1 straight bending line segment
14p2 straight bending line segment
14p1' straight bending line segment
14p2' straight bending line segment
15 curved segment of the downward bending pattern
15p curved bending line segment
15p' curved bending line segment
16 junction point
16 junction point
16' junction point
17 bump
18 indentation
19 rounded corner of the rear edge
20 transversal structure
21, 21' endpoint
22 tip
30 side wing
31 middle lane
31a embedded metal sheet
32 bow
33 downward movement arrow symbol
34 upward movement arrow symbol
40 tensile force
41 compression force
50 reinforcement
51 recess
60 handle wing
61 handle bending line
70 hole
81 blank
83 sheet
83T top surface
83B bottom surface
83S1 first side edge
83S2 second side edge
83F front edge
83R rear edge
85 scored line
87 bumps
102 semi-circular portion
102A arc edge
102S straight edge
104 first rectangular portion
104L1 first-long edge
104L2 second-long edge
104S1 first-short edge
104S2 second-short edge
106 second rectangular portion
106L1 first-long edge
106L2 second-long edge
106S1 first-short edge
106S2 second-short edge
108 third rectangular portion
108L1 first-long edge
108L2 second-long edge
108S1 first-short edge
108S2 second-short edge
110C circular bending line segment
110S1 first straight bending line segment
110S2 second straight bending line segment
112 straight bending line segment
114 straight bending line segment
116 first straight bending line segment
118 second straight bending line segment
120 third straight bending line segment
122 fourth straight bending line segment
124 first straight bending line segment
126 second straight bending line segment
130 rounded corner
132 rounded corner
134 rounded corner
181 blank
183 sheet
183T top surface
183B bottom surface
183S1 first side edge
183S2 second side edge
183F front edge
183R rear edge
185 scored line
187 bumps
202 semi-circular portion
202A arc edge
202S straight edge
204 first rectangular portion
204L1 first-long edge
204L2 second-long edge
204S1 first-short edge
204S2 second-short edge
206 second rectangular portion
206L1 first-long edge
206L2 second-long edge
206S1 first-short edge
206S2 second-short edge
208 third rectangular portion
208L1 first-long edge
208L2 second-long edge
208S1 first-short edge
208S2 second-short edge
210C circular bending line segment
210S1 first straight bending line segment
210S2 second straight bending line segment
216A first straight bending line segment
216B first straight bending line segment
218A second straight bending line segment
218B second straight bending line segment
220A third straight bending line segment
220B third straight bending line segment 222A fourth straight bending line segment
222B fourth straight bending line segment
224 first straight bending line segment
226 second straight bending line segment
228 trapezoid indentation
230 trapezoid indentation
381 blank
381-1 thin blank
383 sheet
383-1 sheet
383T top surface
383B bottom surface
383S1 first side edge
383S2 second side edge
383F front edge
383R rear edge
385 scored line
387 bumps
388A flap part
388A-1 flap part
388AS straight scored line
388AS-1 straight scored line
388AC1 first straight cut line
388AC1-1 first straight cut line
388AC2 second straight cut line
388AC2-1 second straight cut line
388B flap part
388B-1 flap part
388BS straight scored line
388BS-1 straight scored line
388BC1 first straight cut line
388BC1-1 first straight cut line
388BC2 second straight cut line
388BC2-1 second straight cut line
402 semi-circular portion
402A arc edge
402S straight edge
404 first rectangular portion
404L1 first-long edge
404L2 second-long edge
404S1 first-short edge
404S2 second-short edge
406 second rectangular portion
406L1 first-long edge
406L2 second-long edge
406S1 first-short edge
406S2 second-short edge
408 third rectangular portion
408L1 first-long edge
408L2 second-long edge
408S1 first-short edge
408S2 second-short edge
410C circular bending line segment
410S1 first straight bending line segment
410S2 second straight bending line segment
412 straight bending line segment
414 straight bending line segment
415 straight bending line segment
416 first straight bending line segment
418 second straight bending line segment
420 third straight bending line segment
421 fourth straight bending line segment
422 fifth straight bending line segment
423 sixth straight bending line segment
424 first straight bending line segment
426 second straight bending line segment
481 thin blank
481' thick blank
483 elongated sheet
483B bottom surface
483F front edge
483R rear edge
483S1 first side edge
483S2 second side edge
483T top surface
485 scored line
487 bump
488A flap part
488AU U-shaped cut line
488B flap part
488AU U-shaped cut line
502 semi-circular portion
502A arc edge
502S straight edge
504 first rectangular portion
504L1 first-long edge
504L2 second-long edge
504S1 first-short edge
504S2 second-short edge
506 second rectangular portion
506L1 first-long edge
506L2 second-long edge
506S1 first-short edge
506S2 second-short edge
510C circular bending line segment
510C' circular bending line segment
510S1 first straight bending line segment
510S1' first straight bending line segment
510S2 second straight bending line segment
510S2' second straight bending line segment
512 straight bending line segment
516 first straight bending line segment
516A first straight bending line segment
516B first straight bending line segment
518 second straight bending line segment
518A second straight bending line segment
518B second straight bending line segment
524 first straight bending line segment
526 second straight bending line segment
530 rounded corner
532 rounded corner
534 rounded corner
540 straight bending line segment
542 straight bending line segment
550' trapezoid opening
A axis
A1 arrow
A1-1 arrow
A1-2 arrow
A1-3 arrow
A2 arrow
A2-1 arrow
A2-2 arrow
A2-3 arrow
A3 arrow
A3-1 arrow
A3-2 arrow
A3-3 arrow
A4 arrow
A4-1 arrow
A4-2 arrow
A4-3 arrow
A5-2 arrow
d distance

The invention claimed is:

1. A blank for forming a handheld tool, the blank comprising an elongated sheet that comprises:
    a top surface and a bottom surface being provided opposite the top surface,
    a first longitudinal end and a second longitudinal end being provided opposite the first longitudinal end,
    a first side end and a second side end being provided opposite the first side end, and
    a circumferential edge that comprises a rear edge being provided at the first longitudinal end, a front edge being provided at the second longitudinal end, a first side edge being provided at the first side end, and a second side edge (4') being provided at the second side end,
    the elongated sheet further comprising:
        a bending cum connecting strip extending between the side edges of the blank, the bending cum connecting strip comprising a first strip segment, a second strip segment, and a connecting strip segment, the first strip segment and the second strip segments extending at an oblique angle inwards from respective endpoints at the side edges of the blank, pointing along a longitudinal direction towards the front edge of the blank and the connecting strip segment providing a vertex, the elongated sheet further comprising:
        a first downward bending line extending between the rear edge and the first strip segment and
        a second downward bending line extending between the rear edge and the second strip segment,
    wherein:
        the bending cum connecting strip and the front edge enclose a first flat portion being provided in a first plane, and
        the bending cum connecting strip and the rear edge enclose a second flat portion being provided in a second plane, and
        the second plane is separated from the first plane by a predetermined distance.

2. The blank according to claim 1, wherein:
    a middle area extending between the downward bending lines, the upward bending line, and the rear edge, and
    the downward bending lines are arranged in such a way that a widening of the middle lane at the connecting segment is provided.

3. The blank according to claim 1, wherein:
    the angle between the first upward bending segment and the second upward bending segment is in a range from 20° to 66°, more specifically from 26° to 35°.

4. The blank according to claim 3, wherein:
    each of the downward bending lines meet the upward bending line at a respective junction point adjacent to the connecting segment.

5. The blank according to claim 4, wherein:
    at the junction point, the angle between the upward bending line and the respective downward bending line is essentially perpendicular or lies between 60° and 90°, more specifically between 80° and 90°.

6. The blank according to claim 1, wherein:
    at least one of the bending lines is provided by a bending groove on at least one surface of the blank.

7. The blank according to claim 1, wherein:
    elevated portions between the rear edge and the endpoints at the side edges of the blank are provided.

8. The blank according to claim 1, wherein:
    the blank has an essentially tapered shape, such that the width of the blank at the rear edge is smaller than the width of the blank between the tip of the front edge and the connecting segment.

9. A handheld tool being formed by folding the blank according to claim 1.

10. A blank for forming a handheld tool, the blank comprising an elongated sheet that comprises:
    a top surface and a bottom surface being provided opposite the top surface,
    a first longitudinal end and a second longitudinal end being provided opposite the first longitudinal end,
    a first side end and a second side end being provided opposite the first side end, and
    a circumferential edge that comprises a rear edge being provided at the first longitudinal end, a front edge being provided at the second longitudinal end, a first side edge being provided at the first side end, and a second side edge being provided at the second side end,
    the elongated sheet further comprising:
        a bending cum connecting strip extending between the side edges of the blank, the bending cum connecting strip comprising a first strip segment, a second strip segment, and a connecting strip segment, the first strip segment and the second strip segment extending at an oblique angle inwards from respective endpoints at the side edges of the blank, pointing along a longitudinal direction towards the front edge of the blank and providing a vertex,
    the elongated sheet further comprising:
        a first downward bending line extending between the rear edge and the first strip segment and a second downward bending line extending between the rear edge and the second strip segment,
    wherein:
        the bending cum connecting strip and the front edge enclose a first flat portion being provided in a first plane, and
        the bending cum connecting strip and the rear edge enclose a second flat portion being provided in a second plane,
    wherein:
        a joint between the first flat portion and the bending cum connection strip is bent, enabling the first flat portion to serve as a container portion and a joint between the second flat portion and the bending cum connection strip is bent, enabling the second flat portion to serve as a handle portion of the handheld tool.

11. The blank according to claim 10, wherein:
    a middle area extending between the downward bending lines, the upward bending line, and the rear edge, and
    the downward bending lines are arranged in such a way that a widening of the middle lane at the connecting segment is provided.

12. The blank according to claim 10, wherein:
    the angle between the first upward bending segment and the second upward bending segment is in a range from 20° to 66°, more specifically from 26° to 35°.

13. The blank according to claim 10, wherein:
    each of the downward bending lines meet the upward bending line at a respective junction point adjacent to the connecting segment.

14. The blank according to claim 13, wherein:
    at the junction point, the angle between the upward bending line and the respective downward bending line is essentially perpendicular or lies between 60° and 90°, more specifically between 80° and 90°.

15. The blank according to claim 10, wherein:
at least one of the bending lines is provided by a bending groove on at least one surface of the blank.

16. The blank according to claim 10, wherein:
elevated portions between the rear edge and the endpoints at the side edges of the blank are provided.

17. The blank according to claim 10, wherein:
the blank has an essentially tapered shape, such that the width of the blank at the rear edge is smaller than the width of the blank between the tip of the front edge and the connecting segment.

18. A handheld tool being formed by folding the blank according to claim 10.

* * * * *